(12) United States Patent
Lee et al.

(10) Patent No.: US 11,469,611 B2
(45) Date of Patent: Oct. 11, 2022

(54) POWER SUPPLY SYSTEM

(71) Applicant: LS ELECTRIC CO., LTD., Anyang-si (KR)

(72) Inventors: Joohoon Lee, Anyang-si (KR); Jiheon Lee, Anyang-si (KR); Dongjin Yun, Anyang-si (KR); Dohyun Kim, Anyang-si (KR); Jihong Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 17/274,708

(22) PCT Filed: Sep. 10, 2019

(86) PCT No.: PCT/KR2019/011669
§ 371 (c)(1),
(2) Date: Mar. 9, 2021

(87) PCT Pub. No.: WO2020/055079
PCT Pub. Date: Mar. 19, 2020

(65) Prior Publication Data
US 2022/0052549 A1 Feb. 17, 2022

(30) Foreign Application Priority Data

Sep. 13, 2018 (KR) .......................... 10-2018-0109537
Sep. 13, 2018 (KR) .......................... 10-2018-0109545

(51) Int. Cl.
*H02J 9/06* (2006.01)
*H02J 1/12* (2006.01)
(Continued)

(52) U.S. Cl.
CPC ............. *H02J 9/061* (2013.01); *H02H 7/268* (2013.01); *H02J 1/12* (2013.01); *H02J 7/34* (2013.01);
(Continued)

(58) Field of Classification Search
CPC .... H02H 7/268; H02J 1/10; H02J 7/34; H02J 9/068; H02J 13/0004; H02J 2310/42;
(Continued)

(56) References Cited

U.S. PATENT DOCUMENTS 9,698,589 B1 * 7/2017 Leyh ..................... H02H 7/28
2010/0231042 A1 * 9/2010 Weale ................. H02J 13/0079
307/38
(Continued)

FOREIGN PATENT DOCUMENTS

EP          2442417 B1    3/2016
JP          H1070853 A    3/1998
(Continued)

OTHER PUBLICATIONS

International Search Report for related International Application No. PCT/KR2019/011669; report dated Mar. 19, 2020; (5 pages).
(Continued)

*Primary Examiner* — Ryan Johnson
(74) *Attorney, Agent, or Firm* — K&L Gates LLP

(57) ABSTRACT

The present specification relates to a power supply system enabling uninterruptible power supply, the system including a circuit breaker for regulating respective converters to which a plurality of power supply devices are connected, so as to control a power supply and demand by the opening and closing of the circuit breaker according to various situations occurring in the system, thereby enabling a UPS function to be performed between the plurality of power supply devices.

26 Claims, 16 Drawing Sheets

(51) Int. Cl.
*H02H 7/26* (2006.01)
*H02J 7/34* (2006.01)
*H02J 13/00* (2006.01)

(52) U.S. Cl.
CPC .............. *H02J 9/062* (2013.01); *H02J 9/068* (2020.01); *H02J 13/0004* (2020.01)

(58) Field of Classification Search
CPC ....... H02J 9/061; H02J 9/062; B63B 2241/22; Y02B 90/20; Y02B 70/10; Y02E 60/60; Y04S 20/12
See application file for complete search history.

(56) References Cited

U.S. PATENT DOCUMENTS

| | | |
|---|---|---|
| 2011/0254368 A1 | 10/2011 | Boe |
| 2013/0215543 A1 | 8/2013 | Hoeven |
| 2013/0270902 A1 | 10/2013 | Andersen et al. |
| 2014/0240880 A1 | 8/2014 | Chen et al. |
| 2017/0194791 A1* | 7/2017 | Budde ..................... H02J 9/061 |
| 2019/0350104 A1* | 11/2019 | Belady ..................... G06F 1/26 |

FOREIGN PATENT DOCUMENTS

| | | |
|---|---|---|
| JP | H11266532 A | 9/1999 |
| JP | 2001327100 A | 11/2001 |
| JP | 2013223425 A | 10/2013 |
| JP | 2014176163 A | 9/2014 |
| JP | 2016539609 A | 12/2016 |
| KR | 101223260 B1 | 1/2013 |
| KR | 101712123 B1 | 3/2017 |

OTHER PUBLICATIONS

Written Opinion for related International Application No. PCT/KR2019/011669; report dated Mar. 19, 2020; (4 pages).
Korean Notice of Allowance for related Korean Application No. 10-2018-0109537; action dated Jan. 10, 2022; (2 pages).
Japanese Office Action for related Japanese Application No. 2021-513225; report dated May 24, 2022; (5 pages).
European Search Report for related European Application No. 19859583.7; action dated Jul. 11, 2022; (7 pages).

* cited by examiner

POWER SUPPLY SYSTEM

CROSS-REFERENCE TO RELATED APPLICATIONS

This application is the National Stage filing under 35 U.S.C. 371 of International Application No. PCT/KR2019/011669, filed on Sep. 10, 2019, which claims the benefit of earlier filing date and right of priority to Korean Application No. 10-2018-0109537, filed on Sep. 13, 2018 and Korean Application No. 10-2018-0109545, filed on Sep. 13, 2018, the contents of which are all hereby incorporated by reference herein in their entirety.

FIELD

The present disclosure relates to a power supply system capable of supplying uninterruptible power.

BACKGROUND

The technology behind the present disclosure relates to a system comprising a plurality of power supply devices.

A system in which a plurality of power supply devices supply power to each load may be connected in common through a DC bus line. When connected to a common bus line as described above, there is an advantage capable of receiving and supplying power from and to an adjacent power device through the DC bus line. However, when the system is configured in this way, there are limitations such as system stability problem, difficulty in controlling power reception and supply, and a lack of countermeasures in case of an accident.

Since a large number of power devices having a complex configuration are provided, system operation cannot be stably carried out when compatibility between devices is poor. Furthermore, when a load to which each device supplies power is a critical load that needs power supply at all times, it is required to provide a separate UPS device for an abnormal condition, but when a UPS device is provided, the configuration of the system becomes more complicated, and the provision of the UPS device itself is not easy due to structural/design constraints. In addition, as the configuration becomes more complicated, the control of each device and system is inevitably more complex, and the risk of occurrence of failures and accidents increases. As a result, it is difficult to supply stable and reliable power, so the operation of the load is also unstable, and an appropriate operational response to the occurrence of various accidents cannot be made.

SUMMARY

An aspect of the present disclosure is to improve the limitations of the related art as described above.

In other words, the present specification aims to provide a power supply system capable of improving the limitations of the related art.

Specifically, it is intended to provide a power supply system in which power reception and supply are carried out between a plurality of power supply devices provided in the system, thereby allowing the plurality of power supply devices to respectively perform a UPS function with each other.

Furthermore, it is intended to provide a power supply system capable of effectively maintaining power supply to a load in various abnormal situations.

In addition, it is intended to provide a power supply system capable of stably and adequately coping with power reception and supply according to various abnormal situations.

In order to solve the foregoing problems, a power supply system according to the present disclosure may include circuit breakers controlling respective electric circuits to which a plurality of power supply devices are connected, thereby opening and closing the circuit breakers according to various situations occurring in the system to control power reception and supply.

In other words, as a technical feature, a power supply system according to the present disclosure may include circuit breakers corresponding to a plurality of power supply devices to control the circuit breakers so as to receive and supply power, thereby performing a UPS function between the plurality of power supply devices.

The above technical features may be applied to a power supply system for implementation, and the present specification may provide embodiments of a power supply system having the above technical features.

A power supply system having the above technical features as a problem solving means according to an embodiment of the present disclosure may include a plurality of power panels that convert power supplied from at least one power source into DC power, and convert the DC power into driving power of a load, and supply the driving power to the load, and a DC electric circuit to which one end and the other end thereof are connected to connect each power end through which the DC power is input and output in each of the plurality of power panels, and conduct the DC power converted by the plurality of power panels, and a plurality of circuit breakers respectively disposed between the power ends on the DC electric circuit to connect or disconnect two power ends connected to the electric circuit disposed therein, wherein the plurality of circuit breakers are opened and closed differently according to the power supply state of at least one of the plurality of power panels to connect or disconnect the DC power between the plurality of power panels, and when power supply is interrupted in at least one of the plurality of power panels, at least one of the circuit breakers connected to a power end of the power panel in which the power supply is interrupted is closed to connect at least one of the power ends at both sides of the power end of the interrupted power panel and the power end of the interrupted power panel.

In one embodiment, the at least one power supply source may include a first AC power source and a second AC power source that supply AC power, and a battery power source in which DC power is stored to supply the stored power to the plurality of power panels while the power supply is switched and restored when the power supply of the first AC power source and the second AC power source is interrupted.

In one embodiment, after the power supply is interrupted, the battery power source may supply the stored power to the plurality of power panels with no interruption until the power supply is switched and restored.

In one embodiment, the at least one power supply source may further include an emergency power source that supplies emergency power to the load when the power supply of the first AC power source, the second AC power source, and the battery power source is interrupted.

In one embodiment, each of the plurality of power panels may include at least one first power conversion device that converts power supplied from the at least one power supply source into the DC power; and a second power conversion device that converts the DC power supplied from the at least one first power conversion device into the driving power to supply the driving power to the load.

In one embodiment, the plurality of power panels may supply the DC power to the second power conversion device through any one of the at least one first power conversion device according to the state of the at least one power supply source.

In one embodiment, when the power supply of a conversion device that supplies the DC power to the second power conversion device is interrupted, the plurality of power panels may supply the DC power to the second power conversion device through another conversion device other than the conversion device.

In one embodiment, while the conversion device is switched to the other conversion device, the at least one first power conversion device may supply the DC power to the second power conversion device through a conversion device that receives power from the battery power source.

In one embodiment, the plurality of power panels may be connected to a power end at one side and a power end at the other side connected on the DC electric circuit to allow a connection between the power ends to be continuous.

In one embodiment, in the plurality of power panels, a connection between the power ends may be continuous to allow a connection between the plurality of power panels to form a loop structure.

In one embodiment, the plurality of circuit breakers may be closed when the DC power is connected between the plurality of power panels, and opened when the DC power is disconnected between the plurality of power panels.

In one embodiment, in the plurality of circuit breakers, when the power supply of at least one of the plurality of power panels is interrupted, at least one circuit breaker disposed between the power panel in which the power supply is interrupted and a power panel adjacent to the interrupted power panel may be closed to connect the interrupted power panel and the adjacent power panel so as to supply the DC power from the adjacent power panel to the interrupted power panel.

In one embodiment, the interrupted power panel may be supplied with the DC power from a conversion device connected to the battery power source until the power supply is interrupted, and the DC power conducted from the adjacent power panel is supplied.

In one embodiment, the power supply system may further include a control device that monitors the state of at least one of the plurality of power panels and the plurality of circuit breakers to control at least one of the plurality of power panels and the plurality of circuit breakers according to the monitoring result.

In addition, a power supply system having the above technical features as a problem solving means according to another embodiment of the present disclosure may include a plurality of loads, a plurality of power panels that convert power supplied from each of a plurality of power supply sources into DC power, and convert the DC power into driving power for driving the plurality of loads to supply the driving power, a plurality of circuit breakers provided in each of electric circuits connected to each of the plurality of power panels to control a connection between the plurality of power panels, and a control device that controls the opening and closing of the plurality of circuit breakers according to the state of each of the plurality of power panels to control the reception and supply of the DC power between the plurality of power panels.

In one embodiment, the plurality of power panels may include a plurality of converters that convert power received from each of a plurality of power supply sources into DC power, a plurality of inverters that convert the DC power into driving power for driving a plurality of loads to supply the driving power to the plurality of loads, a circuit breaker provided between an output end to which the outputs of the plurality of converters are commonly connected and an external connection end connected to the output end to control a connection between the output end and the connection end, and a control unit that controls the opening and closing of the circuit breaker according to the state of the DC power or the driving power to control the reception and supply of the DC power.

In one embodiment, the control unit may select any one of the plurality of converters according to the state of the plurality of power supply sources, and control the selected converter to transfer the DC power to each of the plurality of inverters.

In one embodiment, when an abnormality occurs in at least one of a converter that is transferring the DC power to the plurality of inverters and a power supply source corresponding to the converter, the control unit may control another converter other than the converter to transfer the DC power to the plurality of inverters.

In one embodiment, when an abnormality occurs in two or more of the plurality of power supply sources, the control unit may close the circuit breaker, and control the DC power to be supplied from another power supply device.

In one embodiment, when an abnormality occurs in another power supply device connected to the bus line, the control unit may close the circuit breaker, and control DC power to be supplied to the another power supply device.

In one embodiment, in each of the plurality of power panels, an output end from which the DC power is output may be connected to each of the output ends of two adjacent power panels.

In one embodiment, in the plurality of power panels, an output end of a power panel at one side thereof and an output end of a power panel at the other side thereof may be connected to allow a connection between the output ends to form a loop.

In one embodiment, the plurality of power panels may select any one of the plurality of converters that convert the DC power according to the state of the plurality of power supply sources to transfer the DC power to each of the plurality of inverters that convert the driving power through the selected converter.

In one embodiment, when an abnormality occurs in at least one of a converter that is transferring the DC power to a plurality of inverters converting the driving power and a power supply source corresponding to the converter, the plurality of power panels may transfer the DC power to the plurality of inverters through another converter other than the converter.

In one embodiment, each of the plurality of circuit breakers may be included in each of the plurality of power panels.

In one embodiment, the plurality of circuit breakers may be opened at normal times and closed during operation to control a connection between the plurality of power panels.

In one embodiment, when an abnormality occurs in at least one of the plurality of power panels, the control device may close a circuit breaker on any one of electric circuits connected to the abnormality occurred power panel and a power panel adjacent to the abnormality occurred power panel to allow the abnormality occurred power panel to receive the DC power from the adjacent power panel.

On the other hand, a power supply system having the above technical features as a problem solving means according to another embodiment of the present disclosure may include a plurality of power panels that convert power supplied from at least one power source into DC power, and convert the converted DC power into driving power of a load, and supply the driving power to the load, a DC electric circuit to which one end and the other end thereof are connected, and a power end through which the DC power is input and output in each of the plurality of power panels and the supply panel is connected to conduct the DC power converted by the plurality of power panels and the supply panel, and a plurality of circuit breakers disposed between the power ends on the DC electric circuit to connect or disconnect two power ends connected to the electric circuit disposed therein, wherein the plurality of circuit breakers are opened and closed differently according to the power supply state of at least one of the plurality of power panels to connect or disconnect the DC power between each of the plurality of power panels and a power panel adjacent thereto or the supply panel, and when power supply is interrupted in at least one of the plurality of power panels, at least one of the circuit breakers connected to a power end of a power panel in which the power supply is interrupted is closed to connect at least one of the power ends at both sides of the power end of the interrupted power panel and the power end of the interrupted power panel so as to supply the DC power to the interrupted power panel from at least one of the adjacent power panel and the supply panel.

In one embodiment, in the plurality of power panels, a power end through which the DC power is input and output may be connected to each of the power ends of two adjacent power panels, or connected to a power end of one adjacent power panel and a power end of the supply panel, respectively.

In one embodiment, in the plurality of power panels, a power end through which the DC power is input and output may be connected to a power end of a power panel at one side and a power end of a power panel at the other side or a power end of the supply panel to allow a connection between the power ends to be continuous.

In one embodiment, in the plurality of power panels and the supply panel, a connection between the power ends may be continuous to allow a connection between the plurality of power panels and the supply panel to form a loop structure.

In one embodiment, in the plurality of power panels and the supply panel, a connection between the power ends may form a loop.

In one embodiment, the supply panel may be disposed between any two of the plurality of power panels.

In one embodiment, a power supply source that supplies power to the supply panel may include at least the battery power source.

In one embodiment, the supply panel may include at least one first power conversion device that further receives power from the first AC power source and the second AC power source, and converts the power received from the at least one power source into the DC power.

In one embodiment, the supply panel may supply the DC power to the plurality of power panels through any one of the at least one first power conversion devices according to the state of the at least one power supply source.

In one embodiment, the plurality of circuit breakers may be closed when the DC power is connected between the plurality of power panels or between the plurality of power panels and the supply panel, and opened when the DC power is disconnected between the plurality of power panels or between the plurality of power panels and the supply panel.

In one embodiment, in the plurality of circuit breakers, when an abnormality occurs in a power panel connected to the supply panel among the plurality of power panels, a circuit breaker disposed between the abnormality occurred power panel and the supply panel may be closed to connect the abnormality occurred power panel and the supply panel so as to supply the DC power from the supply panel to the abnormality occurred power panel.

In one embodiment, in the plurality of circuit breakers, when an abnormality occurs in a power panel that is not adjacent to the supply panel among the plurality of power panels, circuit breakers respectively disposed between the abnormality occurred power panel, a power panel adjacent to the supply panel and the supply panel may be closed to supply the DC power to the abnormality occurred power panel from the adjacent power panel, and supply the DC power to the adjacent power panel from the supply panel.

In addition, a power supply system having the above technical features as a problem solving means according to another embodiment of the present disclosure may include a supply panel disposed between any two power panels among the plurality of power panels to convert power received from at least one power supply source into DC power, and supply the converted DC power to a power panel connected thereto when connected to either one of the two power panels, a bus line configured in a loop structure in which one end and the other end thereof are connected to each other, and connected to a power end through which the DC power is input and output from each of the plurality of power panels and the supply panel to conduct the DC power that is converted by the plurality of power panels and the supply panel, and a plurality of circuit breakers disposed at one side of a power end of each of the plurality of power panels and at one side of the power end of the supply panel, respectively, to connect or separate each of the plurality of power panels from an adjacent power panel or the supply panel, wherein the plurality of circuit breakers are opened and closed differently according to a state of supplying power in at least one of the plurality of power panels to connect or disconnect the DC power between the plurality of power panels or between the plurality of power panels and the supply panel, and when the supply of power is interrupted in at least one of the plurality of power panels, at least one is closed to supply the DC power from the supply panel to the power panel in which the supply of power is interrupted so as to connect at least one of the plurality of power panels to the supply panel.

In one embodiment, the plurality of power panels may include a plurality of converters that convert power received from each of a plurality of power supply sources into DC power, a plurality of inverters that convert the DC power into driving power for driving a plurality of loads to supply the driving power to the plurality of loads, a circuit breaker provided between an output end to which the outputs of the plurality of converters are commonly connected and an external connection end connected to the output end to control a connection between the output end and the connection end, and a control unit that controls the opening and closing of the circuit breaker according to the state of the DC power or the driving power to control the reception and supply of the DC power.

In one embodiment, the control unit may select any one of the plurality of converters according to the state of the plurality of power supply sources to control the selected converter to transfer the DC power to each of the plurality of inverters.

In one embodiment, when an abnormality occurs in at least one of a converter that is transferring the DC power to the plurality of inverters and a power supply source corresponding to the converter, the control unit may control another converter other than the converter to transfer the DC power.

In one embodiment, when an abnormality occurs in two or more of the plurality of power supply sources, the control unit may control to close the circuit breaker and receive the DC power from another power supply device.

In one embodiment, when an abnormality occurs in another power supply device connected to the bus line, the control unit may control to close the circuit breaker and supply DC power to the another power supply device.

In one embodiment, in each of the plurality of power panels, an output end from which the DC power is output may be connected to each of the output ends of two adjacent power panels.

In one embodiment, in the plurality of power panels, an output end of a power panel at one side thereof and an output end of a power panel at the other side thereof may be connected to allow a connection between the output ends to form a loop.

In one embodiment, the plurality of power panels may select any one of the plurality of converters that convert the DC power according to the state of the plurality of power supply sources to transfer the DC power to each of the plurality of inverters that convert the driving power through the selected converter.

In one embodiment, when an abnormality occurs in at least one of a converter that is transferring the DC power to a plurality of inverters converting the driving power and a power supply source corresponding to the converter, the plurality of power panels may transfer the DC power to the plurality of inverters through another converter other than the converter.

In one embodiment, in each of the plurality of power panels, an output end from which the DC power is output may be connected to the output ends of two adjacent power panels, respectively, or connected to an output end of one adjacent power panel and an output end of the supply panel, respectively.

In one embodiment, in the plurality of power panels and the supply panel, a connection between the output ends may form a loop.

In one embodiment, the supply panel may be provided between any two of the plurality of power panels.

In one embodiment, when the DC power is supplied to the plurality of power panels, the supply panel may select any one of the plurality of converters that convert the DC power according to the state of the plurality of power supply sources to transfer the DC power to the plurality of power panels through the selected converter.

In one embodiment, the plurality of circuit breakers may be opened at normal times and closed during operation to control a connection between the plurality of power panels and a connection between the plurality of power panels and the supply panel.

In one embodiment, when an abnormality occurs in a power panel connected to the supply panel among the plurality of power panels, the control device may control to close a circuit breaker on an electric circuit to which the abnormality occurred power panel and the supply panel is connected and receive the DC power from the supply panel.

In one embodiment, when an abnormality occurs in a power panel not adjacent to the supply panel among the plurality of power panels, the control device may close a circuit breaker provided in an electric circuit between the abnormality occurred power panel and the supply panel, and control the abnormality occurred power panel to receive the DC power from the supply panel, and the adjacent power panel to receive the DC power from the supply panel.

On the other hand, in order to solve the foregoing problems, a power supply system according to the present disclosure may include circuit breakers controlling a connection on a power bus to which a plurality of power supply devices are connected, thereby opening and closing the circuit breakers according to various situations occurring in the system to control power reception and supply.

In other words, as a technical feature, a power supply system according to the present disclosure may include circuit breakers corresponding to a plurality of power supply devices to control the circuit breakers so as to receive and supply power through the power bus, thereby performing a UPS function between the plurality of power supply devices.

The above technical features may be applied to a power supply system for implementation, and the present specification may provide embodiments of a power supply system having the above technical features.

A power supply system having the above technical features as a problem solving means according to an embodiment of the present disclosure may include a plurality of power panels that convert power supplied from at least one power source into DC power, and convert the converted DC power into driving power of a load, and supply the driving power to the load, a supply panel that converts power supplied from at least one power supply source into DC power to supply the converted DC power to the plurality of power panels when connected to the plurality of power panels through a bus line, the bus line through which a power end of each of the plurality of power panels and a power end of the supply panel are connected to conduct the DC power converted by the plurality of power panels and the supply panel, and a plurality of circuit breakers disposed between each of the power ends and the bus line, which are opened and closed differently according to the power supply state of at least one of the plurality of power panels to connect or disconnect each of the power ends and the bus line, wherein in the plurality of circuit breakers, the plurality of circuit breakers are opened and closed differently according to the power supply state of at least one of the plurality of power panels to connect or disconnect the DC power between the power end and the bus line, when the power supply of at least one of the plurality of power panels is interrupted, in order to conduct the DC power from at least one of another power panel other than the power panel in which the power supply is interrupted and the supply panel to the power panel in which the power supply is interrupted through the bus line, a circuit breaker connected to the at least one of the another power panel and the supply panel is closed to connect the at least one of the another power panel and the supply panel and the interrupted power panel to the bus line.

In one embodiment, the at least one power supply source may include a first AC power source and a second AC power source that supply AC power, and a battery power source in which DC power is stored to supply the stored power to the plurality of power panels while the power supply is switched and restored when the power supply of the first AC power source and the second AC power source is interrupted.

In one embodiment, after the power supply is interrupted, the battery power source may supply the stored power to the plurality of power panels with no interruption until the power supply is switched and restored.

In one embodiment, the at least one power supply source may further include an emergency power source that supplies emergency power to the load when the power supply of the first AC power source, the second AC power source, and the battery power source is interrupted.

In one embodiment, each of the plurality of power panels may include at least one first power conversion device that converts power supplied from the at least one power supply source into the DC power, and a second power conversion device that converts the DC power supplied from the at least one first power conversion device into the driving power and supplies it to the load.

In one embodiment, the plurality of power panels may supply the DC power to the second power conversion device through any one of the at least one first power conversion device according to the state of the at least one power supply source.

In one embodiment, when the power supply of the conversion device that supplies the DC power to the second power conversion device is interrupted, the plurality of power panels may supply the DC power to the second power conversion device through another conversion device other than the conversion device.

In one embodiment, while the conversion device is switched to the other conversion device, the at least one first power conversion device may supply the DC power to the second power conversion device through a conversion device receiving power from the battery power source.

In one embodiment, a power supply source that supplies power to the supply panel may include at least the battery power source.

In one embodiment, the supply panel may include at least one first power conversion device that further receives power from the first AC power source and the second AC power source, and converts the power received from the at least one power source into the DC power.

In one embodiment, the supply panel may supply the DC power to the plurality of power panels through any one of the at least one first power conversion device according to the state of the at least one power supply source.

In one embodiment, the supply panel may be configured in plural, and a supply target for supplying the DC power among the plurality of power panels may be predetermined for each of the plurality of supply panels to supply the DC power to the predetermined supply target.

In one embodiment, the supply panel may be provided at a position where each of the plurality of power panels is separated within a predetermined distance.

In one embodiment, the plurality of circuit breakers may be closed when the DC power is connected between the power end and the bus line, and opened when the DC power is disconnected between the power end and the bus line.

In one embodiment, in the plurality of circuit breakers, when the power supply of at least one of the plurality of power panels is interrupted, a circuit breaker connected to the interrupted power panel, a circuit breaker connected to at least one power panel of the other power panels, and a circuit breaker connected to the supply panel may be closed to supply the DC power to the interrupted power supply from at least one of the other power panels and the supply panel through the bus line.

In one embodiment, the interrupted power panel may be supplied with the DC power from a conversion device connected to the battery power source until the power supply is interrupted, and the DC power conducted from the supply panel is supplied.

In one embodiment, in the plurality of circuit breakers, a circuit breaker connected to at least one of the other power panels and a circuit breaker connected to the supply panel may be closed to supply the DC power to the interrupted power panel from at least one of the other power panels and the supply panel through the bus line.

In one embodiment, the power supply system may further include a control device that monitors the state of at least one of the plurality of power panels, the supply panel, and the plurality of circuit breakers to control at least one of the plurality of power panels, the supply panel and the plurality of circuit breakers according to the monitoring result.

In addition, a power supply system having the above technical features as a problem solving means according to another embodiment of the present disclosure may include a plurality of power panels that convert power supplied from each of at least one power supply source into DC power, and convert the DC power into driving power for driving a load to supply the driving power to the load, a supply panel that converts power supplied from each of the at least one power supply source into the DC power according to the state of the plurality of power panels to supply the DC power to the plurality of power panels, a bus line connected in common to ends through which the DC power is input and output from each of the plurality of power panels and the supply panel to transfer the DC power converted by the plurality of power panels and the supply panel, a plurality of circuit breakers provided in electric circuits to which each of the power ends and the bus line are connected to control a connection between each of the plurality of power panels and the supply panel and the bus line, and a control device that controls the opening and closing of the plurality of circuit breakers according to the state of each of the plurality of power panels to control the reception and supply of the DC power to each of the plurality of power panels.

In one embodiment, the plurality of power panels may include at least one first power conversion device that converts power supplied from each of at least one power supply source into DC power, a second power conversion device that converts the DC power into driving power for driving a load to supply the driving power to the load, a circuit breaker provided between a power end to which the outputs of the at least one first power conversion device and an input end of the second power conversion device are commonly connected and a bus line connected to the power end to control a connection between the power end and the bus line, and a control unit that controls the opening and closing of the circuit breaker according to the state of the DC power or the driving power to controls the reception and supply of the DC power through the bus line.

In one embodiment, the control unit may select any one of the at least one first power conversion device according to the state of the at least one power supply source, and control the selected conversion device to transfer the DC power to each of the second power conversion devices.

In one embodiment, when an abnormality occurs in at least one of a conversion device that is transferring the DC power to the second power conversion device and a power supply source corresponding to the conversion device, the control unit may control another converter other than the conversion device to transfer the DC power to the second power conversion device.

In one embodiment, when an abnormality occurs in two or more of the at least one power supply source, the control unit may close the circuit breaker, and control the DC power to be supplied from another power supply device connected to the bus line through the bus line.

In one embodiment, when an abnormality occurs in another power supply device connected to the bus line, the control unit may close the circuit breaker, and control DC power to be supplied to the another power supply device through the bus line.

In one embodiment, the at least one power supply source may include a first AC power source and a second AC power source that supply AC power, and a battery power source that stores DC power.

In one embodiment, the at least one power supply source may further include an emergency power source that supplies emergency generation power to the load when an abnormality occurs in the first AC power source, the second AC power source, and the battery power source.

In one embodiment, the circuit breaker may be opened at normal times and closed during operation, thereby controlling a connection between the conversion device and the bus line.

In one embodiment, the plurality of power panels may select any one of at least one first power conversion device that converts the DC power according to the state of the at least one power supply source, and transfer the DC power to each of the second power conversion devices that convert the driving power through the selected converter.

In one embodiment, when an abnormality occurs in at least one of a conversion device that is transferring the DC power to the second power conversion device that converts the driving power and a power supply source corresponding to the conversion device, the plurality of power panels may transfer the DC power to the second power conversion device through another conversion device other than the conversion device.

In one embodiment, when an abnormality occurs in at least one of the plurality of power panels, the control device may close a circuit breaker of the abnormality occurred power panel and the supply panel, and control the abnormality occurred power panel to receive the DC power from the supply panel through the bus line.

In one embodiment, when the DC power is supplied to the abnormality occurred power panel, the supply panel may select any one of the at least one first power conversion device that converts the DC power according to the state of the at least one power supply source to transfer the DC power to the bus line through the selected conversion device.

In one embodiment, when an abnormality occurs in the supply panel, the control device may close a circuit breaker of a power panel most adjacent to the abnormality occurred power panel, and control the abnormality occurred power panel to receive the DC power from the adjacent power panel through the bus line.

In one embodiment, in the case of the plurality of the abnormality occurred power panels, the control device may close at least one circuit breaker of the supply panel and the power panel most adjacent to the abnormal occurred power panel according to an abnormal state of each of the abnormality occurred power panel, and control each of the abnormality occurred power panels to receive the DC power from at least one of the supply panel and the adjacent power panel through the bus line.

In one embodiment, the supply panel may be configured in plural, and a supply target for supplying the DC power may be predetermined among the plurality of power panels is predetermined to supply the DC power to the predetermined supply target.

In one embodiment, the supply panel may be provided at a position where each of the plurality of power panels is separated within a predetermined distance.

The power supply system according to the present disclosure as described above may be applied and implemented to a power supply device that supplies and uses DC power, a power supply system, and a method of operating the power supply system. In particular, it may be usefully applied and implemented to a DC UPS module and a power supply system having the same. However, the technology disclosed in this specification may not be limited thereto, and may be applied and implemented to all power devices, power supply devices, power control devices, power supply systems, power systems, power control systems, plant systems, plant control systems, plant control methods, energy storage systems, control methods or operation methods of the energy storage systems, and motor control panels that control a plurality of motor loads, motor control systems, motor operation systems, and the like.

A power supply system according to the present disclosure may control a circuit breaker of each of a plurality of power supply devices connected to each other to control the reception and supply of power, thereby having an effect capable of performing a UPS function between the plurality of power supply devices.

Furthermore, a power supply system according to the present disclosure may control a circuit breaker of each of a plurality of power supply devices connected to a power bus to control the reception and supply of power through the power bus, thereby having an effect capable of performing a UPS function between the plurality of power supply devices.

In addition, a power supply system according to the present disclosure may control a circuit breaker of each of the plurality of power supply devices connected to each other according to an occurrence situation to control the reception and supply of power, or control a circuit breaker of each of the plurality of power supply devices connected to a power bus according to an occurrence situation to control the reception and supply of power through the power bus, thereby having an effect capable of achieving efficient operation with a minimal means.

Accordingly, even when various abnormal situations occur on the system, there is an effect capable of maintaining power supply to a load without interruption.

In other words, the power supply system according to the present disclosure may have an effect capable of achieving an appropriate and stable power supply response to various abnormal situations occurring on the system.

Moreover, the power supply system according to the present disclosure may have an effect capable of increasing the stability, reliability, and usefulness of large-capacity system operation.

As a result, the power supply system according to the present disclosure may solve the foregoing problems, thereby having an effect capable of improving the limitations of the related art.

DETAILED DESCRIPTION

Figure 1:
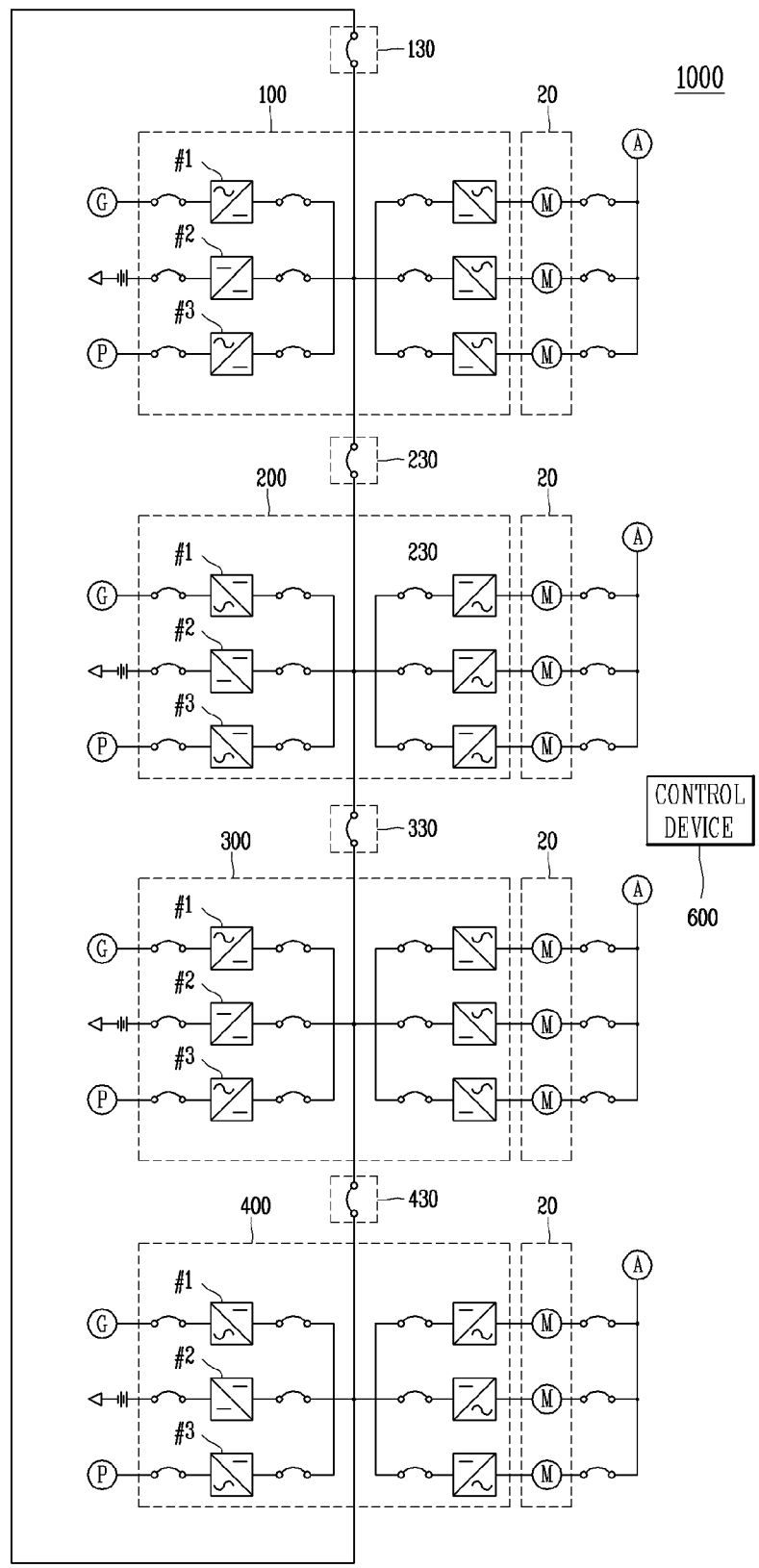
FIG. 1 is a block diagram 1 showing a configuration of a power supply system according to an embodiment of the present disclosure.

It should be noted that technological terms used herein are merely used to describe a specific embodiment, but not to limit the concept of the technology disclosed in the present specification. Also, unless particularly defined otherwise, technological terms used herein should be construed as a meaning that is generally understood by those having ordinary skill in the field to which the technology disclosed in the present specification belongs, and should not be construed too broadly or too narrowly. Furthermore, if technological terms used herein are wrong terms unable to correctly express the concept of the technology disclosed in the present specification, then they should be replaced by technical terms that are properly understood by those skilled in the art. In addition, general terms used in the present specification should be construed based on the definition of dictionary, or the context, and should not be construed too broadly or too narrowly.

In addition, the singular expression used in the present specification includes a plurality of expressions unless the context clearly indicates otherwise. In the present specification, the terms "comprising" and "including" should not be construed to necessarily include all of the elements or steps disclosed herein, and should be construed not to include some of the elements or steps thereof, or should be construed to further include additional elements or steps.

Hereinafter, the embodiments disclosed herein will be described in detail with reference to the accompanying drawings, and the same or similar elements are designated with the same numeral references regardless of the numerals in the drawings and their redundant description will be omitted.

In describing the technology disclosed herein, moreover, the detailed description will be omitted when specific description for publicly known technologies to which the invention pertains is judged to obscure the gist of the technology disclosed in the present specification. Also, it should be noted that the accompanying drawings are merely illustrated to easily explain the concept of the technology disclosed in the present specification, and therefore, they should not be construed to limit the concept of the technology by the accompanying drawings.

Hereinafter, an embodiment of a power supply system according to the present disclosure will be described.

The power supply system may be implemented in a combined or separate form of embodiments to be described below.

The power supply system may be a power supply system including a plurality of power supply devices.

The power supply system may include a plurality of packaged power devices to supply power.

Here, the power device may be a power panel in which a plurality of power control devices are packaged.

The power supply system 1000 (hereinafter, referred to as a system), as illustrated in FIG. 1, includes a plurality of power panels 100, 200, 300 and 400 that convert power supplied from at least one power supply source 10 into DC power, and convert the DC power into driving power of a load 20 to supply the driving power to the load 20, a DC electric circuit in which one end and the other end thereof are connected to connect each of power ends through which the DC power is input and output from each of the plurality of power panels 100, 200, 300 and 400, and conduct the DC power converted by the plurality of power panels 100, 200, 300 and 400, and a plurality of circuit breakers 130, 230, 330 and 430 respectively disposed between the power ends on the DC electric circuit to connect or separate the two power ends connected to the electric circuit disposed therein.

In the system 1000, the plurality of circuit breakers 130, 230, 330 and 430 are opened and closed differently in the operation state of at least one of the plurality of power panels 100, 200, 300 and 400 to connect or disconnect the DC power between the plurality of pow panels 100, 200, 300 and 400.

In the system 1000, when power supply is interrupted in at least one of the plurality of power panels 100, 200, 300 and 400, the plurality of circuit breakers 130, 230, 330 and 430 close at least one of the circuit breakers connected to a power end of the power panel in which the power supply is interrupted to connect at least one of the power ends of both sides of the power end of the interrupted power panel and the power end of the interrupted power panel.

In other words, in the system 1000, each of the plurality of power panels 100, 200, 300 and 400 is connected to the power ends of the two power panels through the DC electric circuit to receive the DC power from at least one of the two power panels when power supply is interrupted.

Furthermore, in the system 1000, when power supply is interrupted in at least one of the plurality of power panels 100, 200, 300 and 400, at least one of the plurality of circuit breakers 130, 230, 330 and 430 is closed to supply the DC power to the power panel in which the power supply is interrupted so as to connect at least one of the plurality of power panels 100, 200, 300 and 400.

Figure 2:
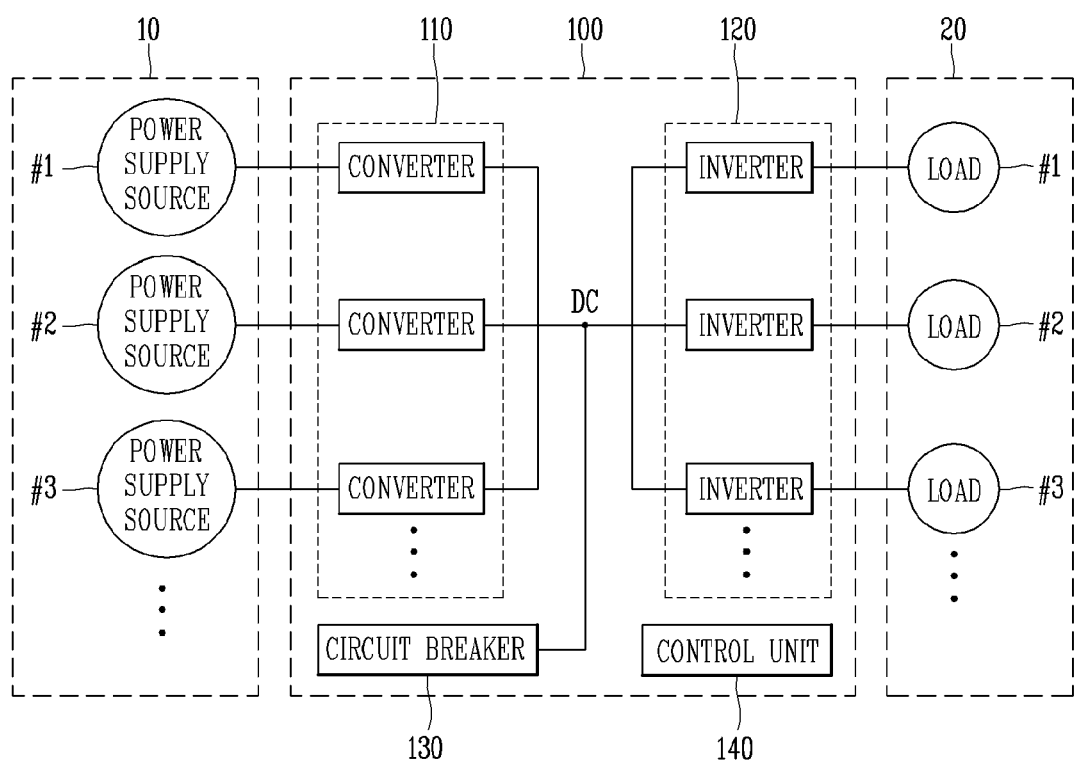
FIG. 2 is a block diagram showing a configuration of a power panel of a power supply system according to an embodiment of the present disclosure.
Figure 3:
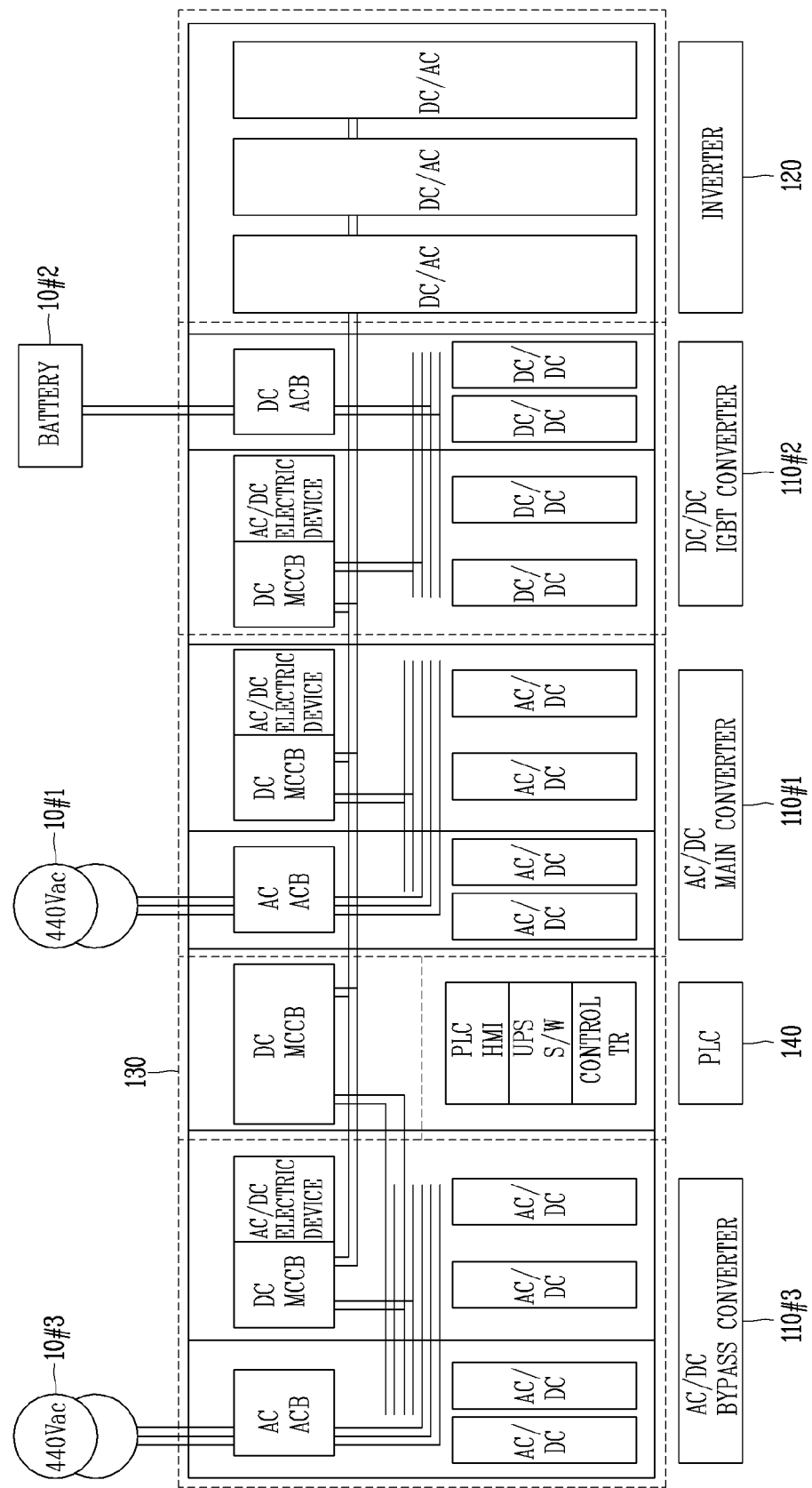
FIG. 3 is a block diagram showing a specific structural configuration of a power panel of a power supply system according to an embodiment of the present disclosure.

Here, each of the plurality of power panels 100, 200, 300 and 400 may be a power supply device 100 as illustrated in FIGS. 2 and 3.

In other words, the plurality of power panels 100, 200, 300 and 400 may be configured as a power supply device as illustrated in FIGS. 2 and 3, and the power supply system 1000 may include a plurality of power panels in the form of the power supply device 100 as illustrated in FIGS. 2 and 3, thereby including the plurality of power panels 100, 200, 300 and 400.

The plurality of power panels 100, 200, 300 and 400 may be a module including a plurality of power control devices.

The plurality of power panels 100, 200, 300 and 400 may be a power device in which the plurality of power control devices are packaged.

Here, each of the plurality of power panels 100, 200, 300 and 400 may be a power supply device 100 as illustrated in FIGS. 2 and 3.

In other words, the plurality of power panels 100, 200, 300 and 400 may be configured as a power supply device as illustrated in FIGS. 2 and 3, and the power supply system 1000 may include a plurality of power panels in the form of the power supply device 100 as illustrated in FIGS. 2 and 3, thereby including the plurality of power panels 100, 200, 300 and 400.

The plurality of power panels 100, 200, 300 and 400 may be a module including a plurality of power control devices.

The plurality of power panels 100, 200, 300 and 400 may be a power device in which the plurality of power control devices are packaged.

For instance, the plurality of power panels 100, 200, 300, 400 may be a power panel in which the plurality of power control devices are packaged.

The plurality of power panels 100, 200, 300 and 400 may be a package-type power panel provided in a building requiring high power such as a power plant, a plant, a factory, and an apartment to supply power.

The plurality of power panels 100, 200, 300 and 400 may also be a package-type power panel configured in any one space.

The plurality of power panels 100, 200, 300 and 400 may be packaged with the plurality of power control devices to supply power to a load.

The plurality of power panels 100, 200, 300 and 400, as illustrated in FIG. 2, may include at least one first power conversion device 110 that converts power supplied from each of the at least one power supply source 10 into DC power, and at least one second power conversion device 120 that converts the DC power into the driving power for driving the load 20 to supply the driving power to the load 20.

As such, the plurality of power panels 100, 200, 300 and 400 include the at least one first power conversion device 110 and second power conversion devices 120 to convert power supplied from the at least one power supply source 10 into the driving power and supply the driving power to the load 20.

A specific configuration of the plurality of power panels 100, 200, 300 and 400 including the at least one first power conversion device 110 and the second power conversion devices 120 may be illustrated as in FIGS. 2 and 3.

The at least one power supply source 10 that supplies power to the plurality of power panels 100, 200, 300 and 400 may be externally connected to the at least one first power conversion device 110 to supply power to each of the at least one first power conversion device 110.

Each of the at least one power supply source 10 may be connected to each of the at least one first power conversion device 110 to supply DC or AC power to each of the at least one first power conversion device 110.

The at least one power supply source 10 may include a first AC power source 10 #1 and a second AC power source 10 #3 that supply AC power, and a battery power source 10 #2 that stores DC power, as illustrated in FIGS. 2 and 3.

Here, the first AC power source 10 #1 may be a main system power source (G) that supplies AC power, the second AC power source 10 #3 may be a bypass system power source (P) that supplies AC power, and the battery power source 10 #2 may be a battery power source (B) that supplies DC power.

In other words, the at least one power supply source 10 may include a system power source (G), a bypass power source (P), and a battery power source (B), as illustrated in FIG. 4.

Accordingly, each of the plurality of power panels 100, 200, 300 and 400 may be supplied with power from each of the system power source (G), the bypass power source (P), and the battery power source (B).

The first AC power source 10 #1 may be a system power source (G).

The first AC power source 10 #1 may be a system power source (G) that supplies AC power of 440 [V].

The second AC power source 10 #3 may be a bypass power source (P).

The second AC power source 10 #3 may be a bypass power source (P) that supplies 440 [V] of AC power.

The battery power source 10 #2 may be an emergency battery source that stores DC power and supplies the stored DC power in an emergency.

The battery power source 10 #2 may supply stored DC power to the plurality of power panels 100, 200, 300 and 400 when an abnormality occurs in the first AC power source and the second AC power source.

The DC power may be stored in the battery power source (B), and when the power supply of the first AC power source 10 #1 and the second AC power source 10 #3 is interrupted, power stored in the battery power source (B) may be supplied to the plurality of power panels 100, 200, 300 and 400 while the power supply is switched and restored.

After the power supply is interrupted, the battery power source (B) may supply the stored power to the plurality of power panels 100, 200, 300 and 400 with no interruption until the power supply is switched and restored.

The at least one power supply source 10 may also further include an emergency power source (A) that supplies emergency generation power to the load 20 when the power supply of the first AC power source (G), the second AC power source (P), and the battery power source (B) is interrupted.

When an abnormality occurs in the first AC power source (G), the second AC power source (P) and the battery power source (B), the emergency power source (A) may supply emergency generation power to the load 20.

When an abnormality occurs in all of the first AC power source (G), the second AC power source (P), and the battery power source (B) that supply power to each of the plurality of power panels 100, 200, 300 and 400 so as not to supply power, the emergency power source (A) may be a power source that supplies emergency power to each of the loads 20 to maintain the driving of the load 20 for a predetermined period of time.

For instance, the emergency power source (A) may be a power source including an emergency generator.

Each of the plurality of power panels 100, 200, 300 and 400 may be preferably supplied with power from three power supply sources 10, which are the system power source (G), the bypass power source (P) and the battery power source (B) as illustrated in FIG. 4, and supplied with power only when the system power source (G), the bypass power source (P), and the battery power source (B) are unable to supply power from the emergency power source (A).

Here, each of the at least one power supply source 10 that supplies power to each of the plurality of power panels 100, 200, 300 and 400 may supply power to each of the plurality of power panels 100, 200, 300 and 400 in one system or supply power to each of the plurality of power panels 100, 200, 300 and 400 from each separate distribution panel through a separate distribution panel.

Each of the plurality of power panels 100, 200, 300 and 400 may include the at least one first power conversion device 110, 210, 310 and 410 that converts power supplied from the at least one power supply source 10 into the DC power, and the second power conversion device 120, 220, 320 and 420 that converts the DC power supplied from the at least one first power conversion device 110, 210, 310 and 410 into the driving power and supply the driving power to the load 20.

Here, the at least one first power conversion device 110, 210, 310 and 410 and second power conversion device 120, 220, 320 and 420 may be configured in plural.

Each of the plurality of power panels 100, 200, 300 and 400 may supply the DC power to at least one second power conversion device 120, 220, 320 and 420 through one of the at least one first power conversion device 110, 210, 310 and 410 according to the state of the at least one power supply source 10.

The first power conversion device 110, 210, 310 and 410, which is a device that converts supplied power into DC power, and may be a converter, for instance.

The first power conversion devices 110, 210, 310 and 410 may be an AC/DC converter that converts AC power into DC power, or a DC/DC converter that converts DC power into DC power.

The at least one first power conversion device 110, 210, 310 and 410 may include at least one of an AC/DC converter that converts AC power into DC power and a DC/DC converter that converts a level of DC power.

The at least one first power conversion device 110, 210, 310 and 410 may include three conversion devices 110 #1 to #3, 210 #1 to #3, 310 #1 to #3 and 410 #1 to #3 corresponding to the at least one power supply source 10, respectively.

The at least one first power conversion device 110, 210, 310 and 410 may include first to third conversion devices 110 #1 to #3, 210 #1 to #3, 310 #1 to #3 and 410 #1 to #3 connected to the first AC power source 10 #1, the battery power source 10 #2, and the second AC power source 10 #3, respectively, to receive power from the power supply sources connected thereto.

According to this, the first AC power source 10 #1 is connected to the first conversion device 110 #1, 210 #1, 310 #1 and 410 #1 to supply AC power to the first conversion device 110 #1, 210 #1, 310 #1 and 410 #1, and the battery power source 10 #2 is connected to the second conversion device 110 #2, 210 #2, 310 #2 and 410 #2 to supply DC power to the second conversion device 110 #2, 210 #2, 310 #2 and 410 #2, and the second AC power source 10 #3 is connected to the third conversion device 110 #3, 210 #3, 310 #3 and 410 #3 to supply AC power to the third conversion device 110 #3, 210 #3, 310 #3 and 410 #3.

The first conversion device 110 #1, 210 #1, 310 #1 and 410 #1 may be an AC/DC converter that converts AC power into DC power, and the second conversion device 110 #2, 210 #2, 310 #2 and 410 #2 may be a DC/DC converter that converts a level of DC power, and the third conversion device 110 #3, 210 #3, 310 #3 and 410 #3 may be an AC/DC converter that converts AC power into DC power.

Each of the at least one first power conversion device 110, 210, 310 and 410 may include an opening/closing element for opening and closing a connection at front and rear ends thereof, respectively.

The opening and closing element may be a switch provided at each of input and output ends of each of the at least one first power conversion device 110, 210, 310 and 410 to control power that is input and output from and to the at least one first power conversion device 110, 210, 310 and 410.

Here, the opening and closing element provided at the input end may be a circuit breaker that senses an overcurrent to cut off a circuit.

More specifically, an AC air circuit breaker (ACB) may be provided at the input ends of the first conversion device 110 #1, 210 #1, 310 #1 and 410 #1 and the third conversion device 110 #3, 210 #3, 310 #3 and 410 #3 that receive AC power from the first AC power source 10 #1 and the second AC power source 10 #3, and a DC molded case circuit breaker (MCCB) may be provided at an input end of the second conversion device 110 #2, 210 #2, 310 #2 and 410 #2 that receives DC power from the battery power source 10 #2.

The opening and closing element may open and close the connection of the at least one first power conversion device 110, 210, 310 and 410 according to the operation of the at least one first power conversion device 110, 210, 310 and 410.

For instance, when power is not supplied from the at least one power supply source 10, the opening and closing element provided at each of the input end and the output end is opened to separate the connection of the relevant conversion device.

In the at least one first power conversion device 110, 210, 310 and 410, the output end may be connected to one power end.

In other words, in the at least one first power conversion device 110, 210, 310 and 410, the output ends may be connected in common to the power end, and the DC power converted by the at least one first power conversion device 110, 210, 310 and 410 may flow therethrough.

Accordingly, the power end may be an electric circuit to which the output ends of the at least one first power conversion device 110, 210, 310 and 410 are connected in common to allow the DC power output from the at least one first power conversion device 110, 210, 310 and 410 to flow therethrough.

The power end may be connected to a power end of an adjacent power panel among the plurality of power panels 100, 200, 300 and 400 and an input end of the second power conversion device 120, 220, 320 and 420.

The power end may be connected to a power end of two adjacent power panels among the other power panels 100, 200, 300 or 400.

The power end is connected to a power end of two adjacent power panels among the other power panels 100, 200, 300 or 400 and an input end of each of the second power conversion devices 120, 220, 320 and 420 to transfer the DC power to the adjacent power panel through the power end, or transfer the DC power to the second power conversion device 120, 220, 320 and 420.

The power end may be connected to any two of the plurality of circuit breakers 130, 230, 330 and 430.

In other words, in the power end, a connection between the other power panels 100, 200, 300 or 400 may be controlled by any two circuit breakers connected to the power end.

Through this, the DC power transferred from the power end to the other power panels 100, 200, 300 or 400 or transferred from the other power panels 100, 200, 300 or 400 may be controlled by a circuit breaker connected to the power end.

In this way, the power end to which the output ends of the at least one first power conversion device 110, 210, 310 and 410 are connected in common may be connected to the power end of the adjacent power panel and the input end of the second power conversion device 120, 220, 320 and 420, thereby performing the transfer of the DC power converted and output from the at least one first power conversion device 110, 210, 310 and 410 through the power end.

The DC power converted and output from the at least one first power conversion device 110, 210, 310 and 410 may be transferred to the second power conversion device 120, 220, 320 and 420.

In the at least one first power conversion device 110, 210, 310 and 410, the first to third conversion devices 110 #1 to 110 #3, 210 #1 to 210 #3, 310 #1 to 310 #3 and 410 #1 to 410 #3 may be operated to supply the DC power to the second power conversion device 120, 220, 320 and 420.

When the power supply of the conversion devices 110 #1 to #3, 210 #1 to #3, 310 #1 to #3 and 410 #1 that supply the DC power to the second power conversion device 120, 220 320 and 420 is interrupted, the plurality of power panels 100, 200, 300 and 400 may supply the DC power to the second power conversion device 120, 220, 320 and 420 through another conversion device other than the conversion devices 110 #1 to #3, 210 #1 to #3, 310 #1 to #3 and 410 #1 to #3.

When the power supply of the conversion devices 110 #1 to #3, 210 #1 to #3, 310 #1 to #3 and 410 #1 to #3 that supply the DC power to the second power conversion device 120, 220, 320 and 420 is interrupted, the at least one first power conversion device 110, 210, 310 and 410 may supply the DC power to the second power conversion device 120, 220, 320 and 420 through the conversion device 110 #2, 210 #2, 310 #2 and 410 #2 that receives power from the battery power source 10 #2 while the conversion devices 110 #1 to #3, 210 #1 to #3, 310 #1 to #3 and 410 #1 to #3 are switched to the other conversion device.

Here, a case where the power supply of the conversion devices 110 #1 to #3, 210 #1 to #3, 310 #1 to #3 and 410 #1 to #3 is interrupted may be a case where an abnormal state is detected from at least one of the conversion devices 110 #1 to #3, 210 #1 to #3, 310 #1 to #3 and 410 #1 to #3, a supply source connected to the conversion devices 110 #1 to #3, 210 #1 to #3, 310 #1 to #3 and 410 #1 to #3, and a rating of the DC power.

For instance, when the rating of the DC power output from the first conversion device 110 #1, 210 #1, 310 #1 and 410 #1 is reduced below a predetermined reference while the first conversion device 110 #1, 210 #1, 310 #1 and 410 #1 connected to the first AC power source 10 #1 supplies the DC power to the second power conversion device 120, 220, 320 and 420, the third conversion device 110 #3, 210 #3, 310 #3 and 410 #3, which is a conversion device other than the first conversion device 110 #1, 210 #1, 310 #1 and 410 #1, may supply the DC power to the second power conversion device 120.

In this case, while the first conversion device 110 #1, 210 #1, 310 #1, and 410 #1 is switched to the third conversion device 110 #3, 210 #3, 310 #3 and 410 #3, the at least one first power conversion device 110, 210, 310 and 410 may supply the DC power to the second power conversion device 120, 220, 320 and 420 through the second conversion device 110 #2, 210 #2, 310 #2 and 410 #2 connected to the battery power supply source 10 #2.

In other words, when the supply of the DC power to the second power conversion device 120, 220, 320, 420 is interrupted, the second conversion device 110 #2, 210 #2, 310 #2, 410 #2 connected to the battery power source 10 #2 may supply the DC power to the second power conversion device 120, 220, 320, 420 until the supply of the DC power is switched and restored.

The second power conversion device 120, 220, 320 and 420 may be configured in plural.

The second power conversion device 120, 220, 320 and 420, which is a device that converts the supplied DC power into the driving power, may be an inverter, for instance.

When the load is a load driven by AC power, the second power conversion device 120, 220, 320 and 420 may be inverters that convert DC power transferred from the at least one first power conversion device 110, 210, 310 and 410 into AC driving power.

When the load is a load driven by DC power, the second power conversion device 120, 220, 320 and 420 may be inverters that convert DC power transferred from the at least one first power conversion device 110, 210, 310 and 410 into DC driving power.

The second power conversion device 120, 220, 320 and 420 may be provided in a number corresponding to that of the loads 20.

The load 20 may be configured in plural.

The second power conversion device 120, 220, 320 and 420 may include three or more second power conversion devices 120 #1 to #3, 220 #1 to #3, 320 #1 to #3 and 420 #1 to #3 to correspond to the loads 20.

Each of the second power conversion devices 120, 220, 320 and 420 may be connected to each of the loads 20 to supply the driving power to the connected load.

Each of the second power conversion devices 120, 220, 320 and 420 may include an opening/closing element for opening and closing a connection at a front end thereof.

The opening and closing element may be a switch provided at an input end of each of the second power conversion devices 120, 220, 320 and 420 to control power that is input to the second power conversion device 120, 220, 320 and 420.

Here, the opening and closing element provided at the input end may be a circuit breaker that senses an overcurrent to cut off a circuit.

The driving power converted and output by the second power conversion device 120, 220, 320 and 420 may be transferred to each of the loads 20.

Here, the loads 20 may include a motor (M) load.

In each of the plurality of power panels 100, 200, 300 and 400, a power end to which the DC power is input and output may be connected to each of the power ends of two adjacent power panels.

The plurality of power panels 100, 200, 300 and 400 may be configured in a loop structure in which one end and the other end thereof are connected, and a power end through which the DC power is input and output is connected to each of the plurality of power panels 100, 200, 300 and 400, and connected to the DC electric circuit through which the DC power converted by the plurality of power panels 100, 200, 300 and 400 is conducted.

The DC electric circuit may be a DC-only electric circuit connected to the plurality of power panels 100, 200, 300 and 400 from the outside of the plurality of power panels 100, 200, 300 and 400 to allow DC power converted by the plurality of power panels 100, 200, 300 and 400 to flow therethrough.

The DC electric circuit may denote a DC-only electric circuit to which two or more power supply sources are connected in common to transfer power.

The DC electric circuit may be an electric circuit in which an electric circuit connecting two power ends among the power ends is continuously connected.

The DC electric circuit may be configured in a form in which a plurality of electric circuits are connected.

The DC electric circuit may include a plurality of electric circuits connected in a ring structure.

The DC electric circuit may transfer DC power between power ends connected to both sides.

In other words, the DC electric circuit may be an electric circuit in which the plurality of electric circuits are connected in a loop structure.

Accordingly, the power ends of each of the plurality of power panels 100, 200, 300, and 400 connected to the DC electric circuit may form an outer-loop at an outside of the plurality of power panels 100, 200, 300 and 400.

The DC electric circuit may be connected to a plurality of DC power supply sources to transfer DC power supplied from the plurality of DC power supply sources.

For instance, the power ends (01 to 04) of each of the plurality of power panels 100, 200, 300 and 400 are connected to performing the transfer of the DC power between the plurality of power panels 100, 200, 300 and 400.

The DC electric circuit may preferably have a rating of the magnitude of DC power supplied from one conversion device or the magnitude of DC power supplied from two conversion devices.

In other words, the rating of the DC electric circuit may be a rating capable of performing the transfer of DC power supplied from the two conversion devices.

In the DC electric circuit, the DC power may flow according to the opening and closing of the plurality of circuit breakers 130, 230, 330 and 430.

In the DC electric circuit, the DC power may be conducted according to an opening and closing operation of the plurality of circuit breakers 130, 230, 330 and 430.

In the DC electric circuit, a DC electric circuit through which the DC power flows may be configured in a loop shape.

In other words, the power end of each of the plurality of power panels 100, 200, 300 and 400 may be connected to the DC electric circuit configured in the loop shape, thereby allowing the power end of each of the plurality of power panels 100, 200, 300 and 400 to be connected in a ring structure.

Accordingly, in the system 1000, a connection between the plurality of power panels 100, 200, 300 and 400 may be configured in a ring structure at an outside of the plurality of power panels 100, 200, 300 and 400.

The DC electric circuit may be configured with a number of electric circuits in which the power ends (01 to 04) of any one of the plurality of power panels 100, 200, 300 and 400 and the power ends (01 to 04) of two adjacent power panels are respectively connected.

For instance, the DC electric circuit may include a first electric circuit to which the first power panel 100 and the third power panel 300 are connected, a second electric circuit to which the first power panel 100 and the second power panel 200 are connected, a third electric circuit to which the third power panel 300 and the fourth power panel 400 are connected, and a fourth electric circuit to which the second power panel 200 and the fourth power panel 400 are connected In addition, and the first to fourth electric circuits may be configured in a loop shape.

Here, the first circuit breaker 130 may be provided in the first electric circuit, the second circuit breaker 230 in the second electric circuit, the third circuit breaker 330 in the third electric circuit, and the fourth circuit breaker 430 in the fourth electric circuit, respectively, to control the opening and closing of the first to fourth electric circuits.

Accordingly, the plurality of circuit breakers 130, 230, 330 and 430 may control a connection between the plurality of power panels 100, 200, 300 and 400 through the DC electric circuit in which the plurality of electric circuits are configured in a loop shape.

In the plurality of power panels 100, 200, 300 and 400, a power end of a power panel at one side and a power end of a power panel at the other side may be connected on the DC electric circuit, and thus a connection between the power ends may form a loop.

In the plurality of power panels 100, 200, 300 and 400, each of the plurality of circuit breakers 130, 230, 330 and 430 may be disposed between a power end of any one power panel and power ends of two adjacent power panels, respectively.

A power end of each of the plurality of power panels 100, 200, 300 and 400 may be connected to the plurality of circuit breakers 130, 230, 330 and 430.

In each of the plurality of power panels 100, 200, 300 and 400, the power end may be connected to any two of the plurality of circuit breakers 130, 230, 330 and 430.

In other words, the power end of each of the plurality of power panels 100, 200, 300 and 400 may be connected to two circuit breakers 130, 230, 330 and 430.

For instance, when the number of the plurality of power panels 100, 200, 300 and 400 are four as illustrated in FIG. 1, the first power panel 100 may be connected to the first circuit breaker 130 and the second circuit breaker 230, the second power panel 200 to the second circuit breaker 230 and the third circuit breaker 330, and the third power panel 300 to the third circuit breaker 330 and the fourth circuit breaker 430, and the fourth power panel 400 to the fourth circuit breaker 430 and the first circuit breaker 130.

Accordingly, each of the plurality of circuit breakers 130, 230, 330 and 430 may be connected to two power panels.

For instance, the first circuit breaker 130 may be connected to the first power panel 100 and the fourth power panel 400, the second circuit breaker 230 to the first power panel 100 and the second power panel 200, the third circuit breaker 330 to the second power panel 200 and the third power panel 300, and the fourth circuit breaker 430 to the third power panel 300 and the fourth power panel 400, respectively.

In the plurality of power panels 100, 200, 300 and 400, a power end of any one power panel may be connected to each of the power ends of the other two power panels.

In other words, the plurality of power panels 100, 200, 300 and 400 may be connected to each of the other two power panels.

For instance, the first power panel 100 may be connected to the fourth power panel 400 through the first circuit breaker 130, and connected to the second power panel 200 through the second circuit breaker 230, and thus may be connected to each of the second and fourth power panels 200 and 400.

Furthermore, the second power panel 200 may be connected to the first power panel 100 through the second circuit breaker 230, and connected to the third power panel 300 may be connected to the third power panel 300 through the third circuit breaker 330, and thus may be connected to each of the first and third power panels 100 and 300.

Furthermore, the third power panel 300 may be connected to the second power panel 200 through the third circuit breaker 330, and connected to the fourth power panel 400 through the fourth circuit breaker 430, and thus may be connected to each of the second and fourth power panels 200 and 400.

Furthermore, the fourth power panel 400 may be connected to the third power panel 300 through the fourth circuit breaker 430, and connected to the first power panel 100 through the first circuit breaker 130, and thus may be connected to each of the first and third power panels 100 and 300.

Each of the plurality of circuit breakers 130, 230, 330 and 430 may be included in each of the plurality of power panels 100, 200, 300 and 400.

The plurality of circuit breakers 130, 230, 330 and 430 connected to the power end may be DC circuit breakers that cut off DC power.

Each of the power ends may be connected to any two of the plurality of circuit breakers 130, 230, 330 and 430.

The plurality of circuit breakers 130, 230, 330 and 430 may be disposed on each of the electric circuits between the power ends of the two adjacent power power panels among the power ends to control a connection between the plurality of power panels 100, 200, 300 and 400.

The plurality of circuit breakers 130, 230, 330 and 430 may be disposed on each of the electric circuits in which two adjacent power ends are connected to each other among the power ends to which the output ends of each of the at least one first power conversion device 110, 210, 310 and 410 are connected in the plurality of power panels 100, 200, 300 and 400.

In other words, the plurality of circuit breakers 130, 230, 330 and 430 may be provided between the power ends to control a connection between the plurality of power panels 100, 200, 300 and 400.

Accordingly, the plurality of power panels 100, 200, 300 and 400 are connected to each other through the plurality of circuit breakers 130, 230, 330 and 430, and a connection between the plurality of power panels 100, 200, 300 and 400 may be controlled by the opening and closing of the plurality of circuit breakers 130, 230, 330 and 430.

The plurality of circuit breakers 130, 230, 330 and 430 may be DC-only molded case circuit breakers (MCCBs).

The plurality of circuit breakers 130, 230, 330 and 430 may be opened and closed differently according to the state of at least one of the DC power, the driving power, the at least one first power conversion device 110, 210, 310 and 410, and the load 20 to connect or disconnect the DC power between the plurality of power panels 100, 200, 300 and 400.

Here, the at least one state may be at least one of when the DC power is changed from its initial state, when the driving power is changed from its initial state, when the operation state of the at least one first power conversion device 110, 210, 310 and 410 is changed, and when the driving state of the load 20 is changed.

For instance, the at least one state may include when the DC power or the driving power falls below a reference rating, when a failure/accident occurs in the at least one first power conversion device 110, 210, 310 and 410 to change the operation state, or when the driving power supplied to the load 20 is reduced to change the driving state of the load 20.

The plurality of circuit breakers 130, 230, 330 and 430 may be provided with a number corresponding to the plurality of power panels 100, 200, 300 and 400.

The plurality of circuit breakers 130, 230, 330 and 430 may be provided with a number of N when the number of plurality of power panels 100, 200, 300 and 400 is N.

For instance, when the number of the plurality of power panels 100, 200, 300 and 400 is four, that is, when N is 4, four power panels may be provided.

Each of the plurality of circuit breakers 130, 230, 330 and 430 may be opened at normal times and closed during operation, thereby controlling to a connection between the plurality of power panels 100, 200, 300 and 400.

Accordingly, each of the plurality of power panels 100, 200, 300 and 400 may be connected to other power panels through the opening and closing of each of the plurality of circuit breakers 130, 230, 330 and 430.

The plurality of circuit breakers 130, 230, 330 and 430 may be closed when the DC power is connected between the plurality of power panels 100, 200, 300 and 400, and may be opened when the DC power is disconnected between the plurality of power panels 100, 200, 300 and 400.

A form in which each of the plurality of power panels 100, 200, 300 and 400 is connected to another power panel through the plurality of circuit breakers 130, 230, 330 and 430 may be as illustrated in FIG. 1.

In the plurality of power panels 100, 200, 300 and 400, each of the power ends through which the DC power is input and output may be connected to each of the power ends of two adjacent power panels, and a power end of a power panel at one side and a power supply end of a power panel at the other side are connected, thereby allowing a connection between the power ends to be continuous.

The plurality of power panels 100, 200, 300 and 400 have a continuous connection between the power ends, and thus a connection between the plurality of power panels 100, 200, 300 and 400 may form an outer-loop structure.

In other words, in the system 1000, the plurality of power panels 100, 200, 300 and 400 may be connected in a loop structure.

In the system 1000, when the first power panel 100, the second power panel 200, the third power panel 300, and the fourth power panel 400 are connected in order, a power end of the first power panel 100 corresponding to the one side and a power end of the fourth power panel 400 corresponding to the other side may be connected, thereby allowing a connection between the power ends to form a loop.

Figure 4A:
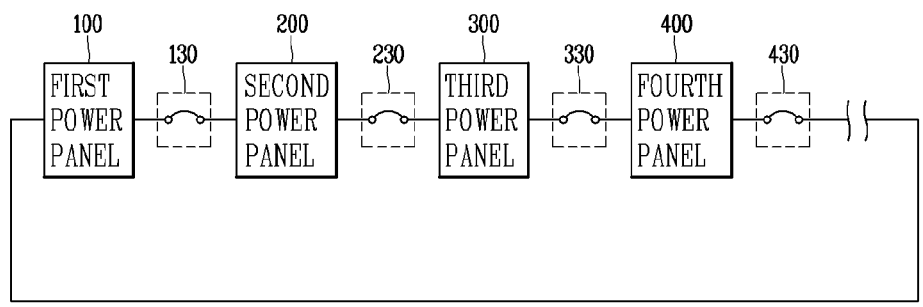
FIGS. 4A and 4B are exemplary views 1 and 2 showing a connection structure of a power panel of a power supply system according to an embodiment of the present disclosure.

The connection form will be described in more detail with reference to FIG. 4A as follows.

The first power panel 100 may be connected to the DC electric circuit and connected to the second power panel 200 and the fourth power panel 400 adjacent to each other, and the first circuit breaker 130 may be provided between the first and second power panels 100 and 200, and the fourth circuit breaker 430 may be provided between the first and fourth power panels 100 and 400, and a connection between the first and second power panels 100 and 200 may be controlled by the circuit breaker 130 of the first power panel 100, and a connection between the first and fourth power panels 100 and 400 may be controlled by the circuit breaker 430 of the fourth power panel 400.

The second power panel 200 may be connected to the DC electric circuit and connected to the first power panel 100 and the third power panel 300 adjacent to each other, and the first circuit breaker 130 may be provided between the first and second power panels 100 and 200, and the second circuit breaker 230 may be provided between the second and third power panels 200 and 300, and a connection between the first and second power panels 100 and 200 may be controlled by the circuit breaker 130 of the first power panel 100, and a connection between the second and third power panels 200 and 300 may be controlled by the circuit breaker 230 of the second power panel 200.

The third power panel 300 may be connected to the DC electric circuit and connected to the second power panel 200 and the fourth power panel 400 adjacent to each other, and the second circuit breaker 230 may be provided between the second and third power panels 200 and 300, and the third circuit breaker 330 may be provided between the third and fourth power panels 300 and 400, and a connection between the second and third power panels 200 and 300 may be controlled by the circuit breaker 230 of the second power panel 200, and a connection between the third and fourth power panels 300 and 400 may be controlled by the circuit breaker 330 of the third power panel 300.

The fourth power panel 100 may be connected to the DC electric circuit and connected to the third power panel 300 and the first power panel 100 adjacent to each other, and the third circuit breaker 330 may be provided between the third and fourth power panels 300 and 400, and the fourth circuit breaker 430 may be provided between the first and fourth power panels 100 and 400, and a connection between the third and fourth power panels 300 and 400 may be controlled by the circuit breaker 330 of the third power panel 300, and a connection between the first and fourth power panels 100 and 400 may be controlled by the circuit breaker 430 of the fourth power panel 400.

Figure 4B:
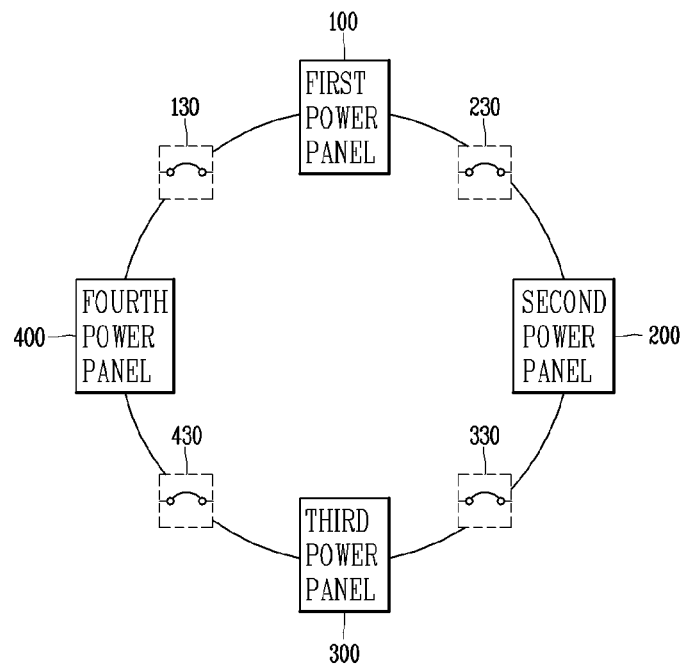

As the first to fourth power panels 100, 200, 300 and 400 are connected in this way, the plurality of power panels 100, 200, 300 and 400 may be connected in a loop shape as illustrated in FIG. 4B.

In this way, each of the plurality of power panels 100, 200, 300 and 400 may be connected to an adjacent power panel to form a loop shape, thereby performing the transfer of the DC power between the plurality of power panels 100, 200, 300 and 400.

In other words, each of the plurality of power panels 100, 200, 300 and 400 may be connected to an adjacent power panel to form a loop shape as illustrated in FIG. 4B, and as a result, the first power panel 100 may be connected to the second power panel 200 and the fourth power panel 400 to receive and supply the DC power from and to the second power panel 200 or the fourth power panel 400, and the second power panel 200 may be connected to the first power panel 100 and the third power panel 300 to receive and supply the DC power from and to the first power panel 100 or the third power panel 300, and the third power panel 300 may be connected to the second power panel 200 and the fourth power panel 400 to receive and supply the DC power from and to the second power panel 200 or the fourth power panel 400, and the fourth power panel 400 may be connected to the third power panel 300 and the first power panel 100 to receive and supply the DC power from and to the third power panel 300 or the first power panel 100.

In the plurality of power panels 100, 200, 300 and 400 connected in a loop shape as described above, the reception and supply of the DC power between the plurality of power panels 100, 200, 300 and 400 may be performed by opening and closing each of the plurality of circuit breakers 130, 230, 330 and 430.

For instance, the reception and supply of the DC power between the first power panel 100 and the second power panel 200 may be performed when the first circuit breaker 130 connected to an electric circuit between the first power panel 100 and the second power panel 200 is closed, and the reception and supply of the DC power between the second power panel 200 and the third power panel 300 may be performed when the second circuit breaker 230 connected to an electric circuit between the second power panel 200 and the third power panel 300 is closed, and the reception and supply of the DC power between the third power panel 300 and the fourth power panel 400 may be performed when the third circuit breaker 330 connected to an electric circuit between the third power panel 300 and the fourth power panel 400 is closed, and the reception and supply of the DC power between the fourth power panel 400 and the first power panel 100 may be performed when the fourth circuit breaker 430 connected to an electric circuit between the fourth power panel 400 and the first power panel 100 is closed.

Each of the plurality of power panels 100, 200, 300 and 400 may control and monitor the operation of the at least one first power conversion device 110, 210, 310 and 410 and the second power conversion device 120, 220, 320 and 420 included therein.

Each of the plurality of power panels 100, 200, 300 and 400 may control the opening and closing of each of the first to fourth circuit breakers 130a to 130d according to a result of controlling and monitoring the operation of the at least one first power conversion device 110, 210, 310 and 410 and the second power conversion device 120, 220, 320 and 420 included therein.

Each of the plurality of power panels 100, 200, 300 and 400 may control and monitor the operation of the at least one first power conversion device 110, 210, 310 and 410 and the second power conversion device 120, 220, 320 and 420 included therein to detect the state of the DC power and the driving power.

Each of the plurality of power panels 100, 200, 300 and 400 may receive power from any one of the at least one power supply source 10 to convert the power into the DC power.

In other words, each of the plurality of power panels 100, 200, 300 and 400 may be selectively supplied with power from any one of the at least one power supply source 10.

Each of the plurality of power panels 100, 200, 300 and 400 may receive power from any one of the at least one power supply source 10 according to a preset supply criterion to convert the power into the DC power.

The supply criterion may be a criterion for priority of power supply of the at least one power supply source 10.

The plurality of power panels 100, 200, 300 and 400 may select any one of the at least one first power conversion device 110, 210, 310 and 410 according to the state of the at least one power supply source 10 to transfer the DC power to the second power conversion device 120, 220, 320 and 420 through the selected conversion device.

Each of the plurality of power panels 100, 200, 300 and 400 may transfer the DC power to the second power conversion device 120, 220, 320 and 420 through one conversion device selected according to the state of the at least one power supply source 10.

When an abnormality occurs in at least one of a conversion device that is transferring the DC power to the second power conversion device 120, 220, 320 and 420 that converts the driving power and a power supply source corresponding to the conversion device, the plurality of power panels 100, 200, 300 and 400 may transfer the DC power to the second power conversion device 120, 220, 320 and 420 through a conversion device other than the conversion device.

In other words, when an abnormality occurs in at least one of a conversion device that is transferring the DC power and a power supply source corresponding to the conversion device, each of the plurality of power panels 100, 200, 300 and 400 may switch it to another conversion device other than the conversion device to transfer the DC power to the second power conversion device 120, 220, 320 and 420 through the switched conversion device.

When an abnormality occurs in at least one of a conversion device that is transferring the DC power and a power supply source corresponding to the conversion device, the plurality of power panels 100, 200, 300 and 400 may switch the power supply source that is supplying power and the conversion device to allow a conversion device other than the conversion device to transfer the DC power to the second power conversion device 120, 220, 320 and 420.

When the power supply of at least one of the plurality of power panels 100, 200, 300 and 400 is interrupted, the plurality of circuit breakers 130, 230, 330 and 430 may close at least one circuit breaker disposed between the power panel in which the power supply is interrupted and a power panel adjacent to the interrupted power panel to connect the interrupted power panel and the adjacent power panel, thereby allowing the DC power to be supplied from the adjacent power panel to the interrupted power panel.

In this case, the interrupted power panel may be supplied with the DC power from a conversion device connected to the battery power source (B) until the power supply is interrupted, and the DC power conducted from the adjacent power panel is supplied.

The foregoing system 1000 may further include a control device 600 that monitors the state of at least one of the plurality of power panels 100, 200, 300 and 400 and the plurality of circuit breakers 130, 230, 330 and 430 to control at least one of the plurality of power panels 100, 200, 300 and 400 and the plurality of breakers 130, 230, 330 and 430 according to the monitoring result.

In other words, the plurality of power panels 100, 200, 300 and 400 may be controlled by the control device 600.

Each of the plurality of power panels 100, 200, 300 and 400 may communicate with the control device 600 to operate according to a result of communication with the control device 600.

For instance, each of the plurality of power panels 100, 200, 300 and 400 may receive a control command from the control device 600 to operate according to the control command, or to transfer state information to the control device 600.

Each of the plurality of power panels 100, 200, 300 and 400 may request the control of the opening and closing of each of the plurality of circuit breakers 130, 230, 330 and 430 to the control device 600 according to a result of controlling and monitoring the operation of the at least one first power conversion device 110, 210, 310 and 410 and the second power conversion device 120, 220, 320 and 420 included therein.

Each of the plurality of power panels 100, 200, 300 and 400 may transfer a result of controlling and monitoring the operation of the at least one first power conversion device 110, 210, 310 and 410 and the second power conversion device 120, 220, 320 and 420 included therein to the control device 600.

Each of the plurality of power panels 100, 200, 300 and 400 may control and monitor the operation of the at least one first power conversion device 110, 210, 310 and 410 and the second power conversion device 120, 220, 320 and 420 included therein to transfer a result of detecting the state of the DC power and the driving power to the control device 600.

Here, each of the plurality of power panels 100, 200, 300 and 400 may further include a control unit 140, 240, 340 and 440 that controls the at least one first power conversion device 110, 210, 310 and 410 and the second power conversion device 120, 220, 320 and 420, and monitors an abnormal state of at least one of the at least one power supply source 10, the at least one first power conversion device 110, the DC power, the driving power, and the load 20.

The control unit 140, 240, 340 and 440 may be a central control device of the plurality of power panels 100, 200, 300 and 400.

The control unit 140, 240, 340 and 440 may include a plurality of control elements for controlling the plurality of power panels 100, 200, 300 and 400.

The control unit 140, 240, 340 and 440 may further include a plurality of electronic devices for performing a function of the plurality of power panels 100, 200, 300 and 400.

For instance, the control unit 140, 240, 340 and 440 may include at least one of a storage element that stores software/applications/programs for performing and controlling a function of the plurality of power panels 100, 200, 300 and 400, a dedicated control element including the storage element, a communication element, a display element, and an input element.

The control unit 140, 240, 340 and 440 may control the at least one first power conversion device 110, 210, 310 and 410, the second power conversion device 120, 220, 320 and 420, and the plurality of circuit breakers 130, 230, 330 and 430.

The control unit 140, 240, 340 and 440 may include a programmable logic controller (PLC) that controls the at least one first power conversion device 110, 210, 310 and 410, the second power conversion device 120, 220, 320 and 420, and the plurality of circuit breakers 130, 230, 330 and 430.

The control unit 140, 240, 340 and 440 may monitor the state of the at least one first power conversion device 110, 210, 310 and 410, the second power conversion device 120, 220, 320 and 420, and the plurality of circuit breakers 130, 230, 330 and 430, and control the operation of the at least one first power conversion device 110, 210, 310 and 410, the second power conversion device 120, 220, 320 and 420, and the plurality of circuit breakers 130, 230, 330 and 430 based on a result of monitoring.

The control unit 140, 240, 340 and 440 may also control the operation of the at least one first power conversion device 110, 210, 310 and 410, the second power conversion device 120, 220, 320 and 420, and the plurality of circuit breakers 130, 230, 330 and 430 based on the state of the at least one power supply source 10 and the load 20.

The control unit 140, 240, 340 and 440 may control the operation of each of the at least one first power conversion device 110, 210, 310 and 410 to control the conversion and supply of the DC power.

For instance, the operation of a control target conversion device among the at least one first power conversion device 110, 210, 310 and 410 may be controlled to control the conversion and supply of the DC power to the second power conversion device 120, 220, 320 and 430 through the control target conversion device.

The control unit 140, 240, 340 and 440 may also control the opening and closing of each opening and closing element included in the at least one first power conversion device 110, 210, 310 and 410.

The control unit 140, 240, 340 and 440 may control the operation of each of the second power conversion devices 120, 220, 320 and 420 to control the conversion and supply of the driving power.

For instance, the operation of a control target conversion device among the second power conversion device 120, 220, 320 and 420 may be controlled to control the conversion and supply of the driving power to the load 20 through the control target conversion device.

The control unit 140, 240, 340 and 440 may also control the opening and closing of each of the opening and closing element included in the second power conversion device 120, 220, 320 and 420.

The control unit 140, 240, 340 and 440 may control the operation of the plurality of circuit breakers 130, 230, 330 and 430 to control the reception and supply of the DC power.

For instance, the plurality of circuit breakers 130, 230, 330 and 430 may be closed to control the reception of the DC power from the other power panel 200, 300 or 400, or the supply of the DC power to the other power panel 200, 300 or 400.

The control unit 140, 240, 340 and 440 may also perform communication with at least one of an external communication device and a control device to control the operation of the at least one first power conversion device 110, 210, 310 and 410, the second power conversion device 120, 220, 320 and 420, and the plurality of circuit breakers 130, 230, 330 and 430 according to a result of performing the communication.

For instance, a control command for the operation control of at least one first power conversion device 110, 210, 310 and 410, the second power conversion device 120, 220, 320 and 420, and the plurality of circuit breakers 130, 230, 330 and 430 may be received from the control device to control the operation of the at least one first power conversion device 110, 210, 310 and 410, the second power conversion device 120, 220, 320 and 420, and the plurality of circuit breakers 130, 230, 330 and 430 according to the control command.

The control unit 140, 240, 340 and 440 may receive power from any one of the at least one power supply source 10 to control the conversion of the power into the DC power.

In other words, the control unit 140, 240, 340 and 440 may control to selectively receive power from any one of the at least one power supply source 10.

The control unit 140, 240, 340 and 440 may receive power from any one of the at least one power supply source 10 according to a preset supply criterion to control the conversion of the power into the DC power.

The supply criterion may be a criterion for priority of power supply of the at least one power supply source 10.

For instance, the priority may be set in the order of the first AC power source 10 #1, the second AC power source 10 #3, and the battery power source 10 #2.

When the supply criterion is as described above, the control unit 140, 240, 340 and 440 may control the supply of power in the order of the first AC power source 10 #1, the second AC power source 10 #3, and the battery power source 10 #2.

When power is supplied from the first AC power source 10 #1, the control unit 140, 240, 340 and 440 may control the operation of the first conversion device 110 #1 connected to the first AC power source 10 #1.

In this case, the control unit 140, 240, 340 and 440 may close the opening and closing element of the first conversion device 110 #1, and open the opening and closing element of the second conversion device 110 #2 and the third conversion device 110 #3 to connect the first conversion device 110 #1 and separate the second conversion device 110 #2 and the third conversion device 110 #3.

When power is supplied from the second AC power source 10 #3, the control unit 140, 240, 340 and 440 may control the operation of the third conversion device 110 #3 connected to the second AC power source 10 #3.

In this case, the control unit 140, 240, 340 and 440 may close the opening and closing element of the third conversion device 110 #3, and open the opening and closing element of the first conversion device 110 #1 and the second conversion device 110 #2 to connect only the third conversion device 110 #3 and separate the first conversion device 110 #1 and the second conversion device 110 #2.

When power is supplied from the battery power source 10 #2, the control unit 140, 240, 340 and 440 may control the operation of the second conversion device 110 #2 connected to the battery power source 10 #2.

In this case, the control unit 140, 240, 340 and 440 may close the opening and closing element of the second conversion device 110 #2, and open the opening and closing element of the first conversion device 110 #1 and the third conversion device 110 #3 to connect only the second conversion device 110 #2 and separate the first conversion device 110 #1 and the third conversion device 110 #3.

The control unit 140, 240, 340 and 440 may select any one of the at least one first power conversion device 110, 210, 310 and 410 according to the state of the at least one power supply source 10 to allow the selected conversion device to transfer the DC power to the second power conversion device 120, 220, 320 and 420.

In other words, the control unit 140, 240, 340 and 440 may convert the DC power through one conversion device selected from the at least one first power conversion device 110, 210, 310 and 410 to transfer the converted DC power to the second power conversion device 120, 220, 320 and 420.

For instance, when an abnormality occurs in the first AC power source 10 #1 and the second AC power 10 #3 among the at least one power supply source 10, the second conversion device 10 #2 connected to the battery power source 10 #2 may be selected to control the second conversion device 110 #2 to receive power from the battery power source 10 #2 and convert it into the DC power, and transfer the DC power to each of the second power conversion devices 120, 220, 320 and 420.

When an abnormality occurs in at least one of a conversion device that is transferring the DC power and a power supply source 10 corresponding to the conversion device, the control unit 140, 240, 340 and 440 may control a conversion device other than the conversion device to transfer the DC power to the second power conversion device 120, 220, 320 and 420.

When an abnormality occurs in at least one of a conversion device that is transferring the DC power and a power supply source 10 corresponding to the conversion device, the control unit 140, 240, 340 and 440 may switch the power supply source 10 that is supplying power and the conversion device 110 to allow a conversion device other than the conversion device to transfer the DC power to the second power conversion device 120, 220, 320 and 420.

For example, when the first converter 110 #1 fails or when a shutdown occurs in the first AC power source 10 #1 while receiving power from the first AC power source 10 #1 to convert the power into the DC power through the first conversion device 110 #1, the first AC power source 10 #1 that is supplying power may be switched to the second AC power source 10 #3, and the first conversion device 110 #1 may be switched to the third conversion device 110 #3 to receive power from the second AC power source 10 #3 to allow the third conversion device 110 #3 to convert the DC power to transfer the DC power to the second power conversion device 120.

In this way, the control unit 140, 240, 340 and 440 that controls the at least one first power conversion device 110, 210, 310 and 410, the second power conversion device 120, 220, 320 and 420, and the plurality of circuit breakers 130, 230, 330 and 430 controls the opening and closing of the plurality of circuit breakers 130, 230, 330 and 430 according to the state of the DC power or the driving power to control the reception and supply of the DC power through the other power panel 100, 200, 300 or 400.

For example, when the magnitude of the driving power is less than the required magnitude of the load 20, or when the DC power is insufficient, the plurality of circuit breakers 130, 230, 330 and 430 may be closed to receive the DC power from the other power panel 100, 200, 300 or 400.

Alternatively, when the magnitude of the driving power is greater than the required magnitude of the load 20, or when the DC power is sufficient, the plurality of circuit breakers 130, 230, 330 and 430 may be closed to supply the DC power to the other power panel 100, 200, 300 or 400.

In the opposite case, when a fault current flows to the output end due to a failure occurring in the at least one first power conversion device 110, 210, 310 and 410 or the second power conversion device 120, 220, 320 and 420, or the fault current flows to the power end due to an abnormality occurring in the at least one power supply source 10 or the load 20, the plurality of circuit breakers 130, 230, 330 and 430 may be opened to prevent the fault current from being supplied to the other power panel 100, 200, 300 or 400.

When an abnormality occurs in two or more of the at least one power supply source 10, the control unit 140, 240, 340 and 440 may close the plurality of breakers 130, 230, 330 and 430 to receive the DC power from the other power panel 100, 200, 300 or 400 connected to the output end.

When an abnormality occurs in the other power panel 200, 300 or 400 connected to the power end, the control unit 140, 240, 340 and 440 may close the plurality of circuit breakers 130, 230, 330 and 430 to supply DC power to the other power panel 100, 200, 300 or 400.

When an abnormality occurs in the other power supply unit 100, 200, 300 or 400 connected to the power end, the control unit 140, 240, 340 and 440 may control power to be further supplied from any one of the at least one power supply source 10, and close the plurality of circuit breakers 130, 230, 330 and 430 to supply the DC power converted by the supply source 10 controlled to further supply power and a conversion device corresponding thereto to be supplied to the other power panel 100, 200, 300 or 400, through the power end.

For instance, when an abnormality occurs in the other power panels 100, 200, 300 and 400 while receiving power from the first AC power source 10 #1 among the at least one power supply source 10, the plurality of circuit breakers 130, 230, 330 and 430 may be closed to control the third conversion device 110 #3 to further receive power from the second AC power source 10 #3 so as to supply the DC power converted by the third conversion device 110 #3 to the other power panel 100, 200, 300 or 400 connected to the output end.

When an abnormality occurs in the at least one power supply source 10, the control unit 140, 240, 340 and 440 may close the plurality of circuit breakers 130, 230, 330 and 430 to request control to the control device 600 so as to receive the DC power from the other power panel 100, 200, 300 or 400 connected to the power end.

When an abnormality occurs in the other power panel 100, 200, 300 or 400 connected to the power end, the control unit 140, 240, 340 and 440 may close the plurality of circuit breakers 130, 230, 330 and 430 to request control to the control device 600 so as to supply DC power to the other power panel 100, 200, 300 or 400.

When an abnormality occurs in the other power supply unit 100, 200, 300 or 400 connected to the power end, the control unit 140, 240, 340 and 440 may control power to be further supplied from any one of the at least one power supply source 10, and close the plurality of circuit breakers 130, 230, 330 and 430 to request control to the control device 600 to supply the DC power converted by the supply source 10 controlled to further supply power and the conversion device 110, 210, 310 and 410 corresponding thereto to be supplied to the other power panel 100, 200, 300 or 400, through the power end.

The control device 600 may control the operation of the plurality of circuit breakers 130, 230, 330 and 430 to control the reception and supply of the DC power.

For instance, the plurality of circuit breakers 130, 230, 330 and 430 may be closed to control the reception of the DC power between the plurality of power panels 200, 200, 300 and 400, or the supply of the DC power.

The control device 600 may communicate with each of the plurality of power panels 100, 200, 300 and 400 to control each of the plurality of power panels 100, 200, 300 and 400 based on state information received from each of the plurality of power panels 100, 200, 300 and 400.

For instance, according to the state information of the DC power and the driving power received from each of the plurality of power panels 100, 200, 300 and 400, the conversion and supply of the DC power of each of the plurality of power panels 100, 200, 300 and 400, and the conversion and supply of the driving power of each of the plurality of power panels 100, 200, 300 and 400 may be controlled.

The control device 600 may communicate with each of the plurality of power panels 100, 200, 300 and 400 to convert and supply the driving power to each of the plurality of power panels 100, 200, 300 and 400, or control the plurality of circuit breakers 130, 230, 330 and 430 based on the state information received from each of the plurality of power panels 100, 200, 300 and 400.

The control device 600 may also detect the state of the at least one power supply source 10 and receive information on the state of the at least one power supply source 10 and the load 20 from an external communication element to convert and supply the driving power of each of the plurality of power panels 100, 200, 300 and 400 or control the plurality of circuit breakers 130, 230, 330 and 430 based on the state of the at least one power supply source 10 and the load 20.

In this case, the control device 600 may transfer a control command for the conversion and supply of the driving power of each of the plurality of power panels 100, 200, 300 and 400, or the control of the plurality of circuit breakers 130, 230, 330 and 430 to each of the plurality of power panels 100, 200, 300 and 400, or each of the plurality of breakers 130, 230, 330 and 430 to perform control according to the control command or the opening and closing control of each of the plurality of the plurality of circuit breakers 130, 230, 330 and 430 through the control unit 140, 240, 340 and 440 included in each of the plurality of power panels 100, 200, 300 and 400.

For example, when an abnormality occurs in the entire system power source (G) that is supplying power to the plurality of power panels 100, 200, 300 and 400, the control device 600 may transfer a control command for controlling to open the plurality of circuit breakers 130, 230, 330 and 430 so as to cut off power supply from the system power source (G) and switch to another supply source, and receive power from a power source other than the system power source (G) so as to convert and supply the DC power to the control unit 140, 240, 340 and 440 included in each of the plurality of power panels 100, 200, 300, and 400, thereby opening each of the plurality of circuit breakers 130, 230, 330 and 430, and receiving power from the bypass power source (P) or the battery power source (B) to convert and supply the DC power.

The control device 600 may control the opening and closing of the plurality of circuit breakers 130, 230, 330 and 430 to allow the plurality of power panels 100, 200, 300 and 400 to receive the DC power.

When an abnormality occurs in any at least one of the plurality of power panels 100, 200, 300 and 400, the control device 600 may close the circuit breakers 130, 230, 330 and 430 on either one of electric circuits connected to the abnormality occurred power panel and a power panel adjacent to the abnormality occurred power panel to allow the abnormality occurred power panel to receive the DC power from the adjacent power panel.

In other words, when an abnormality occurs in any at least one of the plurality of power panel 100, 200, 300 and 400, the control device 600 may close any one of the circuit breakers 130, 230, 330 and 430 connected to the abnormality occurred power panel to allow the abnormality occurred power panel to receive the DC power from a neighboring power panel.

For example, when a failure occurs in the conversion device 110 of the first power panel 100 among the plurality of power panels 100, 200, 300 and 400, the control device 600 may transfer a control command for closing the first circuit breaker 130 on an electric circuit connected to the first power panel 100 and the second power panel 200 or the fourth circuit breaker 430 on an electric circuit connected to the first power panel 100 and the second power panel 200, and cutting off the at least one first power conversion device 110, 210, 310 and 410 of the first power panel 100, and supplying the DC power converted by any one of the at least one first power conversion device 210 or 410 of the second power panel 200 or the fourth power panel 400 to the second power conversion device 120, 220, 320 and 420 of the first power panel 100 to each of the first power panel 100 and the second power panel 200 or the fourth power panel 400, thereby closing the first circuit breaker 130 or the fourth circuit breaker 430, and allowing either one of the at least one first power conversion device 210 or 410 of the second power panel 200 or the fourth power panel 400 to supply the DC power to the second power conversion device 120, 220, 320 and 420 of the first power panel 100.

In other words, each of the plurality of power panels 100, 200, 300 and 400 may supply the DC power to the load 20 of the abnormality occurred power panel when an abnormality occurs in a neighboring power panel.

Here, when the DC power is supplied to the abnormality occurred power panel, the plurality of power panels 100, 200, 300 and 400 may select any one of the at least one first power conversion device 510 that converts the DC power according to the state of the at least one power supply source 10 to transfer the DC power to the abnormality occurred power panel through the selected converter.

In other words, when the DC power is supplied to the abnormality occurred power panel, the plurality of power panels 100, 200, 300 and 400 may supply the DC power to the abnormality occurred power panel through the selected one converter according to the state of the at least one power supply source 10.

For instance, when a rating of the system power source (G) and the bypass power source (P) among the at least one power supply source 10 that is supplying power to the fourth power panel 400 is lower than a reference rating to while the fourth power panel 400 supplies the DC power to the first power panel 100, the second conversion device 410 #2 corresponding to the battery power source (B) may be selected to supply the DC power through the battery power source (B) to convert power received from the battery power source (B) into the DC power through the selected second conversion device 410 #2 and transfer the converted DC power to the first power panel 100.

When an abnormality occurs in at least one of the plurality of power panels 100, 200, 300 and 400, the control device 600 may close all the circuit breakers 130, 230, 330 and 430 on electric circuits connected to a plurality of power panels adjacent to the abnormality occurred power panel to allow the abnormality occurred power panel to receive the DC power from all the adjacent power panels.

In other words, when an abnormality occurs in at least one of the plurality of power panels 100, 200, 300 and 400, the control device 600 may close all the circuit breakers 130, 230, 330 and 430 connected to the abnormality occurred power panel to allow the abnormality occurred power panel to receive the DC power from all the neighboring power panels.

For instance, when an abnormality occurs in the first power panel 100, the first circuit breaker 130 that controls a connection to the second power panel 200 adjacent to the first power panel 100 and the fourth circuit breaker 430 that controls a connection to the fourth power panel 400 may be closed to allow the first power panel 100 to receive the DC power from the second power panel 200 adjacent to the first power panel 100 and the fourth power panel 400.

When there are a plurality of the abnormality occurred power panels, the control device 600 may close the plurality of circuit breakers 130, 230, 330 and 430 that control a connection to a power panel most adjacent to each of the abnormality occurred power panels to control each of the abnormality occurred power panel to receive the DC power from each of the power panels adjacent thereto.

In other words, there are a plurality of the abnormality occurred power panels, the control device 600 may control each of a plurality of power panels adjacent to each of the abnormality occurred power panels to supply the DC power to each of the abnormality occurred power panels.

For instance, when a failure occurs in the second power panel 200 and the third power panel 300, the first circuit breaker 130 that controls a connection between the second power panel 200 and the first power panel 100 and the third circuit breaker 330 that controls a connection between the third power panel 300 and the fourth power panel 400 may be closed to allow the second power panel 200 to receive the DC power from the first power panel 100, and allow the third power panel 300 to receive the DC power from the fourth power panel 400.

As described above, when an abnormality occurs in at least one of the plurality of power panels 100, 200, 300 and 400, the circuit breaker 130, 230, 330 and 430 that controls a connection to a power panel adjacent to the abnormality occurred power panel may be closed to control the abnormality occurred power panel to receive the DC power from the neighboring power panel, thereby allowing each of the plurality of power panels 100, 200, 300 and 400 to perform a UPS function.

Accordingly, in the power supply system 1000, even when an unexpected abnormality occurs in the at least one power supply source 10, the plurality of power panels 100, 200, 300 and 400, and the load 20, the supply of the driving power to the load 20 may be continuously maintained, thereby maintaining the operation of the load 20 with no interruption, performing an appropriate and active power supply response for an abnormality occurrence, and stably performing the operation of the load 20 and the control of the power supply system 1000 regardless of the type and extent of the abnormality occurrence.

Hereinafter, another embodiment of the power supply system according to the present disclosure will be described, but redundant description thereof will be omitted as much as possible.

The power supply system may be implemented in a combined or separate form of embodiments to be described above and below.

The power supply system may be a power supply system including a plurality of power supply devices.

The power supply system may include a plurality of packaged power devices to supply power.

Here, the power device may be a power panel in which a plurality of power control devices are packaged.

Figure 5:
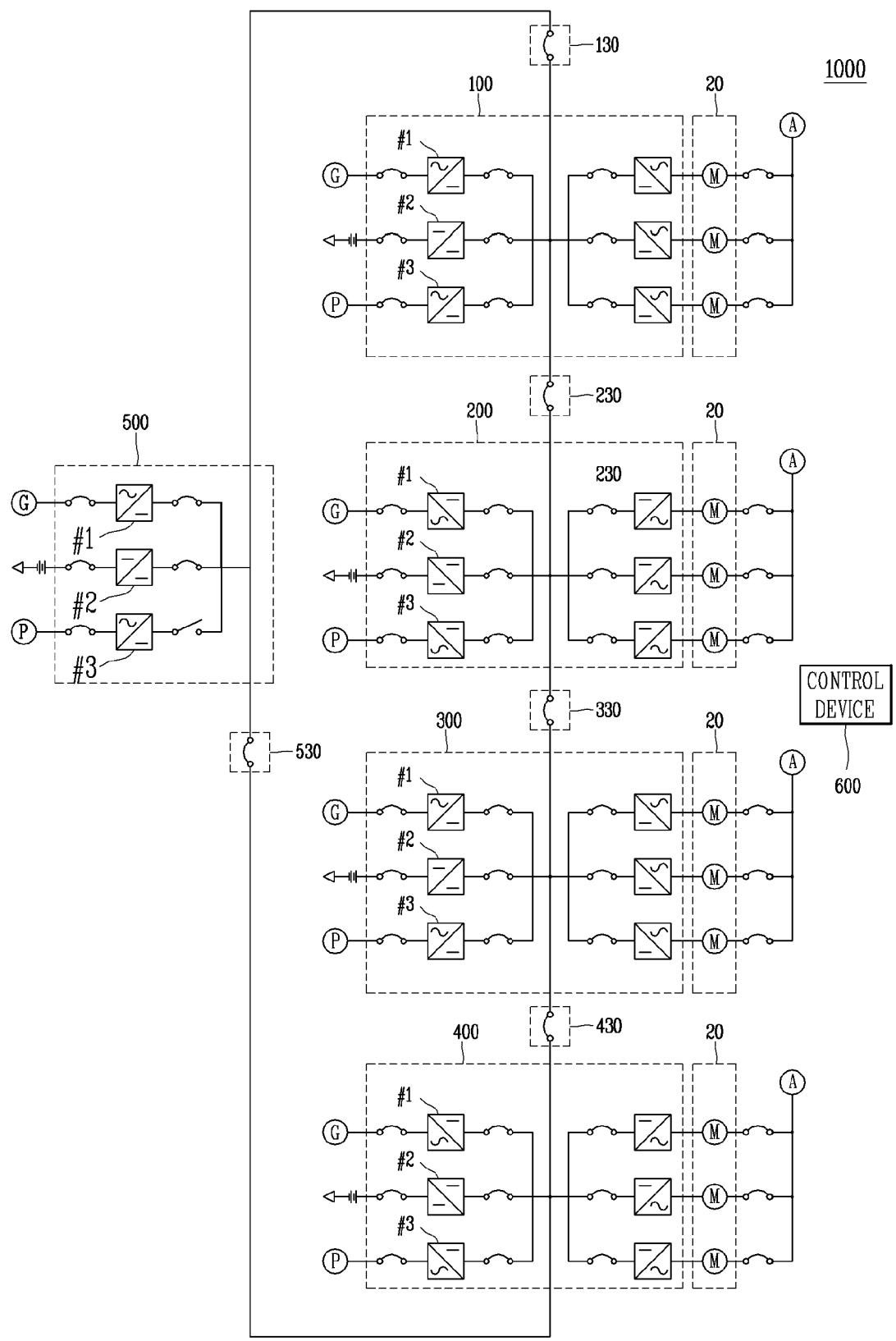
FIG. 5 is a block diagram 2 showing a configuration of a power supply system according to an embodiment of the present disclosure.

The power supply system 1000 (hereinafter, referred to as a system), as illustrated in FIG. 5, may include a plurality of power panels 100, 200, 300 and 400 that convert power supplied from at least power supply source 10 into DC power, and convert the DC power into driving power of the load 20 to supply the driving power to the load 20, and a supply panel disposed between any two power panels among the plurality of power panels 100, 200, 300 and 400 to convert power supplied from at least one power supply source 10 into DC power, and supply the converted DC power to the connected power panel when connected to either one of the two power panels, a DC electric circuit in which one end and the other end thereof are connected to connect each of power ends through which the DC power is input and output from each of the plurality of power panels 100, 200, 300 and 400 and the supply panel 500 and conduct the DC power converted by the plurality of power panels 100, 200, 300 and 400 and the supply panel 500, and a plurality of circuit breakers 130, 230, 330, 430 and 530 respectively disposed between the power ends on the DC electric circuit to connect or disconnect the two power ends connected to the electric circuit disposed therein.

In other words, the system 1000 may be an embodiment that further includes the supply panel 500 in the foregoing embodiment of the control system 1000.

The system 1000 may also further include the control device 600 that controls the opening and closing of the plurality of circuit breakers 130, 230, 330, 430 and 530 according to the operating state of each of the plurality of power panels 100, 200, 300 and 400 to control the reception and supply of the DC power of each of the plurality of power panels 100, 200, 300 and 400.

The plurality of circuit breakers 130, 230, 330, 430 and 530 may be opened and closed differently according to the operation state of at least one of the plurality of power panels 100, 200, 300 and 400 to connect or disconnect the DC power between the plurality of power panels 100, 200, 300 and 400 or the plurality of power panels 100, 200, 300 and 400 and the supply panel 500.

In other words, the plurality of circuit breakers 130, 230, 330 and 430 and 530 may be opened and closed differently according to the power supply state of at least one of the plurality of power panels 100, 200, 300 and 400 to connect or disconnect a power panel adjacent to each of the plurality of power panels 100, 200, 300 and 400 or the supply panel 500.

In the plurality of circuit breakers 130, 230, 330 and 430 and 530, at least one of the circuit breakers connected to a power end of a power panel in which the power supply is interrupted may be closed to connect at least one of the power ends at both sides of the power end of the interrupted power panel and the power end of the interrupted power panel so as to supply the DC power to the interrupted power panel from at least one of the adjacent power panel and the supply panel 500.

Accordingly, when the power supply is interrupted, at least one of the circuit breakers connected to both sides may be closed to allow each of the plurality of power panels 100, 200, 300 and 400 to be connected to an adjacent power panel or a power end of the supply panel 500, thereby allowing the DC power to be supplied from the adjacent power panel or the supply panel 500.

For example, in the case of a power panel connected to both sides, the DC power may be supplied from at least one of the power panels at both sides, and in the case of a power panel to which the supply panel 500 is connected to one side, the DC power may be supplied from the supply panel 500 or at least one of the power panels connected to the other side.

In other words, in the system 1000, each of the plurality of power supply boards 100, 200, 300 and 400 may receive the DC power from at least one of power ends connected to both sides of the power end on the DC electric circuit.

Furthermore, in the plurality of circuit breakers 130, 230, 330, 430 and 530, when power supply is interrupted in at least one of the plurality of power panels 100, 200, 300 and 400, at least one thereof may be closed to allow the DC power to be supplied from the supply panel 500 so as to connect at least one of the plurality of power panels 100, 200, 300 and 400 to the supply panel 500.

Each of the plurality of power panels 100, 200, 300 and 400, as illustrated in FIG. 5, may include at least one first power conversion device 110, 210, 310 and 410, and a second power conversion device 120, 220, 320 and 420, a circuit breaker 130, 230, 330 and 430, and a control unit 140, 240, 340 and 440.

Each of the at least one first power conversion device 110, 210, 310 and 410 included in each of the plurality of power panels 100, 200, 300 and 400 may have a single power end through which the DC power is input and output.

Accordingly, the power end of each of the at least one first power conversion device 110, 210, 310 and 410 may form a DC electric circuit through which the DC power flows.

In the plurality of power panels 100, 200, 300 and 400, a power end through which the DC power is input and output may be connected to each of the power ends of two adjacent power panels, or a power end of one adjacent power panel and a power end of the supply panel 500, respectively.

In each of the plurality of power panels 100, 200, 300 and 400, a power end through which the DC power is input and output may be connected to each of the power ends of two adjacent power panels 100, 200, 300 and 400, or connected to a power end of one adjacent power panel and a power end of the supply panel 500, respectively.

For example, as illustrated in FIG. 5, a power end of the first power panel 100 may be connected to a power end of the second power panel 200 and a power end of the supply panel 500, and a power end of the second power panel 200 to a power end of the first power panel 100 and a power end of the third power panel 300, a power end of the third power panel 300 to a power end of the second power panel. 200 and a power end of the fourth power panel 400, and a power end of the fourth power panel 400 to a power end of the third power panel 300 and a power end of the supply panel 500, respectively.

Accordingly, in the plurality of power panels 100, 200, 300 and 400 and the supply panel 500, a connection between the power ends thereof may form a loop.

In the plurality of power panels 100, 200, 300 and 400, a power end through which the DC power is input and output may be connected to each of the power ends of two adjacent power panels, or a power end of one adjacent power panel and a power end of the supply panel 500, respectively, and a power end of a power panel at one side and a power end of a power panel at the other side or a power end of the supply panel 500 may be connected to allow a connection between the power ends to be continuous.

Accordingly, in the plurality of power panels 100, 200, 300 and 400 and the supply panel 500, a connection between the power ends may be continuous, and a connection between the plurality of power panels 100, 200, 300 and 400 and the supply panel 500 may be formed in a ring structure.

The supply panel 500 may be disposed between any two power panels among the plurality of power panels 100, 200, 300 and 400.

The supply panel 500 may be an emergency power supply panel that converts power supplied from each of the at least one power supply source 10 into the DC power to supply the DC power to the plurality of power panels 100, 200, 300 and 400 according to the state of the plurality of power panels 100, 200, 300 and 400.

Similar to the plurality of power panels 100, 200 and 400, the supply panel 500 may receive power from at least one power supply source 10 to convert the power into the DC power.

The power supply source 10 that supplies power to the supply panel 500 may include at least the battery power source 10 #2.

The supply panel 500 may further receive more power from the first AC power source 10 #1 and the second AC power source 10 #3.

Similar to the plurality of power panels 100, 200, 300 and 400, the supply panel 500 may also include the at least one first power conversion device 510 that converts power supplied from the at least one power supply source 10 into the DC power.

In other words, the supply panel 500 may receive power from the system power source (G), the bypass power source (P), and the battery power source (B) to convert the power into the DC power through the at least one power conversion device 510, as illustrated in FIG. 5.

Here, in the at least one first power conversion device 510 included in the supply panel 500, the output of each of the at least one first power conversion device 510 from which the DC power is output may be connected to one power end, thereby allowing the power end to be connected to the power ends of the plurality of power panels 100, 200, 300 and 400 through a fifth circuit breaker 530.

In other words, the supply panel 500 may be provided with the fifth circuit breaker 530 on an electric circuit connected to the plurality of power panels 100, 200, 300 and 400 to control a connection to the plurality of power panels 100, 200, 300 and 400 through the opening and closing of the fifth circuit breaker 530.

The supply panel 500 may supply the DC power to the plurality of power panels 100, 200, 300 and 400 through any one of the at least one first power conversion device 510 according to the state of the at least one power supply source 10.

The supply panel 500 may transfer the DC power output from the at least one first power conversion device 510 to the second power conversion device 120, 220, 320 and 420 of a power panel connected thereto among the plurality of power panels 100, 200, 300 and 400.

The plurality of power panels 100, 200, 300 and 400 and the supply panel 500 may be connected as illustrated in FIG. 5.

The plurality of power panels 100, 200, 300 and 400 and the supply panel 500 may be connected to respective power ends, and the plurality of circuit breakers 130, 230, 330, 430, and 530 may be respectively connected between the plurality of power panels 100, 200, 300 and 400 and the supply panel 500.

In other words, the power ends of the first to fourth power panels 100, 200, 300 and 400 and the supply panel 500 may be connected, and the first to fifth circuit breakers 130, 230, 330 and 430 and 530 may be respectively provided between the first to fourth power panels 100, 200, 300 and 400 and the supply panel 500.

In the plurality of power panels 100, 200, 300 and 400 and the supply panel 500, a connection between the output ends thereof may form a loop.

In other words, in the plurality of power panels 100, 200, 300 and 400 and the supply panel 500, a connection between the power ends thereof may be connected to form a loop.

Accordingly, the plurality of circuit breakers 100, 200, 300 and 400 may be connected in a series order.

For instance, the first power panel 100, the second power panel 200, the third power panel 300, and the fourth power panel 400 may be connected in series, and the fourth power panel 400 may be connected to the first power panel 100 to allow a connection between the plurality of power panels 100, 200, 300 and 400 to form a loop shape.

The supply panel 500 may be provided between any two power panels of the plurality of power panels 100, 200, 300 and 400.

For instance, the supply panel 500 may be provided between the first power panel 100 and the fourth power panel 400 to be connected to the first power panel 100 and the fourth power panel 400.

An example in which the plurality of power panels 100, 200, 300 and 400 and the supply panel 500 are connected in a loop shape may be as illustrated in FIG. 5.

The second power panel 100 may be connected to the second power panel 100 and the supply panel 500 on the DC electric circuit, and the second circuit breaker 230 may be provided between the first and second power panels 100 and 200, and the first circuit breaker 130 may be provided between the first power panel 100 and the supply panel 500, and a connection between the first and second power panels 100 and 200 may be controlled by the second circuit breaker 230 of the second power panel 100, and a connection between the first power panel 100 and the supply panel 500 may be controlled by the circuit breaker 130 of the first power panel 100.

The second power panel 200 may be connected to the first power panel 100 and the third power panel 300 on the DC electric circuit, and the second circuit breaker 230 may be provided between the first and second power panels 100 and 200, and the third circuit breaker 330 may be provided between the second and third power panels 200 and 300, and a connection between the first and second power panels 100 and 200 may be controlled by the second circuit breaker 230 of the second power panel 100, and a connection between the second and third power panels 200 and 300 may be controlled by the third circuit breaker 330 of the third power panel 200.

The third power panel 300 may be connected to the second power panel 200 and the fourth power panel 400 on the DC electric circuit, and the third circuit breaker 330 may be provided between the second and third power panels 200 and 300, and the fourth circuit breaker 430 may be provided between the third and fourth power panels 300 and 400, and a connection between the second and third power panels 200 and 300 may be controlled by the third circuit breaker 330 of the third power panel 200, and a connection between the third and fourth power panels 300 and 400 may be controlled by the fourth circuit breaker 430 of the fourth power panel 400.

The fourth power panel 400 may be connected to the third power panel 300 and the supply panel 500 on the DC electric circuit, and the fourth circuit breaker 430 may be provided between the third and fourth power panels 300 and 400, and the fifth circuit breaker 530 may be provided between the fourth power panel 400 and the supply panel 500, and a connection between the third and fourth power panels 300 and 400 may be controlled by the fourth circuit breaker 430 of the fourth power panel 400, and a connection between the fourth power panel 400 and the supply panel 500 may be controlled by the fifth circuit breaker 530 of the supply panel 500.

The supply panel 500 may be connected to the fourth power panel 400 and the first power panel 100 on the DC electric circuit, and the fifth circuit breaker 530 may be provided between the fourth power panel and the supply panel 500, and the first circuit breaker 130 may be provided between the supply panel 500 and the first power panel 100, and a connection between the fourth power panel 400 and the supply panel 500 may be controlled by the fifth circuit breaker 530 of the supply panel 500, and a connection between the supply panel 500 and the first power panel 100 may be controlled by the circuit breaker 130 of the first power panel 100.

As the first to fourth power panels 100, 200, 300 and 400 and the supply panel 500 are connected in this way, the plurality of power panels 100, 200, 300 and 400 and the supply panel 500 may be connected in a loop shape.

As described above, the plurality of power panels 100, 200, 300 and 400 and the supply panel 500 may be connected in a loop shape, thereby performing the transfer of the DC power through the plurality of power panels 100, 200, 300 and 400 or the supply panel 500.

In other words, each of the plurality of power panels 100, 200, 300 and 400 may be connected to an adjacent power panel or the supply panel 500 to form a loop shape, and as a result, the first power panel 100 may be connected to the second power panel 200 and the supply panel 500 to receive and supply the DC power from and to the second power panel 200 or the supply panel 500, and the second power panel 200 may be connected to the first power panel 100 and the third power panel 300 to receive and supply the DC power from and to the first power panel 100 or the third power panel 300, and the third power panel 300 may be connected to the second power panel 200 and the fourth power panel 400 to receive and supply the DC power from and to the second power panel 200 or the fourth power panel 400, and the fourth power panel 400 may be connected to the third power panel 300 and the supply panel 500 to receive and supply the DC power from and to the third power panel 300 or the supply panel 500 and the supply panel 500 may be connected to the fourth power panel 400 and the first power panel 100 to receive and supply the DC power from and to the fourth power panel 400 or the first power panel 100.

In the plurality of power panels 100, 200, 300 and 400 and the supply panel 500 connected in a loop shape as described above, the reception and supply of the DC power may be performed by opening and closing each of the plurality of circuit breakers 130, 230, 330, 430 and 530.

For instance, the reception and supply of the DC power between the first power panel 100 and the second power panel 200 may be performed when the second circuit breaker 230 connected to an electric circuit between the first power panel 100 and the second power panel 200 is closed, and the reception and supply of the DC power between the second power panel 200 and the third power panel 300 may be performed when the third circuit breaker 330 connected to an electric circuit between the second power panel 200 and the third power panel 300 is closed, and the reception and supply of the DC power between the third power panel 300 and the fourth power panel 400 may be performed when the fourth circuit breaker 430 connected to an electric circuit between the third power panel 300 and the fourth power panel 400 is closed, and the reception and supply of the DC power between the fourth power panel 400 and the supply panel 500 may be performed when the fifth circuit breaker 530 connected to an electric circuit between the fourth power panel 400 and the supply panel 500 is closed, and the reception and supply of the DC power between the supply panel 500 and the first power panel 100 may be performed when the first circuit breaker 130 connected to an electric circuit between the supply panel 500 and the first power panel 100 is closed In other words, each of the plurality of power panels 100, 200, 300 and 400 may receive the DC power from other power panels connected to both sides or the supply panel 500.

In addition, each of the plurality of power panels 100, 200, 300 and 400 may receive the DC power from at least one power panel connected to both sides.

In this way, the power system 1000 may be configured such that the plurality of power panels 100, 200, 300 and 400 and the supply panel 500 are connected in a loop shape on the DC electric circuit by the plurality of circuit breakers 130, 230, 330 and 430 and 530, thereby allowing each of the plurality of power panels 100, 200, 300 and 400 to receive the DC power from at least one of both sides, or supply the DC power to at least one of both sides.

As described above, in the power supply system 1000 in which the plurality of power panels 100, 200, 300 and 400 and the supply panel 500 are connected in a loop shape, the supply panel 500 may transfer the DC power to the plurality of power panels 100, 200, 300 and 400, thereby performing the reception and supply of the DC power.

The plurality of circuit breakers 130, 230, 330 and 430 and 530 may be closed when the DC power is connected between the plurality of power panels 100, 200, 300 and 400 or the plurality of power panels 100, 200, 300 and 400 and the supply panel 500, and opened when the DC power is disconnected between the plurality of power panels 100, 200, 300 and 400 or the plurality of power panels 100, 200, 300 and 400 and the supply panel 500.

In the plurality of circuit breakers 130, 230, 330, 430 and 530, when an abnormality occurs in a power panel connected to the supply panel 500 among the plurality of power panels 100, 200, 300 and 400, a circuit breaker disposed between the abnormality occurred power panel and the supply panel 500 may be closed to connect the abnormality occurred power panel and the supply panel 500, thereby allowing the DC power to be supplied from the supply panel 500 to the abnormality occurred power panel.

In the plurality of circuit breakers 130, 230, 330 and 430 and 530, when an abnormality occurs in a power panel not adjacent to the supply panel 500 among the plurality of power panels 100, 200, 300 and 400, at least one of the breakers disposed at both sides of the abnormality occurred power panel may be closed to allow the DC power to be supplied to the abnormality occurred power panel from at least one of the power panels adjacent to the abnormality occurred power panel.

In the plurality of circuit breakers 130, 230, 330 and 430 and 530, moreover, when an abnormality occurs in a power panel not adjacent to the supply panel 500 among the plurality of power panels 100, 200, 300 and 400, circuit breakers disposed between the abnormality occurred power panel, a power panel adjacent to the supply panel 500 and the supply panel 500, respectively, may be closed to allow the DC power to be supplied to the abnormality occurred power panel from the adjacent power panel, and from the supply panel 500 to the adjacent power panel.

Each of the plurality of power panels 100, 200, 300 and 400 may control and monitor the operation of the at least one first power conversion device 110, 210, 310 and 410 and the second power conversion device 120, 220, 320 and 420 included therein.

Each of the plurality of power panels 100, 200, 300 and 400 may control the opening and closing of each of the first to fourth circuit breakers 130, 230, 330 and 430 according to a result of controlling and monitoring the operation of the at least one first power conversion device 110, 210, 310 and 410 and the second power conversion device 120, 220, 320 and 420 included therein.

Each of the plurality of power panels 100, 200, 300 and 400 may transfer a result of controlling and monitoring the operation of the at least one first power conversion device 110, 210, 310 and 410 and the second power conversion device 120, 220, 320 and 420 included therein to the control device 600.

Each of the plurality of power panels 100, 200, 300 and 400 may control and monitor the operation of the at least one first power conversion device 110, 210, 310 and 410 and the second power conversion device 120, 220, 320 and 420 included therein to detect the state of the DC power and the driving power.

Each of the plurality of power panels 100, 200, 300 and 400 may detect the state of the DC power and the driving power to transfer the detection result to the control device 600.

The supply panel 500 may control the opening and closing of the fifth circuit breaker 510 according to a result of controlling and monitoring the operation of the at least one first power conversion device 510.

The supply panel 500 may transfer the result of controlling and monitoring the operation of the at least one first power conversion device 510 to the control device 600.

The supply panel 500 may control and monitor the operation of the at least one first power conversion device 510 to detect the state of the DC power.

The supply panel 500 may detect the state of the DC power, and transfer the detection result to the control device 600.

Each of the plurality of power panels 100, 200, 300 and 400 and the supply panel 500 may receive power from any one of the at least one power supply source 10 to convert the power into the DC power.

In other words, each of the plurality of power panels 100, 200, 300 and 400 and the supply panel 500 may be selectively supplied with power from any one of the at least one power supply source 10.

Each of the plurality of power panels 100, 200, 300 and 400 and the supply panel 500 may receive power from any one of the at least one power supply source 10 according to a preset supply criterion to convert the power into the DC power.

The supply criterion may be a criterion for priority of power supply of the at least one power supply source 10.

The plurality of power panels 100, 200, 300 and 400 may select any one of the at least one first power conversion device 110, 210, 310 and 410 according to the state of the at least one power supply source 10 to transfer the DC power to each of the second power conversion devices 120, 220, 320 and 420 through the selected converter.

Each of the plurality of power panels 100, 200, 300 and 400 may transfer the DC power to each of the second power conversion devices 120, 220, 320 and 420 through one conversion device selected according to the state of the at least one power supply source 10.

When an abnormality occurs in at least one of a conversion device that is transferring the DC power to the second power conversion device 120, 220, 320 and 420 and a power supply source corresponding to the conversion device, the plurality of power panels 100, 200, 300 and 400 may transfer the DC power to the second power conversion device 120, 220, 320 and 420 through a conversion device other than the conversion device.

In other words, when an abnormality occurs in at least one of a conversion device that is transferring the DC power and a power supply source corresponding to the conversion device, each of the plurality of power panels 100, 200, 300 and 400 may switch it to a conversion device other than the conversion device to transfer the DC power to the second power conversion device 120, 220, 320 and 420 through the switched conversion device.

When an abnormality occurs in at least one of a conversion device that is transferring the DC power and a power supply source corresponding to the conversion device, the plurality of power panels 100, 200, 300 and 400 may switch the power supply source that is supplying power and the converter to allow a conversion device other than the conversion device to transfer the DC power to the second power conversion device 120, 220, 320 and 420.

When the DC power is supplied to the plurality of power panels 100, 200, 300 and 400, the supply panel 500 may select any one of the at least one first power conversion device 530 that converts the DC power according to the state of the at least one power supply source 10 to transfer the DC power to the plurality of power panels 100, 200, 300 and 400 through the selected conversion device.

When an abnormality occurs in at least one of a conversion device that is transferring the DC power to the plurality of power panels 100, 200, 300 and 400 and a power supply source corresponding to the conversion device, the supply panel 500 may transfer the DC power to the plurality of power panels 100, 200, 300 and 400 through a conversion device other than the conversion device.

In other words, when an abnormality occurs in at least one of a conversion device that is transferring the DC power and a power supply source corresponding to the conversion device, the power panels 500 may switch it to another conversion device other than the conversion device to transfer the DC power to the second power conversion devices 100, 200, 300 and 400 through the switched conversion device.

The plurality of power panels 100, 200, 300 and 400 and the supply panel 500 that convert and supply the DC power as described above may be controlled by the control device 600.

The control device 600 may communicate with each of the plurality of power panels 100, 200, 300 and 400 and the supply panel 500 to control each of the plurality of power panels 100, 200, 300 and 400 and the supply panel 500 based on state information received from each of the plurality of power panels 100, 200, 300 and 400 and the supply panel 500.

For instance, according to the state information of the DC power and the driving power received from each of the plurality of power panels 100, 200, 300 and 400 and the supply panel 500, the conversion and supply of the DC power of each of the plurality of power panels 100, 200, 300 and 400 and the supply panel 500, and the conversion and supply of the driving power of each of the plurality of power panels 100, 200, 300 and 400 and the supply panel 500 may be controlled.

The control device 600 may communicate with each of the plurality of power panels 100, 200, 300 and 400 and the supply panel 500 to convert and supply the driving power to each of the plurality of power panels 100, 200, 300 and 400 and the supply panel 500, or control the plurality of circuit breakers 130, 230, 330, 430 and 530 included in each of the plurality power panels 100, 200, 300 and 400 and the supply panel 500 based on the state information received from each of the plurality of power panels 100, 200, 300 and 400 and the supply panel 500.

The control device 600 may also detect the state of the at least one power supply source 10 and receive information on the state of the at least one power supply source 10 and the load 20 from an external communication element to convert and supply the driving power of each of the plurality of power panels 100, 200, 300 and 400 and the supply panel 500 or control the plurality of circuit breakers 130, 230, 330, 430 and 530 included in the plurality of power panels 100, 200, 300 and 400 and the supply panel 500 based on the state of the at least one power supply source 10 and the load 20.

In this case, the control device 600 may transfer a control command for the conversion and supply of the driving power of each of the plurality of power panels 100, 200, 300 and 400 and the supply panel 500, or the control of each of the plurality of circuit breakers 130, 230, 330, 430 and 530 included in the plurality of power panels 100, 200, 300 and 400, and the supply 500 to each of the plurality of power panels 100, 200, 300 and 400 and the supply panel 500 to perform control according to the control command through the control unit 140, 240, 340 and 440 included in each of the plurality of power panels 100, 200, 300 and 400.

For example, when an abnormality occurs in the entire system power source (G) that is supplying power to the plurality of power panels 100, 200, 300 and 400, the control device 600 may transfer a control command for controlling to open the plurality of circuit breakers 130, 230, 330 and 430 so as to cut off power supply from the system power source (G) and switch to another supply source, and receive power from a power source other than the system power source (G) so as to convert and supply the DC power to the control unit 140, 240, 340 and 440 included in each of the plurality of power panels 100, 200, 300, and 400, thereby opening each of the plurality of circuit breakers 130, 230, 330 and 430, and receiving power from the bypass power source (P) or the battery power source (B) to convert and supply the DC power.

The control device 600 may control the opening and closing of the plurality of circuit breakers 130, 230, 330 and 430 to allow the plurality of power panels 100, 200, 300 and 400 to receive the DC power.

The plurality of circuit breakers 130, 230, 330 and 430 may be opened at normal times and closed during operation to control a connection between the plurality of power panels 100, 200, 300 and 400, and a connection between the plurality of power panels 100, 200, 300, and 400 and the supply panel 500.

When an abnormality occurs in any at least one of the plurality of power panels 100, 200, 300 and 400, the control device 600 may close the circuit breakers 130, 230, 330, 430 and 530 on either one of electric circuits connected to the abnormality occurred power panel and a power panel adjacent to the abnormality occurred power panel or the supply panel 500 to allow the abnormality occurred power panel to receive the DC power from the adjacent power panel or the supply panel 500.

In other words, when an abnormality occurs in any at least one of the plurality of power panel 100, 200, 300 and 400, the control device 600 may close any one most adjacent to the circuit breakers 130, 230, 330, 430 and 530 connected to the abnormality occurred power panel to allow the abnormality occurred power panel to receive the DC power from a neighboring power panel or the supply panel 500.

When an abnormality occurs in at least one of the plurality of power panels 100, 200, 300 and 400, the control device 600 may control the abnormality occurred power panel to receive the DC power from the supply panel 500.

For example, when a failure occurs in the conversion device 110 of the first power panel 100 among the plurality of power panels 100, 200, 300 and 400, in order to supply DC power converted by any one conversion device 510 of the supply panel 500 to the second power conversion device 120, 220, 320 and 420 of the first power panel 100, a control command for closing the first circuit breaker 130 on an electric circuit connected to the first power panel 100 and the supply panel 500, cutting off the at least one first power conversion device 110, 210, 310 and 410 of the first power panel 100, and supplying the DC power converted by any one of the at least one conversion device 510 of the supply panel 500 to the second power conversion device 120, 220, 320 and 420 of the first power panel 100 may be transferred to each of the first power panel 100 and the supply panel 500 to close the first circuit breaker 130, and allow any one of the at least one conversion device 510 of the supply panel 500 to supply the DC power to the second power conversion device 120, 220, 320 and 420 of the first power panel 100.

When an abnormality occurs in a power panel connected to the supply panel 500 among the plurality of power panels 100, 200, 300 and 400, the control device 600), the circuit breaker 130, 230, 330, 430 and 530 connected to the abnormality occurred power panel and the supply panel 500 may be closed to allow the abnormality occurred power panel to receive the DC power from the supply panel 500.

In other words, when an abnormality occurs in a power panel connected to the supply panel 500, the abnormality occurred power panel may receive the DC power from the supply panel 500.

For example, while the first power panel 100 and the fourth power panel 400 among the plurality of power panels 100, 200, 300 and 400 are connected to the supply panel 500, when an abnormality occurs in the power panel 100, the first circuit breaker 130 on an electric circuit connected to the first power panel 100 and the supply panel 500 may be closed to allow the first power panel 100 to receive the DC power from the supply panel 500, and when an abnormality occurs in the fourth power panel 400, the fifth circuit breaker 530 of an electric circuit connected to the fourth power panel 400 and the power panel 500 may be closed to allow the fourth power panel 400 to receive the DC power from the supply panel 500.

In other words, when an abnormality occurs in the plurality of power panels 100, 200, 300 and 400, the supply panel 500 may supply the DC power to the load 20 of the abnormality occurred power panel.

Here, when the DC power is supplied to the abnormality occurred power panel, the supply panel 500 may select any one of the at least one first power conversion device 510 that converts the DC power according to the state of the at least one power supply source 10 to transfer the DC power to the abnormality occurred power panel through the selected conversion device.

In other words, when the DC power is supplied to the abnormality occurred power panel, the supply panel 500 may supply the DC power to the abnormality occurred power panel through the selected one conversion device according to the state of the at least one power supply source 10.

For instance, when a rating of the system power source (G) and the bypass power source (P) among the at least one power supply source 10 that supplies power to the supply panel 500 is lower than a reference rating while the supply panel 500 supplies the DC power to the first power panel 100, the second-5 conversion device 510 #2 corresponding to the battery power source (B) may be selected to supply the DC power through the battery power source (B) to convert power received from the battery power source (B) into the DC power through the selected second-5 conversion device 510 #2 and transfer the converted DC power to the first power panel 100.

When an abnormality occurs in a power panel that is not adjacent to the supply panel among the plurality of power panels 100, 200, 300 and 400, the control device 600 may close the circuit breaker 130, 230, 330, 430 and 530 provided on an electric circuit between the abnormality occurred power panel and the supply panel 500 to allow the abnormality occurred power panel to receive the DC power from an adjacent power panel, and allow the adjacent power panel 500 to receive the DC power from the supply panel 500.

In other words, the transfer of the DC power from the supply panel 500 to the abnormality occurred power panel may be performed by a shift method of supplying the DC power.

For example, in a connection type as illustrated in FIG. 5, when an abnormality occurs in the third power panel 300 that is not adjacent to the supply panel 500, the fourth circuit breaker 430 and the fifth circuit breaker 530 provided on an electric circuit between the third power panel 300 and the supply panel 500 may be closed to allow the load of the third power panel 300 to receive the DC power from any one of the at least one first power conversion device 410 of the fourth power panel 400, and allow the load 20 of the fourth power panel 400 to receive the DC power from any one of the at least one first power conversion device 510 of the supply panel 500, or the first circuit breaker 130, the second circuit breaker 230 and the third circuit breaker 330 provided on an electric circuit between the third power panel 300 and the supply panel 500 to allow the load 20 of the third power panel 300 to receive the DC power from any one of the at least one first power conversion device 210 of the second power panel 200, and allow the load 20 of the second power panel 200 to receive the DC power from any one of the at least one first power conversion device 110, 210, 310 and 410 of the first power panel 100, and allow the load 20 of the first power panel 100 to receive the DC power from any one of the at least one first power conversion device 510 of the supply panel 500.

In this case, the DC power may be controlled to be supplied to a path through which the plurality of circuit breakers pass at least among paths from the supply panel 500 to the abnormality occurred power panel.

When an abnormality occurs in the supply panel 500, the control device 600 may close the circuit breaker 130, 230, 330 and 430 of a power panel most adjacent to the abnormality occurred power panel to control the abnormality occurred power panel to receive the DC power from the adjacent power panel.

In other words, when an abnormality occurs in the supply panel 500 that supplies the DC power to the abnormality occurred power panel, and the supply panel 500 fails to supply the DC power to the abnormality occurred power panel, the control device 600 may close the circuit breaker 130, 230 and 430 of a power panel most adjacent the power panel to allow the abnormality occurred power panel to receive the DC power from the adjacent power panel.

For instance, when a failure occurs in the conversion device 110 of the first power panel 100 and the supply panel 500 among the plurality of power panels 100, 200, 300 and 400, in order to supply DC power converted by any one conversion device 210 of the second power panel 200 most adjacent to the first power panel 100, a control command for closing the second circuit breaker 230, cutting off the at least one first power conversion device 110, 210, 310 and 410 of the first power panel 100, and supplying the DC power converted by any one of the at least one conversion device 210 of the second power panel 200 to the second power conversion device 120, 220, 320 and 420 of the first power panel 100 may be transferred to each of the first power panel 100 and the second power panel 200 to close the second circuit breaker 230, and control any one of the at least one first power conversion device 210 of the second power panel 200 to supply the DC power to the second power conversion device 120, 220, 320 and 420 of the first power panel 100.

in the case of a plurality of the abnormality occurred power panels, the control device 600 may close at least one circuit breaker 130, 230, 330, 430 and 530 of the supply panel 500 and a power panel most adjacent to the abnormal occurred power panel according to the abnormal state of each of the abnormality occurred power panels to allow each of the abnormality occurred power panels to receive the DC power from at least one of the supply panel 500 or the adjacent power panel.

In other words, when there are a plurality of the abnormality occurred power panels, the control device 600 may control at least one of the supply panel 500 and the adjacent power panel to supply the DC power to each of the abnormality occurred power panels according to the abnormal state of each of the abnormality occurred power panels.

For example, when a failure occurs in all of the at least one first power conversion device 110, 210. 310 and 410 in the first power panel 100, and the operation of some of the second power conversion device 420 is temporarily interrupted in the fourth power panel 400, the control device 600 may determine that the abnormal state of the first power panel 100 is more serious than the abnormal state of the second power panel 200, and close the first circuit breaker 130 to allow the supply panel 500 to supply the DC power to the first power panel 100 so as to restore the operation of the first power panel 100 through the supply panel 500, and maintain the operation of the fourth power panel 400 through the third power panel 300 adjacent to the fourth power panel 400, and close the fourth circuit breakers 430 to allow the third power panel 300 to supply the DC power to the fourth power panel 400.

In this way, when an abnormality occurs in at least one of the plurality of power panels 100, 200, 300 and 400, the DC power may be controlled to be supplied from the supply panel 500 to allow the supply panel 500 to perform a UPS function for each of the power panels 100, 200, 300 and 400.

Accordingly, in the power supply system 1000, even when an unexpected abnormality occurs in the at least one power supply source 10, the plurality of power panels 100, 200, 300 and 400, and the load 20, the supply of the driving power to the load 20 may be continuously maintained, thereby maintaining the operation of the load 20 with no interruption, performing an appropriate and active power supply response for an abnormality occurrence, and stably performing the operation of the load 20 and the control of the power supply system 1000 regardless of the type and extent of the abnormality occurrence.

As described above, the supply panel 500 that supplies the DC power to the plurality of power panels 100, 200, 300 and 400 in the power supply system 1000 may be configured in plural.

When the supply panel 500 is formed in plural, the plurality of supply panels 500 may be respectively provided between the plurality of power panels 100, 200, 300 and 400.

For instance, the plurality of supply panels 500 may be respectively provided between the plurality of power panels 100, 200, 300 and 400, and each of the plurality of supply panels may be dedicated to each of the plurality of power panels 100, 200, 300 and 400 to supply the DC power.

An example of the operation of the power supply system 1000 as described above may be performed as illustrated in FIGS. 6 to 9.

The example of the operation as illustrated in FIGS. 6 to 9 is an example of an operation when the power system 1000 includes four power panels 100, 200, 300 and 400 and one supply panel 500, and the power supply system 1000 may include less than five, or five or more of the plurality of power panels 100, 200, 300 and 400, and may include a plurality of the supply panels 500.

A preferred embodiment of the power supply system 1000 may include three power panels 100, 200, 300 and 400 and one supply panel 500 as illustrated in FIGS. 6 to 9, and hereinafter, a case where numbers of the plurality of power panels 100, 200, 300 and 400 and the supply panel 500 are four and one, respectively, illustrated in FIGS. 6 to 9 will be described as an example.

Figure 6:
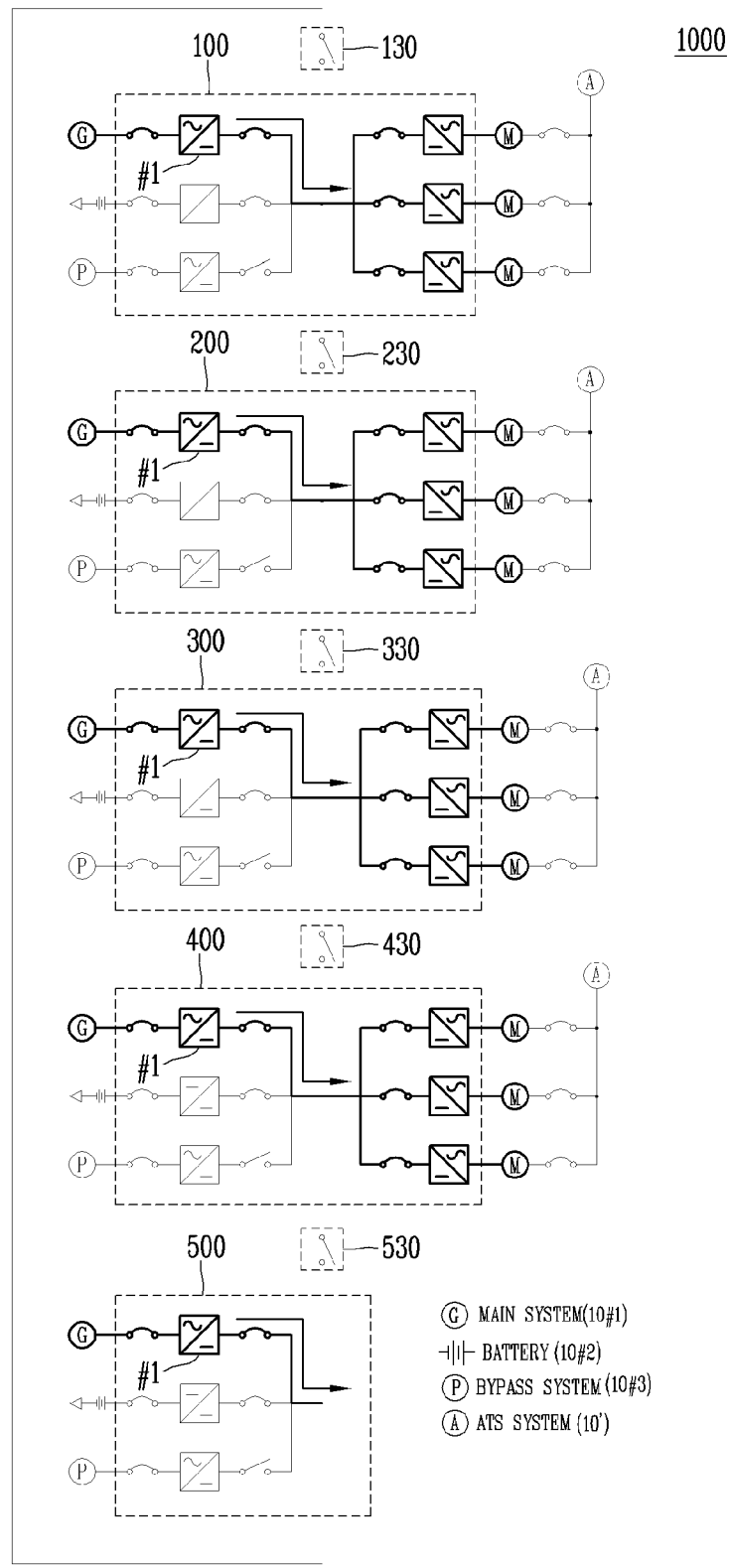
FIG. 6 is an exemplary view 1 showing a specific example of a power supply system according to an embodiment of the present disclosure.

FIG. 6 is a case in which each of the plurality of power panels 100, 200, 300 and 400 and the supply panel 500 receives power from the system power source (G) among the at least one power supply source 10, and in this case, power supply from the bypass power source (P) and the battery power source (B) may be cut off, and power may be supplied through the system power source (G) and converted in the order of the DC power and the driving power to be supplied to each of the loads 20.

The example of operation as illustrated in FIG. 6 is a case of a typical operation in which power is supplied for operation from the system power source (G), and a normal operation of the power supply system 1000 may be performed in this manner.

Figure 7:
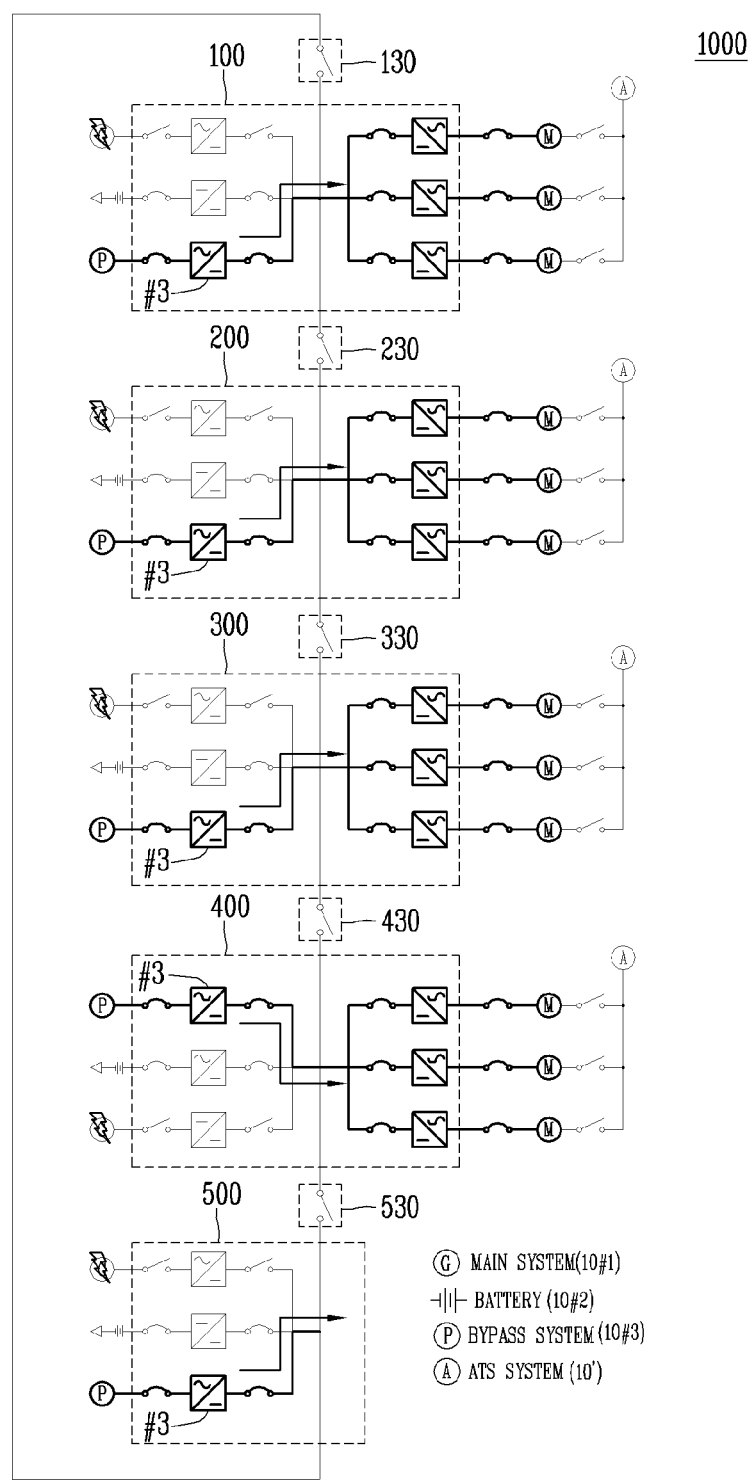
FIG. 7 is an exemplary view 2 showing a specific example of a power supply system according to an embodiment of the present disclosure.

FIG. 7 is a case in which each of the plurality of power panels 100, 200, 300 and 400 and the supply panel 500 receives power from the bypass power source (P) among the at least one power supply source 10, and a case in which an abnormality occurs in the system power source (G) may correspond thereto, and in this case, power supply from the system power source (G) and the battery power source (B) may be cut off, and power may be supplied through the bypass power source (P) and converted in the order of the DC power and the driving power to be supplied to each of the loads 20.

The example of operation as illustrated in FIG. 7 is a case of a special operation in which power is supplied for operation from the bypass power source (P), and the special operation of the power supply system 1000 may be performed in this manner.

Figure 8:
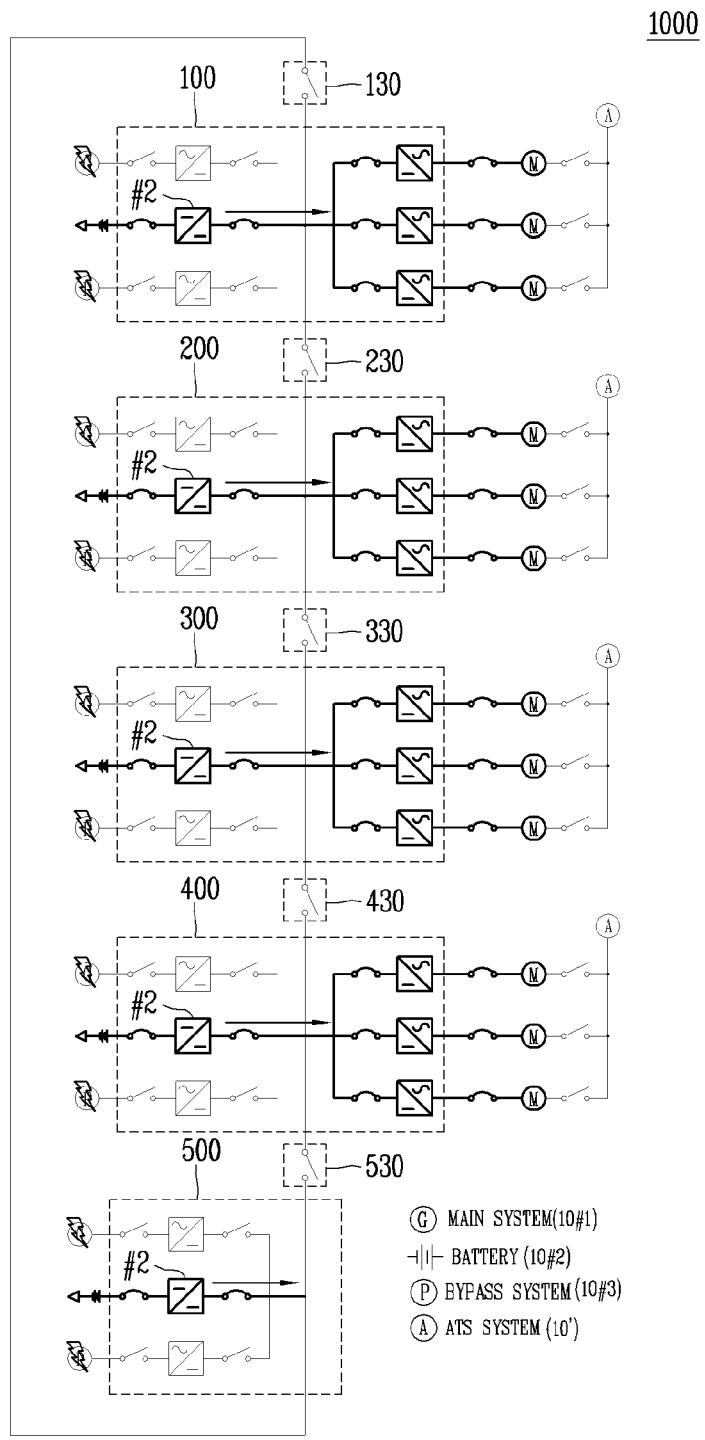
FIG. 8 is an exemplary view 3 showing a specific example of a power supply system according to an embodiment of the present disclosure.

FIG. 8 is a case in which each of the plurality of power panels 100, 200, 300 and 400 and the supply panel 500 receives power from the battery power source (B) among the at least one power supply source 10, and a case in which an abnormality occurs in the system power source (G) and the bypass power source (P) may correspond thereto, and in this case, power supply from the system power source (G) and the bypass power source (P) may be cut off, and power may be supplied through the battery power source (B) and converted in the order of the DC power and the driving power to be supplied to each of the loads 20.

The example of the operation as illustrated in FIG. 8 is a case of a power outage operation in which power is supplied from the battery power source (B), and the power outage operation of the power supply system 1000 may be performed in this manner.

Figure 9:
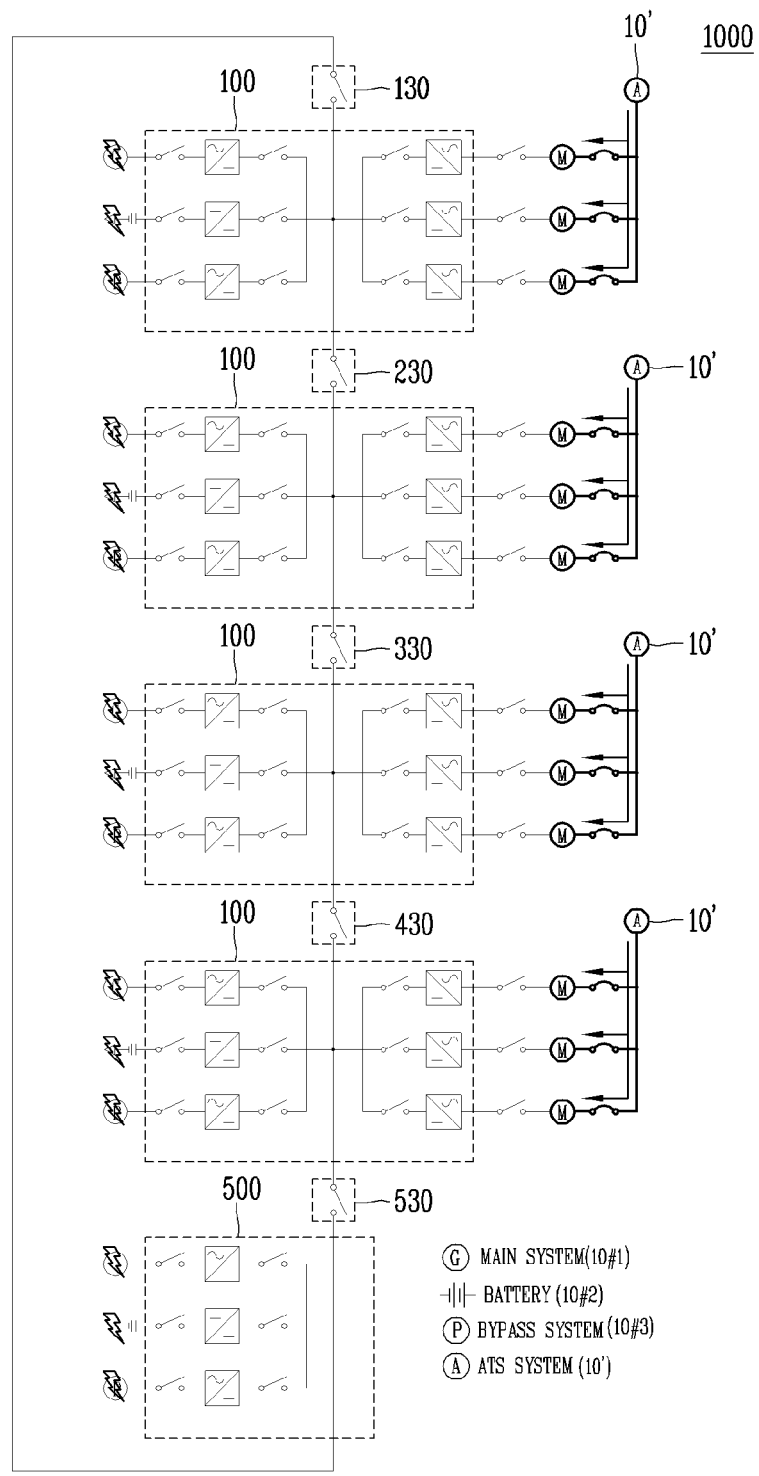
FIG. 9 is an exemplary view 4 showing a specific example of a power supply system according to an embodiment of the present disclosure.

FIG. 9 is a case in which each of the plurality of power panels 100, 200, 300 and 400 and the supply panel 500 receives power from the emergency power source (A) among the at least one power supply source 10, and a case in which an abnormality occurs in the system power source (G), the bypass power source (P) and the battery power supply (B) may correspond thereto, and in this case, power supply from the system power source (G), the bypass power source (P) and the battery power source (B) may be cut off, and the emergency power source (A) may directly supply the driving power to each of the loads 20.

The example of the operation as illustrated in FIG. 9 is a case of emergency operation in which power is supplied from the emergency power source (A), and the emergency operation of the power supply system 1000 may be performed in this manner.

As described above, in the power supply system 1000, each of the plurality of power panels 100, 200, 300 and 400 and the supply panel 500 may be operated by receiving power from the same power supply source, or each of the plurality of power panels 100, 200, 300 and 400 and the supply panel 500 may be operated by selectively receiving power from any one of the at least one power supply source 10.

For instance, the first and second power panels 100 and 200 may be operated by receiving power from the system power source (G), and the third and fourth power panels 300 and 400 may be operated by receiving power from the bypass power source (P), and the supply panel 500 may be operated by receiving power from the battery power source (B).

Furthermore, each of the plurality of power panels 100, 200, 300 and 400 and the supply panel 500 may be operated by receiving power from at least one power supply source 10.

For instance, when an abnormality occurs in the first power panel 100 and the DC power is supplied from the second power panel 200 to the first power panel 100, the second power panel 200 may convert power supplied from the system power source (G) into the DC power through the second-1 conversion device 210 #1 and transfer the DC power to each of the second power conversion device 220, and power may be further supplied from the bypass power source (P) to convert the power into the DC power through a second-3 conversion device 210 #3, and the DC power converted by the second-3 conversion device 210 #3 may be transferred to each of the second power conversion devices 120, 220, 320 and 420 of the power panel 100.

In the case of this example, the second circuit breaker 230 connected to the first power panel 100 and the second power panel 200 may be closed to connect the first power panel 100 and the second power panel 200 to each other and supply the DC power from the second power panel 200 to the first power panel 100.

As described above, each of the plurality of power panels 100, 200, 300 and 400 and the supply panel 500 may be operated by receiving power from at least one power supply source 10, thereby performing power supply between the plurality of power panels 100, 200, 300 and 400 and the supply panels 500, that is, a UPS function between the plurality of power panels 100, 200, 300 and 400 and a UPS function of the supply panel 500.

Hereinafter, another embodiment of the power supply system according to the present disclosure will be described.

Figure 10:
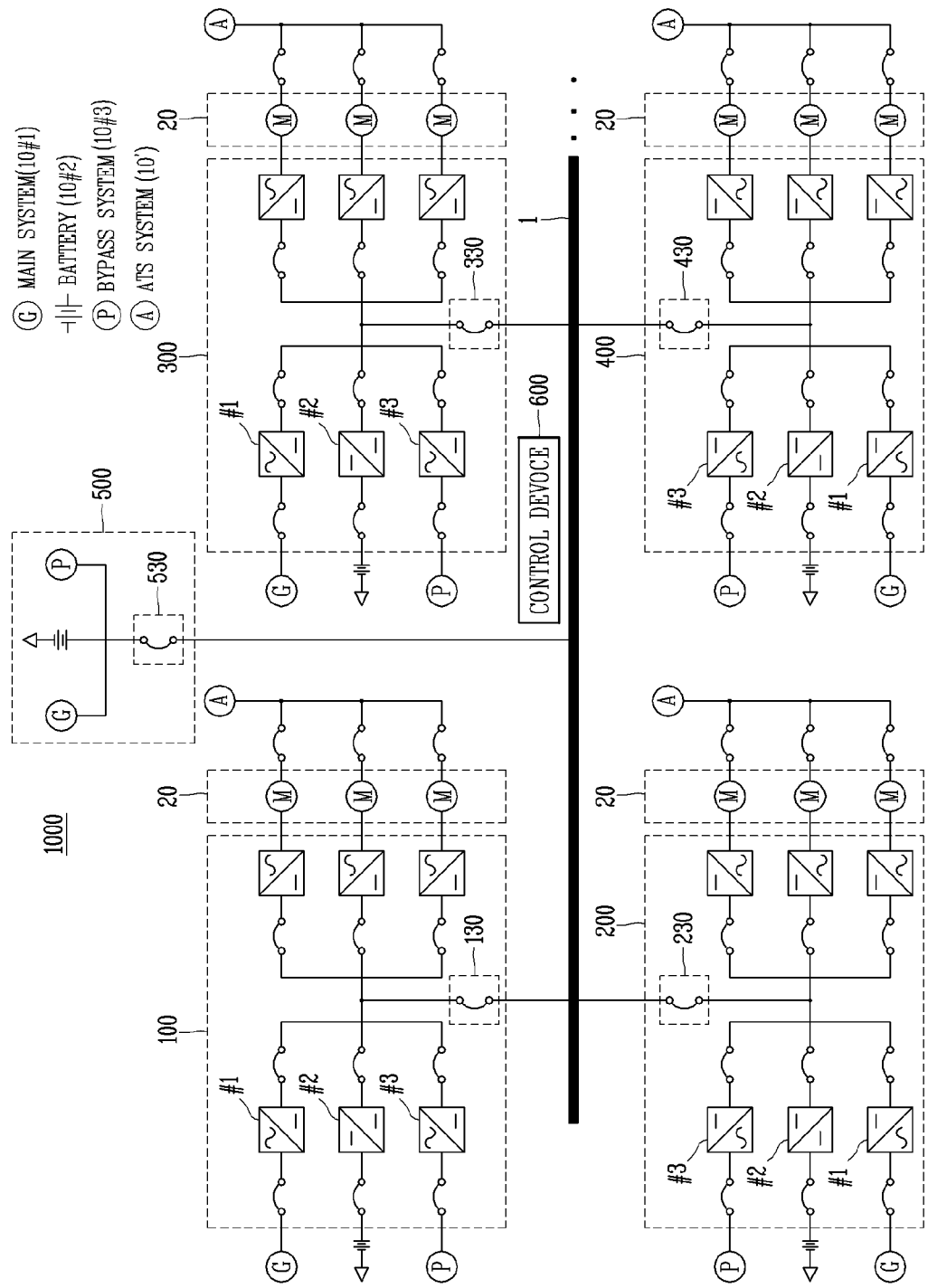
FIG. 10 is a block diagram showing a configuration of a power supply system according to another embodiment of the present disclosure.

The power supply system 1000 (hereinafter, referred to as a system), as illustrated in FIG. 10, may include a plurality of power panels 100, 200, 300 and 400 that convert power supplied from at least power supply source 10 into DC power, and convert the converted DC power into driving power of the load 20 to supply the driving power to the load 20, a supply panel 500 that converts power supplied from at least one power supply source 10 into DC power, and supply the converted DC power to the plurality of power panels 100, 200, 300 and 400 when connected to the plurality of power panels 100, 200, 300 and 400 through a bus line 1, the bus line 1 connected to a power end of each of the plurality of power panels 100, 200, 300 and 400 and a power end of the supply panel 500 to conduct the DC power converted by the plurality of power panels 100, 200, 300 and 400 and the supply panel 500, and a plurality of circuit breakers 130, 230, 330, 430 and 530 disposed between each of the power ends and the bus line 1 to connect or disconnect each of the power ends and the bus line 1.

In the system 1000, the plurality of circuit breakers 130, 230, 330, 430 and 530 are opened and closed differently according to the power supply state of at least one of the plurality of power panels 100, 200, 300 and 400 to connect or disconnect the DC power between the power end and the bus line 1.

In the system 1000, when the power supply of at least one of the plurality of power panels 100, 200, 300 and 400 is interrupted, two or more of the plurality of circuit breakers 130, 230, 330 and 430 and 530 are closed to conduct the DC power between the plurality of power panels 100, 200, 300 and 400 through the bus line 1, or conduct the DC power between the plurality of power panels 100, 200, 300 and 400 and the supply panel 500 so as to connect the two or more of the plurality of power panels 100, 200, 300 and 400 and the supply panel 500 to the bus line 1.

In other words, in the plurality of circuit breakers 130, 230, 330 and 430 and 530, when the power supply of at least one of the plurality of power panels 100, 200, 300 and 400 is interrupted, two or more circuit breakers, including a circuit breaker connected to a power panel in which the power supply is interrupted, may be closed.

In the plurality of circuit breakers 130, 230, 330, 430 and 530 in the system 1000, in order to conduct the DC power from at least one of another power panel other than the power panel in which the power supply is interrupted and the supply panel 500 to the power panel in which the power supply is interrupted, a circuit breaker connected to the at least one of the another power panel and the supply panel 500 is closed to connect the at least one of the another power panel and the supply panel 500 and the interrupted power panel to the bus line 1.

Accordingly, when the power supply is interrupted, the plurality of power panels 100, 200, 300 and 400 may be connected to at least one of the another power panel and the supply panel 500 through the bus line 1 to receive the DC power from least one of the another power panel and the supply panel 500.

Figure 11:
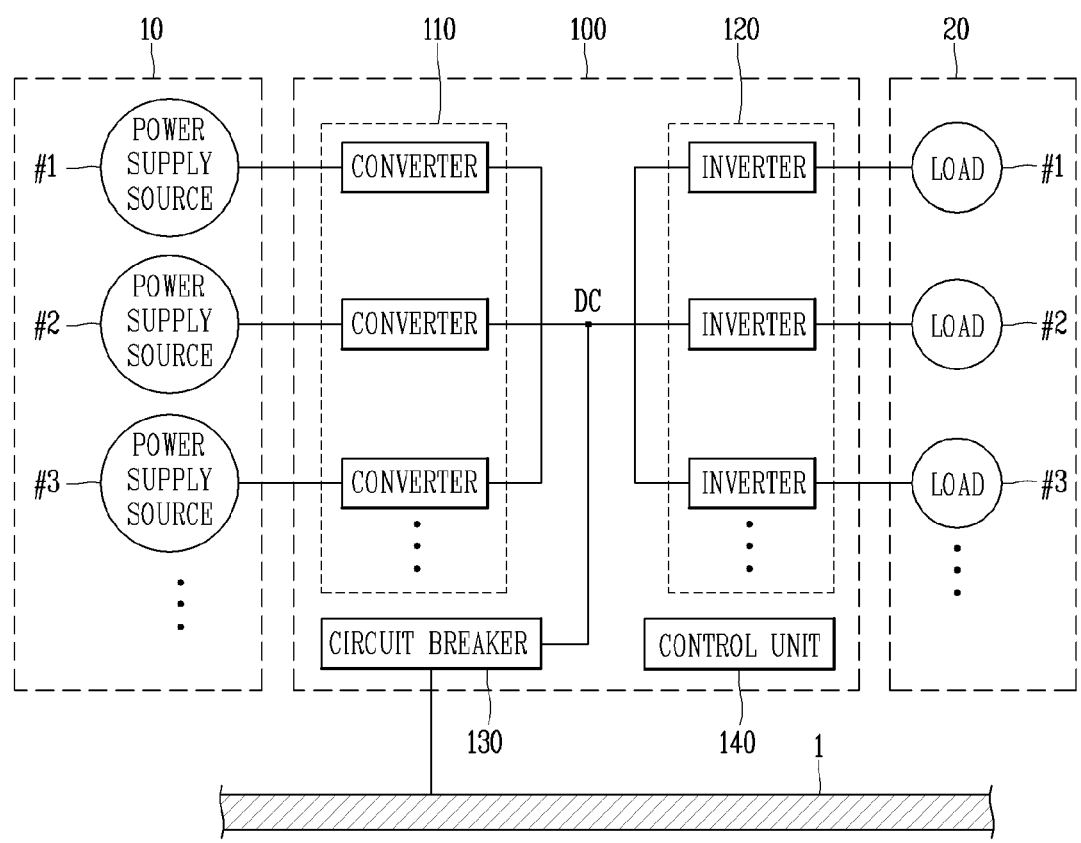
FIG. 11 is a block diagram showing a configuration of a power panel of a power supply system according to another embodiment of the present disclosure.
Figure 12:
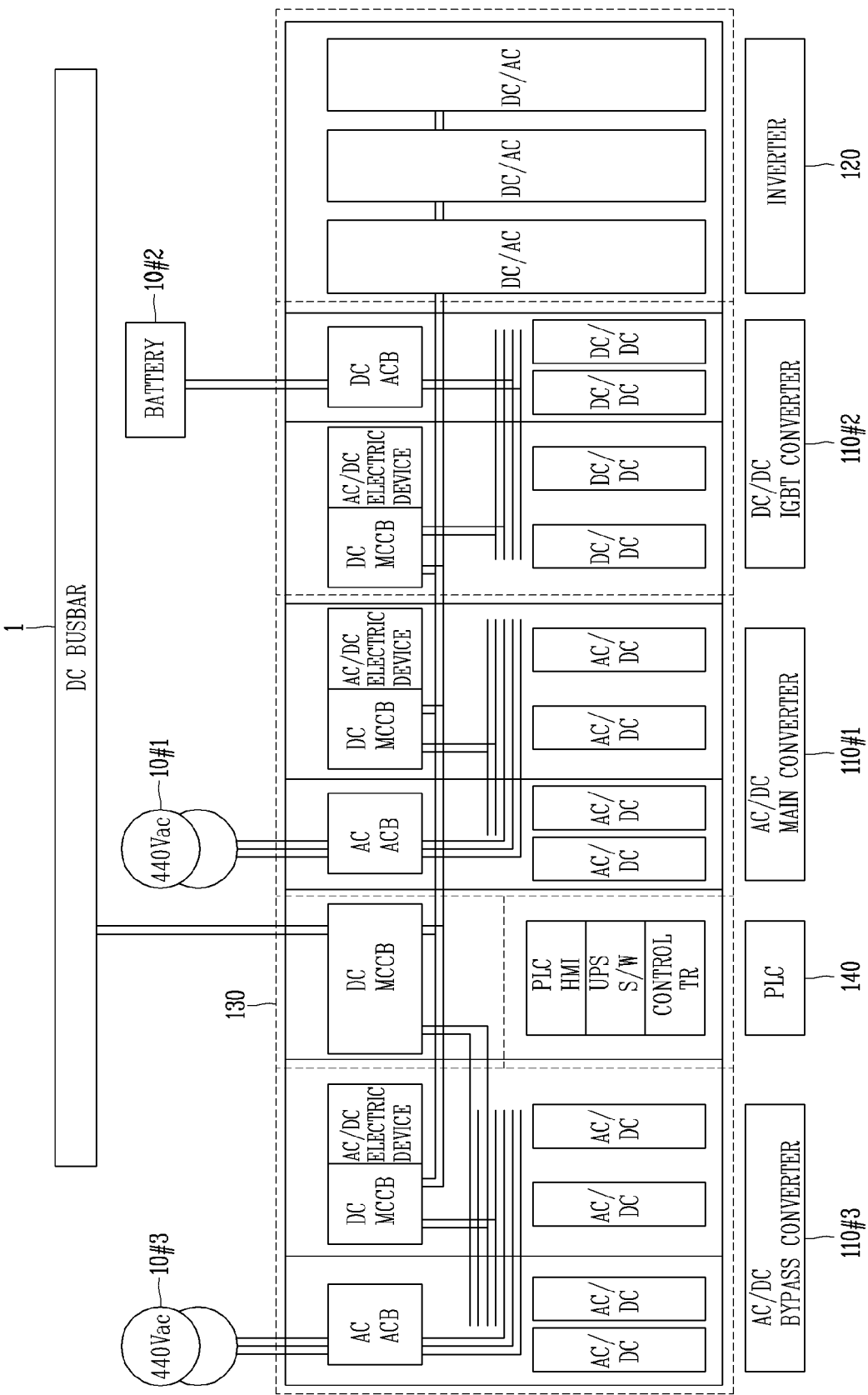
FIG. 12 is a block diagram showing a specific structural configuration of a power panel of a power supply system according to another embodiment of the present disclosure.

Here, each of the plurality of power panels 100, 200, 300 and 400 may be a power supply device 100 as illustrated in FIGS. 11 and 12.

In other words, the plurality of power panels 100, 200, 300 and 400 may be configured as a power supply device as illustrated in FIGS. 11 and 12, and the power supply system 1000 may include a plurality of power panels in the form of the power supply device 100 as illustrated in FIGS. 11 and 12, thereby including the plurality of power panels 100, 200, 300 and 400.

The plurality of power panels 100, 200, 300 and 400 may be a module including a plurality of power control devices.

The plurality of power panels 100, 200, 300 and 400 may be a power device in which the plurality of power control devices are packaged.

Here, each of the plurality of power panels 100, 200, 300 and 400 may be a power supply device 100 as illustrated in FIGS. 11 and 12.

In other words, the plurality of power panels 100, 200, 300 and 400 may be configured as a power supply device as shown in FIGS. 11 and 12, and the power supply system 1000 may include a plurality of power panels in the form of a power supply device 100 as shown in FIGS. 11 and 12, and thus the plurality of power panels 100, 200, 300 and 400 may be included therein.

The plurality of power panels 100, 200, 300 and 400 may be a module including a plurality of power control devices.

The plurality of power panels 100, 200, 300 and 400 may be a power device in which the plurality of power control devices are packaged.

For instance, the plurality of power panels 100, 200, 300, 400 may be a power panel in which the plurality of power control devices are packaged.

The plurality of power panels 100, 200, 300 and 400 may be a package-type power panel provided in a building requiring high power such as a power plant, a plant, a factory, and an apartment to supply power.

The plurality of power panels 100, 200, 300 and 400 may also be a package-type power panel configured in any one space.

The plurality of power panels 100, 200, 300 and 400 may be packaged with the plurality of power control devices to supply power to a load.

The plurality of power panels 100, 200, 300 and 400, as illustrated in FIG. 11, may include at least one first power conversion device 110 that converts power supplied from each of the at least one power supply source 10 into DC power, and at least one second power conversion device 120 that converts the DC power into the driving power for driving the load 20 to supply the driving power to the load 20.

As such, the plurality of power panels 100, 200, 300 and 400 include the at least one power conversion device 110, 210, 310 and 410 and the second power conversion device 120, 220, 320 and 420 to convert power supplied from the at least one power supply source 10 into the driving power and supply the driving power to the load 20.

A specific configuration of the plurality of power panels 100, 200, 300 and 400 including the at least one first power conversion device 110, 210, 310 and 410 and the second power conversion device 120, 220, 320 and 420 may be illustrated as in FIGS. 11 and 12.

The at least one power supply source 10 that supplies power to the plurality of power panels 100, 200, 300 and 400 may be externally connected to the at least one first power conversion device 110, 210, 310 and 410 to supply power to each of the at least one power first conversion device 110, 210, 310 and 410.

Each of the at least one power supply source 10 may be connected to each of the at least one first power conversion devices 110, 210, 310 and 410 to supply DC or AC power to each of the at least one first power conversion devices 110, 210, 310 and 410.

The at least one power supply source 10 may include a first AC power source 10 #1 and a second AC power source 10 #3 that supply AC power, and a battery power source 10 #2 that stores DC power, as illustrated in FIGS. 11 and 12.

Here, the first AC power source 10 #1 may be a main system power source (G) that supplies AC power, the second AC power source 10 #3 may be a bypass system power source (P) that supplies AC power, and the battery power source 10 #2 may be a battery power source (B) that supplies DC power.

Figure 13:
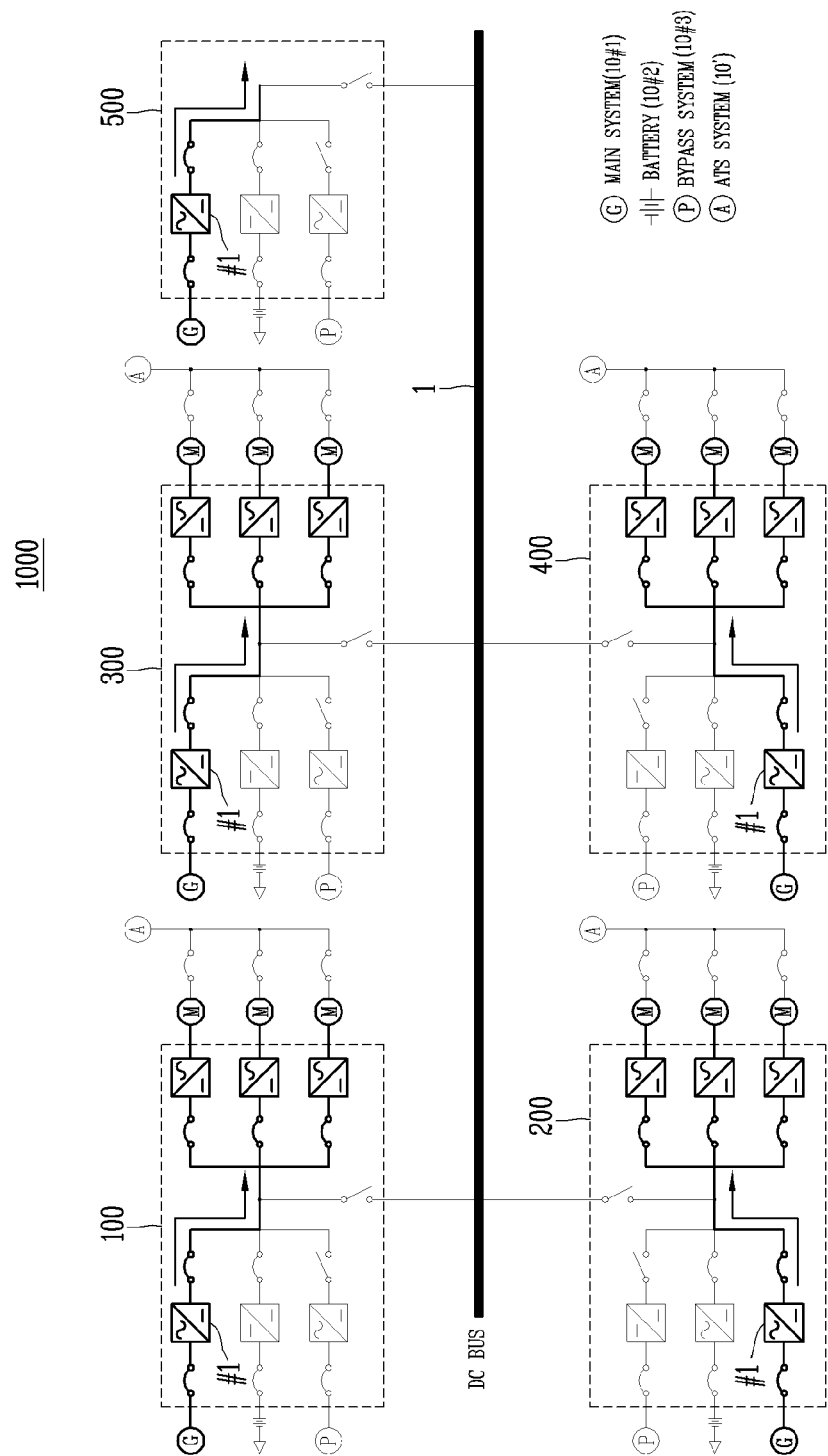
FIG. 13 is an exemplary view 1 showing a specific example of a power supply system according to another embodiment of the present disclosure.

In other words, the at least one power supply source 10 may include a system power source (G), a bypass power source (P), and a battery power source (B), as illustrated in FIG. 13.

Accordingly, each of the plurality of power panels 100, 200, 300 and 400 may be supplied with power from each of the system power source (G), the bypass power source (P), and the battery power source (B).

The first AC power source 10 #1 may be a system power source (G).

The first AC power source 10 #1 may be a system power source (G) that supplies AC power of 440 [V].

The second AC power source 10 #3 may be a bypass power source (P).

The second AC power source 10 #3 may be a bypass power source (P) that supplies 440 [V] of AC power.

The battery power source 10 #2 may be an emergency battery source that stores DC power and supplies the stored DC power in an emergency.

The battery power source 10 #2 may supply stored DC power to the plurality of power panels 100, 200, 300 and 400 when an abnormality occurs in the first AC power source and the second AC power source.

The DC power may be stored in the battery power source (B), and when the power supply of the first AC power source 10 #1 and the second AC power source 10 #3 is interrupted, power stored in the battery power source (B) may be supplied to the plurality of power panels 100, 200, 300 and 400 while the power supply is switched and restored.

After the power supply is interrupted, the battery power source (B) may supply the stored power to the plurality of power panels 100, 200, 300 and 400 with no interruption until the power supply is switched and restored.

The at least one power supply source 10 may also further include an emergency power source (A) that supplies emergency generation power to the load 20 when the power supply of the first AC power source (G), the second AC power source (P), and the battery power source (B) is interrupted.

When an abnormality occurs in the first AC power source (G), the second AC power source (P) and the battery power source (B), emergency generation power may be supplied to the load 20.

When an abnormality occurs in all of the first AC power source (G), the second AC power source (P), and the battery power source (B) that supply power to each of the plurality of power panels 100, 200, 300 and 400 so as not to supply power, the emergency power source (A) may be a power source that supplies emergency power to each of the loads 20 to maintain the driving of the load 20 for a predetermined period of time.

For instance, the emergency power source (A) may be a power source including an emergency generator.

Each of the plurality of power panels 100, 200, 300, 400 may be preferably supplied with power from three power supply sources 10, which are the system power source (G), the bypass power source (P) and the battery power source (B) as illustrated in FIG. 10, and supplied with power only when the system power source (G), the bypass power source (P), and the battery power source (B) are unable to supply power from the emergency power source (A).

Here, each of the at least one power supply source 10 that supplies power to each of the plurality of power panels 100, 200, 300 and 400 may supply power to each of the plurality of power panels 100, 200, 300 and 400 in one system or supply power to each of the plurality of power panels 100, 200, 300 and 400 from each separate distribution panel through a separate distribution panel.

Each of the plurality of power panels 100, 200, 300 and 400 may include the at least one first power conversion device 110, 210, 310 and 410 that converts power supplied from the at least one power supply source 10 into the DC power, and the second power conversion device 120, 220,

320 and 420 that converts the DC power supplied from the at least one first power conversion device 110, 210, 310 and 410 into the driving power and supply the driving power to the load 20.

Here, the at least one first power conversion device 110, 210, 310 and 410 and the second power conversion device 120, 220, 320 and 420 may be provided in plural.

Each of the plurality of power panels 100, 200, 300 and 400 may supply the DC power to at least one second power conversion device 120, 220, 320 and 420 through one of the at least one first power conversion device 110, 210, 310 and 410 according to the state of the at least one power supply source 10.

The first power conversion device 110, 210, 310 and 410, which is a device that converts supplied power into DC power, and may be a converter, for instance.

The first power conversion device 110, 210, 310 and 410 may be an AC/DC converter that converts AC power into DC power, or a DC/DC converter that converts DC power into DC power.

The at least one first power conversion device 110, 210, 310 and 410 may include at least one of an AC/DC converter that converts AC power into DC power and a DC/DC converter that converts a level of DC power.

The at least one first power conversion device 110, 210, 310 and 410 may include three conversion devices 110 #1 to #3, 210 #1 to #3, 310 #1 to #3 and 410 #1 to #3 corresponding to the at least one power supply source 10, respectively.

The at least one first power conversion device 110, 210, 310 and 410 may include first to third conversion devices 110 #1 to #3, 210 #1 to #3, 310 #1 to #3 and 410 #1 to #3 connected to the first AC power source 10 #1, the battery power source 10 #2, and the second AC power source 10 #3, respectively, to receive power from the power supply sources connected thereto.

According to this, the first AC power source 10 #1 is connected to the first conversion device 110 #1, 210 #1, 310 #1 and 410 #1 to supply AC power to the first conversion device 110 #1, 210 #1, 310 #1 and 410 #1, and the battery power source 10 #2 is connected to the second conversion device 110 #2, 210 #2, 310 #2 and 410 #2 to supply DC power to the second conversion device 110 #2, 210 #2, 310 #2 and 410 #2, and the second AC power source 10 #3 is connected to the third conversion device 110 #3, 210 #3, 310 #3 and 410 #3 to supply AC power to the third conversion device 110 #3, 210 #3, 310 #3 and 410 #3.

The first conversion device 110 #1, 210 #1, 310 #1 and 410 #1 may be an AC/DC converter that converts AC power into DC power, and the second conversion device 110 #2, 210 #2, 310 #2 and 410 #2 may be a DC/DC converter that converts a level of DC power, and the third conversion device 110 #3, 210 #3, 310 #3 and 410 #3 may be an AC/DC converter that converts AC power into DC power.

Each of the at least one first power conversion device 110, 210, 310 and 410 may include an opening and closing element for opening and closing a connection at front and rear ends thereof, respectively.

The opening and closing element may be a switch provided at each of input and output ends of each of the at least one first power conversion device 110, 210, 310 and 410 to control power that is input and output from and to the at least one first power conversion device 110, 210, 310 and 410.

Here, the opening and closing element provided at the input end may be a circuit breaker that senses an overcurrent to break a circuit.

More specifically, an AC air circuit breaker (ACB) may be provided at an input end of the first conversion device 110 #1, 210 #1, 310 #1 and 410 #1 and the third conversion device 110 #3, 210 #3, 310 #3 and 410 #3 that receive AC power from the first AC power source 10 #1 and the second AC power source 10 #3, and a DC molded case circuit breaker (MCCB) may be provided at an input end of the second conversion device 110 #2, 210 #2, 310 #2 and 410 #2 that receives DC power from the battery power source 10 #2.

The opening and closing element may open and close the connection of the at least one first power conversion device 110, 210, 310 and 410 according to the operation of the at least one first power conversion device 110, 210, 310 and 410.

For instance, when power is not supplied from the at least one power supply source 10, the opening and closing element provided at each of the input end and the output end is opened to separate the connection of the relevant conversion device.

In the at least one first power conversion device 110, 210, 310 and 410, the output end may be connected to one power end.

In other words, in the at least one first power conversion device 110, 210, 310 and 410, the output ends may be connected in common to the power end, and the DC power converted by the at least one first power conversion device 110, 210, 310 and 410 may flow therethrough.

Accordingly, the power end may be an electric circuit to which the output ends of the at least one first power conversion device 110, 210, 310 and 410 are connected in common to allow the DC power output from the at least one first power conversion device 110, 210, 310 and 410 to flow therethrough.

The power end may be connected to the bus line 1 and an input end of the second power conversion device 120, 220, 320, and 420.

The power end may be connected to an input end of the bus line 1 and the second power conversion device 120, 220, 320 and 420 to transfer the DC power to the bus line 1 through the power end or transfer the DC power to the second power conversion device 120, 220, 320 and 420.

In this way, the power end to which the output ends of the at least one first power conversion device 110, 210, 310 and 410 are connected in common may be connected to the input end of the bus line 1 and the second power conversion device 120, 220, 320 and 420, thereby performing the transfer of the DC power converted and output from the at least one first power conversion device 110, 210, 310 and 410 through the power end.

The DC power converted and output from the at least one first power conversion device 110, 210, 310 and 410 may be transferred to the second power conversion device 120, 220, 320 and 420.

In the at least one first power conversion device 110, 210, 310 and 410, any one of the first to third conversion devices 110 #1 to 110 #3, 210 #1 to 210 #3, 310 #1 to 310 #3 and 410 #1 to 410 #3 may be operated to supply the DC power to the second power conversion device 120, 220, 320 and 420.

When the power supply of the conversion devices 110 #1 to #3, 210 #1 to #3, 310 #1 to #3 and 410 #1 that supply the DC power to the second power conversion device 120, 220, 320 and 420 is interrupted, the plurality of power panels 100, 200, 300 and 400 may supply the DC power to the second power conversion device 120, 220, 320 and 420 through a conversion device other than the conversion devices 110 #1 to #3, 210 #1 to #3, 310 #1 to #3 and 410 #1 to #3.

When the power supply of the conversion devices 110 #1 to #3, 210 #1 to #3, 310 #1 to #3 and 410 #1 to #3 that supply the DC power to the second power conversion device 120, 220, 320 and 420 is interrupted, the at least one first power conversion device 110, 210, 310 and 410 may supply the DC power to the second power conversion device 120, 220, 320 and 420 through the conversion device 110 #2, 210 #2, 310 #2 and 410 #2 that receives power from the battery power source 10 #2 while the conversion devices 110 #1 to #3, 210 #1 to #3, 310 #1 to #3 and 410 #1 to #3 are switched to the other conversion device.

Here, a case where the power supply of the conversion devices 110 #1 to #3, 210 #1 to #3, 310 #1 to #3 and 410 #1 to #3 is interrupted may be a case where an abnormal state is detected from at least one of the conversion devices 110 #1 to #3, 210 #1 to #3, 310 #1 to #3 and 410 #1 to #3, a supply source connected to the conversion devices 110 #1 to #3, 210 #1 to #3, 310 #1 to #3 and 410 #1 to #3, and a rating of the DC power.

For instance, when the rating of the DC power output from the first conversion device 110 #1, 210 #1, 310 #1 and 410 #1 is reduced below a predetermined reference while the first conversion device 110 #1, 210 #1, 310 #1 and 410 #1 connected to the first AC power source 10 #1 supplies the DC power to the second power conversion device 120, 220, 320 and 420, the third conversion device 110 #3, 210 #3, 310 #3 and 410 #3, which is a conversion device other than the first conversion device 110 #1, 210 #1, 310 #1 and 410 #1, may supply the DC power to the second power conversion device 120, 220, 320 and 420.

In this case, while the first conversion device 110 #1, 210 #1, 310 #1, and 410 #1 is switched to the third conversion device 110 #3, 210 #3, 310 #3 and 410 #3, the at least one first power conversion device 110, 210, 310 and 410 may supply the DC power to the second power conversion device 120, 220, 320 and 420 through the second conversion device 110 #2, 210 #2, 310 #2 and 410 #2 connected to the battery power source 10 #2.

In other words, when the supply of the DC power to the second power conversion device 120, 220, 320, 420 is interrupted, the second conversion device 110 #2, 210 #2, 310 #2, 410 #2 connected to the battery power source 10 #2 may supply the DC power to the second power conversion device 120, 220, 320, 420 until the supply of the DC power is switched and restored.

The second power conversion device 120, 220, 320 and 420 may be configured in plural.

The second power conversion device 120, 220, 320 and 420, which is a device that converts the supplied DC power into the driving power, may be an inverter, for instance.

When the load is a load driven by AC power, the second power conversion device 120, 220, 320 and 420 may be an inverter that converts DC power transferred from the at least one first power conversion device 110, 210, 310 and 410 into AC driving power.

When the load is a load driven by DC power, the second power conversion device 120, 220, 320 and 420 may be an inverter that converts DC power transferred from the at least one first power conversion device 110, 210, 310 and 410 into DC driving power.

The second power conversion device 120, 220, 320 and 420 may be provided in a number corresponding to that of the loads 20.

The load 20 may be configured in plural.

The second power conversion device 120, 220, 320 and 420 may include three or more second power conversion devices 120 #1 to #3, 220 #1 to #3, 320 #1 to #3 and 420 #1 to #3 to correspond to the loads 20.

Each of the second power conversion devices 120, 220, 320 and 420 may be connected to each of the loads 20 to supply the driving power to the connected load.

Each of the second power conversion devices 120, 220, 320 and 420 may include an opening/closing element for opening and closing a connection at a front end thereof.

The opening and closing element may be a switch provided at an input end of each of the second power conversion devices 120, 220, 320 and 420 to control power that is input to the second power conversion device 120, 220, 320 and 420.

Here, the opening and closing element provided at the input end may be a circuit breaker that senses an overcurrent to break a circuit.

The driving power converted and output by the second power conversion device 120, 220, 320 and 420 may be transferred to each of the loads 20.

Here, the loads 20 may include a motor (M) load.

In each of the plurality of power panels 100, 100, 200, 300 and 400, the power end may be connected to the supply panel 500 through the bus line 1.

In the plurality of power panels 100, 200, 300 and 400, the plurality of circuit breakers 130, 230, 330 and 430 may respectively be disposed between the power end and the bus line 1.

The power end of each of the plurality of power panels 100, 200, 300 and 400 is connected to the plurality of circuit breakers 130, 230,330 and 430, and connected to the supply panel 500 connected to the bus line 1 through the plurality of circuit breakers 130, 230, 330 and 430.

The supply panel 500 may be an auxiliary power panel that supplies the DC power to the plurality of power panels 100, 200, 300 and 400.

The supply panel 500 may be an emergency power panel connected to the bus line 1 to supply the DC power to the plurality of power panels 100, 200, 300 and 400.

Similar to the plurality of power panels 100, 200, 300 and 400, the supply panel 500 may receive power from at least one of the at least one power supply source 10 to convert the power to the DC power.

The supply panel 500 may be an auxiliary power panel for power supply in which the power ends are connected in common to convert power supplied from at least one of the at least one power supply source 10 according to the state of the plurality of power panels 100, 200, 300 and 400 into the DC power to supply the DC power to the plurality of power panels 100, 200, 300 and 400 through the bus line 1.

In other words, the supply panel 500 may supply the DC power to the plurality of power panels 100, 200, 300 and 400 through the bus line 1.

The power supply source 10 that supplies power to the supply panel 500 may include at least the battery power source 10 #2.

In other words, the supply panel 500 may receive power from at least the battery power source 10 #2.

The supply panel 500 may further receive more power from the first AC power source 10 #1 and the second AC power source 10 #3.

In other words, similarly to the power panels 100, 200, 300 and 400, the supply panel 500 may receive power from at least one of the system power source (G), the bypass power source (P), and the battery power source (B) that supply power to the plurality of power panels 100, 200, 300 and 400 to convert the power into the DC power.

For instance, the supply panel 500 may receive power from the battery power source (B) and convert the power into the DC power.

The supply panel 500 may include at least one first power conversion device 510 that converts power supplied from the first AC power source 10 #1, the second AC power source 10 #3, and the battery power source 10 #2, respectively, into the DC power.

In other words, the supply panel 500 may receive power from the system power source (G), the bypass power source (P), and the battery power source (B) to convert the power into the DC power through the at least one power conversion device 510, as illustrated in FIG. 10.

Here, in the at least one first power conversion device 510 included in the supply panel 500, one output end through which the DC power is output may be connected to the one power end, and the power end may be connected to the bus line 1.

The supply panel 500 may transfer the DC power output from the at least one first power conversion device 510 to the bus line 1.

The supply panel 500 may convert the DC power into the driving power, and supply the driving power to a specific load connected to the supply panel 500.

The supply panel 500 may be connected to the bus line 1 through the circuit breaker 530 through which the power end is connected to the supply panel.

The supply panel 500 may supply the DC power to the plurality of power panels 100, 200, 300 and 400 through any one of the at least one first power conversion device 510 according to the state of the at least one power supply source 10.

Each of the plurality of power panels 100, 200, 300 and 400 and the supply panel 500 may receive power from any one of the at least one power supply source 10 to convert the power into the DC power.

In other words, each of the plurality of power panels 100, 200, 300 and 400 and the supply panel 500 may be selectively supplied with power from any one of the at least one power supply source 10.

Each of the plurality of power panels 100, 200, 300 and 400 and the supply panel 500 may receive power from any one of the at least one power supply source 10 according to a preset supply criterion to convert the power into the DC power.

The supply criterion may be a criterion for priority of power supply of the at least one power supply source 10.

Each of the plurality of power panels 100, 200, 300 and 400 may control and monitor the operation of the at least one first power conversion device 110, 210 and 310 and the second power conversion device 120, 220 and 320 included therein.

The plurality of power panels 100, 200, 300 and 400 may select any one of the at least one first power conversion device 110, 210 and 310 according to the state of the at least one power supply source 10 to transfer the DC power to each of the second power conversion devices 120, 220 and 320 through the selected conversion device.

Each of the plurality of power panels 100, 200, 300 and 400 may transfer the DC power to the second power conversion device 120, 220 and 320 through one conversion device selected according to the state of the at least one power supply source 10.

Each of the plurality of power panels 100, 200, 300 and 400 may control the opening and closing of each of the first to third circuit breakers 130, 230, 330, 430 and 530 according to a result of controlling and monitoring the operation of the at least one first power conversion device 110, 210 and 310 and the second power conversion device 120, 220 and 320 included therein.

Furthermore, the supply panel 500 may select any one of the at least one first power conversion device 410 according to the state of the at least one power supply source 10 to transfer the DC power to the bus line 1 through the selected conversion device.

Each of the plurality of power panels 100, 200, 300 and 400 may control and monitor the operation of the at least one first power conversion device 110, 210 and 310 and the second power conversion device 120, 220 and 320 included therein to detect the state of the DC power and the driving power.

When an abnormality occurs in at least one of a conversion device that is transferring the DC power to the at least one first power conversion device 120, 220 and 320 and a power supply source corresponding to the conversion device, the plurality of power panels 100, 200, 300 and 400 may transfer the DC power to the second power conversion device 120, 220 and 320 through a conversion device other than the conversion device.

In other words, when an abnormality occurs in at least one of a conversion device that is transferring the DC power and a power supply source corresponding to the conversion device, each of the plurality of power panels 100, 200, 300 and 400 may switch it to another conversion device other than the conversion device to transfer the DC power to the second power conversion device 120, 220 and 320 through the switched conversion device.

When an abnormality occurs in at least one of a conversion device that is transferring the DC power to the second power conversion device 120, 220 and 320 and a power supply source corresponding to the conversion device, the plurality of power panels 100, 200, 300 and 400 may switch the power supply source that is supplying power and the conversion device to allow a conversion device other than the conversion device to transfer the DC power to the second power conversion device 120, 220 and 320.

The supply panel 500 may control the supply of the DC power to the plurality of power panels 100, 200, 300 and 400 according to a result of controlling and monitoring the operation of the at least one first power conversion device 510.

The supply panel 500 may control and monitor the operation of the at least one first power conversion device 510 to detect the state of the DC power.

When an abnormality occurs in at least one of a conversion device that is transferring the DC power to the plurality of power panels 100, 200, 300 and 400 and a power supply source corresponding to the conversion device, the supply panel 500 may transfer the DC power to the plurality of power panels 100, 200, 300 and 400 through a conversion device other than the conversion device.

In other words, when an abnormality occurs in at least one of a conversion device that is transferring the DC power and a power supply source corresponding to the conversion device, the power panels 500 may switch it to another conversion device other than the conversion device to transfer the DC power to the plurality of power panels 100, 200, 300 and 400 through the switched conversion device.

When an abnormality occurs in at least one of a conversion device that is transferring the DC power to the plurality of power panels 100, 200, 300 and 400 and a power supply source corresponding to the conversion device, the supply panel 500 may switch the power supply source that is supplying power and the conversion device to allow a conversion device other than the conversion device to transfer the DC power to the plurality of power panels 100, 200, 300 and 400.

As described above, the supply panel 500 that supplies the DC power to the plurality of power panels 100, 200, 300 and 400 in the system 1000 may be configured in plural.

For the supply panel 500 configured in plural as described above, a supply target for supplying the DC power may be predetermined for each of the plurality of supply panels 500 among the plurality of power panels 100, 200, 300 and 400 to supply the DC power to the predetermined supply target.

For instance, as illustrated in FIG. 5A, the first and second power panels 100 and 200 may be predetermined as supply targets for the first supply panel 400, and the third and fourth power panels 300 and 400 may be predetermined as supply targets for the second supply panel, and the first supply panel may supply the DC power to the first and second power panels 100 and 200 when an abnormality occurs in the first and second power panels 100 and 200, and the second supply panel may supply the DC power to the third and fourth power panels 300 and 400 when an abnormality occurs in the third and fourth power panels 300 and 400.

In this case, for the first and second supply panels, the supply targets may be switched according to an abnormal state of the plurality of power panels 100, 200, 300 and 400.

The supply panel 500 may be provided at a position where each of the plurality of power panels 100, 200, 300 and 400 is separated within a predetermined distance.

The supply panel 500 may be provided at a position where a separation distance between each of the plurality of power panels 100, 200, 300 and 400 is minimized.

For instance, in an arrangement structure of the plurality of power panels 100, 200, 300 and 400, the supply panel 500 may be provided at a position corresponding to the center.

In other words, the supply panel 500 may be located in a central portion in a structure in which the plurality of power panels 100, 200, 300 and 400 are disposed.

In this way, when the supply panel 500 is provided at a position corresponding to the center in the arrangement structure of the plurality of power panels 100, 200, 300 and 400, the supply of the DC power to each of the plurality of power panels 100, 200, 300 and 400 may be easily performed, thereby reducing loss occurring in the process of supplying the DC power.

The plurality of circuit breakers 130, 230, 330 and 430 and 530 may be respectively disposed between a power end of each of the plurality of power panels 100, 200, 300 and 400, and a power end of the supply panel 500 and the bus line 1.

The plurality of circuit breakers 130, 230, 330 and 430, and 530 may be DC circuit breakers that cut off DC power.

The plurality of circuit breakers 130, 230, 330 and 430 and 530 may be disposed between a power end connected to an output end of each of the at least one first power conversion device 110, 210 and 310, and a power end of the supply panel 500 and the bus line 1.

In other words, in the plurality of circuit breakers 130, 230, 330 and 430 and 530, the power end of the plurality of power panels 100, 200, 300 and 400 and the power end of the supply panel 500 may be provided on an electric circuit connected to the bus line 1 to control a connection between the plurality of power panels 100, 200, 300 and 400 and the supply panel 500 and the bus line 1.

According to this, the plurality of power panels 100, 200, 300 and 400 may be connected to the supply panel 500 through the power end, and a connection to the supply panel 500 may be controlled by the opening and closing of the plurality of circuit breakers 130, 230, 330, 430 and 530.

The bus line 1 to which the plurality of power supply panels 100, 200, 300 and 400 and the supply panel 500 are connected may be a DC electric circuit through which DC power flows.

The bus line 1, which is an electric circuit to which the plurality of power panels 100, 200, 300 and 400 and the supply panel 500 are connected, may be an electric circuit through which the DC power is transferred between the plurality of power panels 100, 200, 300 and 400 and the supply panel 500.

The bus line 1 may have a rating of the magnitude of DC power supplied from at least one conversion device or the magnitude of DC power supplied from two conversion devices.

In other words, the rating of the bus line 1 may be a rating capable of performing the transfer of DC power supplied from at least two conversion devices.

The bus line 1 may preferably have a rating of the magnitude capable of performing the transfer of DC power between all power panels connected to the bus line 1.

In the bus line 1, the DC power may flow according to the opening and closing of the plurality of circuit breakers 130, 230, 330, 430 and 530.

The plurality of circuit breakers 130, 230, 330 and 430 and 530, which are provided between the power end and the bus line 1 to regulate the connection of the power end and the bus line 1, are DC-only molded case circuit breakers (MCCBs).

The plurality of circuit breakers 130, 230, 330, 430 and 530 may be opened and closed differently according to the power supply state of at least one of the plurality of power panels 100, 200, 300 and 400 and the supply panel 500 to connect or disconnect the DC power between the plurality of power panels 100, 200, 300 and 400 and the supply panel 500.

The plurality of circuit breakers 130, 230, 330, 430 and 530 may be opened and closed differently according to the state of at least one of the DC power of the plurality of power panels 100, 200, 300 and 400 and the supply panel 500, the driving power, the at least one first power conversion device 110, 210, 310 and 410, and the load 20 to connect or disconnect the DC power between the plurality power panels 100, 200, 300 and 400 and the supply panel 500.

Here, the at least one state may be at least one of when the DC power is changed from its initial state, when the driving power is changed from its initial state, when the power supply state of the at least one first power conversion device 110, 210, 310, 410 and 510 is changed, and when the driving state of the load 20 is changed.

For instance, the at least one state may include when the DC power or the driving power falls below a reference rating, when a failure/accident occurs in the at least one first power conversion device 110, 210, 310, 410 and 510 to change the power supply state, or when the driving power supplied to the load 20 is reduced to change the driving state of the load 20.

The plurality of circuit breakers 130, 230, 330, 430 and 530 may be opened at normal times and closed during operation, thereby controlling a connection between the plurality of power panels 100, 200, 300 and 400 and the supply panel 500.

Accordingly, each of the plurality of power panels 100, 200, 300 and 400 may be connected to the supply panel 500 through the opening and closing of each of the plurality of circuit breakers 130, 230, 330, 430 and 530.

The plurality of circuit breakers 130, 230, 330 and 430 and 530 may be closed when the DC power is connected between the power end of the plurality of power panels 100, 200, 300 and 400 and the supply panel 500 and the bus line 1, and opened when the DC power is disconnected between the power end of the plurality of power panels 100, 200, 300 and 400 and the supply panel 500 and the bus line 1.

When the power supply of at least one of the plurality of power panels 100, 200, 300 and 400 is interrupted, the plurality of circuit breakers 130, 230, 330, 430 and 530 may close a circuit breaker connected to the power panel in which the power supply is interrupted and a circuit breaker connected to the supply panel 500 to connect the interrupted power panel and the supply panel 500 to the bus line 1, thereby supplying the DC power from the supply panel 500 to the interrupted power panel.

In this case, the interrupted power panel may be supplied with the DC power from a conversion device connected to the battery power source (B) until the power supply is interrupted, and the DC power conducted from the supply panel 500 is supplied.

When the power supply of at least one of the plurality of power panels 100, 200, 300 and 400 is interrupted, furthermore, the plurality of circuit breakers 130, 230, 330, 430 and 530 may close a circuit breaker disposed between the power panel in which the power supply is interrupted and a circuit breaker connected to another power panel other than the interrupted power panel to connect the interrupted power panel and the another power panel to the bus line 1, thereby allowing the DC power to be supplied from the another power panel to the interrupted power panel.

In other words, when the power supply is interrupted, the plurality of power panels 100, 200, 300 and 400 may be connected to the another power panel to receive the DC power from the another power panel.

In the plurality of circuit breakers 130, 230, 330, 430 and 530, when the power supply of at least one of the plurality of power panels 100, 200, 300 and 400 is interrupted, a circuit breaker connected to the power panel in which the power supply is interrupted and a circuit breaker connected to at least one of the other power panels and a circuit breaker connected to the supply panel 500 may be closed to allow the DC power to be supplied from at least one of the other power panels and the supply panel 500 to the interrupted power panel through the bus line 1.

Accordingly, the plurality of power panels 100, 200, 300 and 400 may be connected to a plurality of supply sources including the supply panel 500 through the bus line 1 to receive the DC power from the plurality of supply sources.

The foregoing system 1000 may further include a control device 600 that monitors the state of at least one of the plurality of power panels 100, 200, 300 and 400, the supply panel 500, and the plurality of circuit breakers 130, 230, 330, 430 and 530 to control at least one of the plurality of power panels 100, 200, 300 and 400, the supply panel 500, and the plurality of breakers 130, 230, 330, 430 and 530 according to the monitoring result.

In other words, the plurality of power panels 100, 200, 300 and 400, the supply panel 500, and the plurality of breakers 130, 230, 330, 430 and 530 may be controlled by the control device 600.

Each of the plurality of power panels 100, 200, 300 and 400 and the supply panel 500 may communicate with the control device 600 to operate according to a result of communication with the control device 600.

For instance, each of the plurality of power panels 100, 200, 300 and 400 may receive a control command from the control device 600 to operate according to the control command, or to transfer state information to the control device 600.

Each of the plurality of power panels 100, 200, 300 and 400 and the supply panel 500 may request the control of the opening and closing of each of the plurality of circuit breakers 130, 230, 330, 430 and 530 to the control device 600 according to a result of controlling and monitoring the operation of the at least one first power conversion device 110, 210, 310 and 410 and the second power conversion device 120, 220, 320 and 420 included therein.

Each of the plurality of power panels 100, 200, 300 and 400 and the supply panel 500 may transfer a result of controlling and monitoring the operation of the at least one first power conversion device 110, 210, 310 and 410 and the second power conversion device 120, 220, 320 and 420 included therein to the control device 600.

Each of the plurality of power panels 100, 200, 300 and 400 and the supply panel 500 may control and monitor the operation of the at least one first power conversion device 110, 210, 310 and 410 and the second power conversion device 120, 220, 320 and 420 included therein to transfer a result of detecting the state of the DC power and the driving power to the control device 600.

Here, each of the plurality of power panels 100, 200, 300 and 400 and the supply panel 500 may further include a control unit 140, 240, 340 and 440 that controls the at least one first power conversion device 110, 210, 310 and 410 and the second power conversion device 120, 220, 320 and 420, and monitors an abnormal state of at least one of the at least one power supply source 10, the at least one first power conversion device 110, the DC power, the driving power, and the load 20.

The control unit 140, 240, 340 and 440 may be a central control device of the plurality of power panels 100, 200, 300 and 400.

The control unit 140, 240, 340 and 440 may include a plurality of control elements for controlling the plurality of power panels 100, 200, 300 and 400.

The control unit 140, 240, 340 and 440 may further include a plurality of electronic devices for performing a function of the plurality of power panels 100, 200, 300 and 400.

For instance, the control unit 140, 240, 340 and 440 may include at least one of a storage element that stores software/applications/programs for performing and controlling a function of the plurality of power panels 100, 200, 300 and 400, a dedicated control element including the storage element, a communication element, a display element, and an input element.

The control unit 140, 240, 340 and 440 may control the at least one first power conversion device 110, 210, 310 and 410, the second power conversion device 120, 220, 320 and 420, and the plurality of circuit breakers 130, 230, 330 and 430.

The control unit 140, 240, 340 and 440 may include a programmable logic controller (PLC) that controls the at least one first power conversion device 110, 210, 310 and 410, the second power conversion device 120, 220, 320 and 420, and the plurality of circuit breakers 130, 230, 330 and 430.

The control unit 140, 240, 340 and 440 may monitor the state of the at least one first power conversion device 110, 210, 310 and 410, the second power conversion device 120, 220, 320 and 420, and the plurality of circuit breakers 130, 230, 330 and 430, and control the operation of the at least one first power conversion device 110, 210, 310 and 410, the second power conversion device 120, 220, 320 and 420, and the plurality of circuit breakers 130, 230, 330 and 430 based on a result of monitoring.

The control unit 140, 240, 340 and 440 may also control the operation of the at least one first power conversion device 110, 210, 310 and 410, the second power conversion device 120, 220, 320 and 420, and the plurality of circuit breakers 130, 230, 330 and 430 based on the state of the at least one power supply source 10 and the load 20.

The control unit 140, 240, 340 and 440 may control the operation of each of the at least one first power conversion device 110, 210, 310 and 410 to control the conversion and supply of the DC power.

For instance, the operation of a control target conversion device among the at least one first power conversion device 110, 210, 310 and 410 may be controlled to control the conversion and supply of the DC power to the second power conversion device 120, 220, 320 and 430 through the control target conversion device.

The control unit 140, 240, 340 and 440 may also control the opening and closing of each opening and closing element included in the at least one first power conversion device 110, 210, 310 and 410.

The control unit 140, 240, 340 and 440 may control the operation of each of the second power conversion devices 120, 220, 320 and 420 to control the conversion and supply of the driving power.

For instance, the operation of a control target conversion device among the second power conversion device 120, 220, 320 and 420 may be controlled to control the conversion and supply of the driving power to the load 20 through the control target conversion device.

The control unit 140, 240, 340 and 440 may also control the opening and closing of each of the opening and closing element included in the second power conversion device 120, 220, 320 and 420.

The control unit 140, 240, 340 and 440 may control the operation of the plurality of circuit breakers 130, 230, 330 and 430 to control the reception and supply of the DC power.

For instance, the plurality of circuit breakers 130, 230, 330 and 430 may be closed to receive the DC power from the bus line 1 or to supply the DC power to the bus line 1.

The control unit 140, 240, 340 and 440 may also perform communication with at least one of an external communication device and a control device to control the operation of the at least one first power conversion device 110, 210, 310 and 410, the second power conversion device 120, 220, 320 and 420, and the plurality of circuit breakers 130, 230, 330 and 430 according to a result of performing the communication.

For instance, a control command for the operation control of at least one first power conversion device 110, 210, 310 and 410, the second power conversion device 120, 220, 320 and 420, and the plurality of circuit breakers 130, 230, 330 and 430 may be received from the control device to control the operation of the at least one first power conversion device 110, 210, 310 and 410, the second power conversion device 120, 220, 320 and 420, and the plurality of circuit breakers 130, 230, 330 and 430 according to the control command.

The control unit 140, 240, 340 and 440 may receive power from any one of the at least one power supply source 10 to control the conversion of the power into the DC power.

In other words, the control unit 140, 240, 340 and 440 may control to selectively receive power from any one of the at least one power supply source 10.

The control unit 140, 240, 340 and 440 may receive power from any one of the at least one power supply source 10 according to a preset supply criterion to control the conversion of the power into the DC power.

The supply criterion may be a criterion for priority of power supply of the at least one power supply source 10.

For instance, the priority may be set in the order of the first AC power source 10 #1, the second AC power source 10 #3, and the battery power source 10 #2.

When the supply criterion is as described above, the control unit 140, 240, 340 and 440 may control the supply of power in the order of the first AC power source 10 #1, the second AC power source 10 #3, and the battery power source 10 #2.

When power is supplied from the first AC power source 10 #1, the control unit 140, 240, 340 and 440 may control the operation of the first conversion device 110 #1, 210 #1, 310 #1 and 410 #1 connected to the first AC power source 10 #1.

In this case, the control unit 140, 240, 340 and 440 may close the opening and closing element of the first conversion device 110 #1, 210 #1, 310 #1 and 410 #1, and open the opening and closing elements of the second conversion device 110 #2, 210 #2, 310 #2 and 410 #2 and the third conversion device 110 #3, 210 #3, 310 #3 and 410 #3 to connect the first conversion device 110 #1, 210 #1, 310 #1 and 410 #1, and disconnect the second conversion device 110 #2, 210 #2, 310 #2 and 410 #2 and the third conversion device 110 #3, 210 #3, 310 #3 and 410 #3.

When power is supplied from the second AC power source 10 #3, the control unit 140, 240, 340 and 440 may control the operation of the third conversion device 110 #3, 210 #3, 310 #3 and 410 #3 connected to the second AC power source 10 #3.

In this case, the control unit 140, 240, 340 and 440 may close the opening and closing element of the third conversion device 110 #3, 210 #3, 310 #3 and 410 #3, and open the opening and closing element of the first conversion device 110 #1, 210 #1, 310 #1 and 410 #1, and the second conversion device 110 #2, 210 #2, 310 #2, and 410 #2 to connect only the third conversion device 110 #3, 210 #3, 310 #3, and 410 #3, and disconnect the first conversion device 110 #1, 210 #1, 310 #1 and 410 #1, and the second conversion device 110 #2, 210 #2, 310 #2, and 410 #2.

When power is supplied from the battery power source 10 #2, the control unit 140, 240, 340 and 440 may control the operation of the second conversion device 110 #2, 210 #2, 310 #2 and 410 #2 connected to the battery power source 10 #2.

In this case, the control unit 140, 240, 340 and 440 may close the opening and closing element of the second conversion device 110 #2, 210 #2, 310 #2 and 410 #2, and open the opening and closing element of the first conversion device 110 #1, 210 #1, 310 #1 and 410 #1, and the third conversion device 110 #3, 210 #3, 310 #3, and 410 #3 to connect only the second conversion device 110 #2, 210 #2, 310 #2, and 410 #2, and disconnect the first conversion device 110 #1, 210 #1, 310 #1 and 410 #1, and the third conversion device 110 #3, 210 #3, 310 #3, and 410 #3.

The control unit 140, 240, 340 and 440 may select any one of the at least one first power conversion device 110, 210, 310 and 410 according to the state of the at least one power supply source 10 to allow the selected conversion device 110 to transfer the DC power to each of the second power conversion devices 120, 220, 320 and 420.

In other words, the control unit 140, 240, 340 and 440 may convert the DC power through one conversion device 110 selected from the at least one first power conversion device 110, 210, 310 and 410 to transfer the converted DC power to the second power conversion device 120, 220, 320 and 420.

For instance, when an abnormality occurs in the first AC power source 10 #1 and the second AC power source 10 #3 among the at least one power supply source 10, the second conversion device 110 #2, 210 #2, 310 #2 and 410 #2 connected to the battery power source 10 #2 may be selected to control the second conversion device 110 #2, 210 #2, 310 #2 and 410 #2 to receive power from the battery power source 10 #2 and convert it into the DC power, and transfer the DC power to each of the second power conversion devices 120, 220, 320 and 420.

When an abnormality occurs in at least one of a conversion device 110 that is transferring the DC power to the second power conversion device 120, 220, 320 and 420 and a power supply source 10 corresponding to the conversion device 110, the control unit 140, 240, 340 and 440 may control another conversion device 110 other than the conversion device 110 to transfer the DC power to the second power conversion device 120, 220, 320 and 420.

When an abnormality occurs in at least one of a conversion device 110 that is transferring the DC power and a power supply source 10 corresponding to the conversion device 110, the control unit 140, 240, 340 and 440 may switch the power supply source 10 that is supplying power and the conversion device 110 to allow another conversion device 110 other than the conversion device 110 to transfer the DC power to the second power conversion device 120, 220, 320 and 420.

For example, when the first conversion device 110 #1, 210 #1, 310 #1 and 410 #1 fail or when a shutdown occurs in the first AC power source 10 #1 while receiving power from the first AC power source 10 #1 to convert the power into the DC power through the first conversion device 110 #1, 210 #1, 310 #1 and 410 #1, the first AC power source 10 #1 that is supplying power may be switched to the second AC power source 10 #3, and the first conversion device 110 #1, 210 #1, 310 #1 and 410 #1 may be switched to the third conversion device 110 #3, 210 #3, 310 #3, and 410 #3 to receive power from the second AC power source 10 #3 such that the third conversion device 110 #3, 210 #3, 310 #3, and 410 #3 converts the DC power to transfer the DC power to the inverter 120.

In this way, the control unit 140, 240, 340 and 440 that controls the at least one first power conversion device 110, 210, 310 and 410, the second power conversion device 120, 220, 320 and 420, and the plurality of circuit breakers 130, 230, 330 and 430 controls the opening and closing of the plurality of circuit breakers 130, 230, 330 and 430 according to the state of the DC power or the driving power to control the reception and supply of the DC power through the bus line 1.

For example, when the magnitude of the driving power is less than the required magnitude of the load 20, or when the DC power is insufficient, the plurality of circuit breakers 130, 230, 330 and 430 may be closed to receive the DC power from the bus line 1.

Alternatively, when the magnitude of the driving power is greater than the required magnitude of the load 20, or when the DC power is sufficient, the plurality of circuit breakers 130, 230, 330 and 430 may be closed to supply the DC power to the bus line 1.

In the opposite case, when a fault current flows to the output end due to a failure occurring in the at least one first power conversion device 110, 210, 310 and 410 or the second power conversion device 120, 220, 320 and 420, or the fault current flows to the output end due to an abnormality occurring in the at least one power supply source 10 or the load 20, the plurality of circuit breakers 130, 230, 330 and 430 may be opened to prevent the fault current from being supplied to the bus line 1.

When an abnormality occurs in two or more of the at least one power supply source 10, the control unit 140, 240, 340 and 440 may close the plurality of circuit breakers 130, 230, 330, and 430 to control the DC power to be supplied from another power supply device connected to the bus line 1 through the bus line 1.

When an abnormality occurs in two or more of the at least one power supply source 10, the control unit 140, 240, 340, and 440 may disconnect a connection to the at least one power supply source 1 and the at least one first power conversion device 110, 210, 310 and 410, and close the plurality of breakers 130, 230, 330 and 430 to control the DC power to be supplied from the other power supply device 200, 300 and 400 or the supply panel 500 connected to the bus line 1 through the bus line 1.

For instance, when an abnormality occurs in the first AC power source 10 #1 and the second AC power 10 #3 among the at least one power supply source 10, the plurality of circuit breakers 130, 230, 330 and 430 may be closed to control the DC power to be supplied from the other power supply devices 200, 300 and 400 or the supply panel 500 connected to the bus line 1 through the bus line 1.

When an abnormality occurs in the other power supply device 200, 300 and 400 or the supply panel 500 connected to the bus line 1, the control unit 140, 240, 340 and 440 may close the plurality of circuit breakers 130, 230, 330 and 430 to supply DC power to the other power supply devices 200, 300, and 400 through the bus line 1.

When an abnormality occurs in the other power supply devices 100, 200, 300 or 400 connected to the bus line 1, the control unit 140, 240, 340 and 440 may control power to be further supplied from any one of the at least one power supply source 10, and close the plurality of circuit breakers 130, 230, 330 and 430 to supply the DC power converted by the supply source 10 controlled to further supply power and a conversion device 110 corresponding thereto to be supplied to the other power panel through the bus line 1.

For instance, when an abnormality occurs in the other power supply devices 100, 200, 300 and 400 while receiving power from the first AC power source 10 #1 among the at least one power supply source 10, the plurality of circuit breakers 130, 230, 330 and 430 may be closed to control the third conversion device 110 #3, 210 #3, 310 #3 and 410 #3 to further receive power from the second AC power source 10 #3 so as to supply the DC power converted by the third conversion device 110 #3, 210 #3, 310 #3 and 410 #3 to the other power panels 200, 300 and 400 connected to the bus line 1 through the bus line 1.

When an abnormality occurs in the at least one power supply source 10, the control unit 140, 240, 340 and 440 may close the plurality of circuit breakers 130, 230, 330, 430 and 530 to request control to the control device 600 so as to receive the DC power from the supply panel 500.

The control device 600 may control the opening and closing of each of the plurality of circuit breakers 130, 230, 330 and 430 and 500 to allow the plurality of power panels 100, 200, 300 and 400 or the supply panel 500 to be connected to the bus line 1.

The bus line 1 may be connected to the plurality of power panels 100, 200, 300 and 400 and the supply panel 500.

The plurality of power panels 100, 200, 300 and 400 and the supply panel 500 may be connected to the bus line 1 through the plurality of circuit breakers 130, 230, 330 and 430 and 530.

The plurality of circuit breakers 130, 230, 330, 430 and 530 may be respectively between each of the plurality of power panels 100, 200, 300 and 400 and the bus line 1, and between the supply panel 500 and the bus line 1.

The plurality of circuit breakers 130, 230, 330, 430 and 530 may include first to fourth circuit breakers 130, 230, 330 and 430 that control a connection between each of the plurality of power panels 100, 200, 300 and 400 and the bus line 1, and a fifth circuit breaker 530 that controls a connection between the supply panel 500 and the bus line 1.

In other words, the supply panel 500 may be provided with the fifth circuit breaker 530 on an electric circuit connected to the bus line 1 to control a connection to the bus line 1 through opening and closing of the fifth circuit breaker 530.

The supply panel 500 may transfer the DC power output from the at least one first power conversion device 510 to the bus line 1.

The power ends through which the DC power is input and output from each of the plurality of power panels 100, 200, 300 and 400 and the supply panel 500 may be connected in common, and the DC power converted by the plurality of power panels 100, 200, 300 and 400 and the supply panel 500 may be transferred thereto.

The bus line 1 is a DC bus line through which DC power flows, and DC power transferred through the power end of each of the plurality of power panels 100, 200, 300 and 400 and the supply panel 500 may flow therethrough.

In other words, on the bus line 1, the DC power may flow according to the opening and closing of each of the plurality of breakers 130, 230, 330 and 430 and 530.

In this way, the plurality of power panels 100, 200, 300 and 400 and the supply panel 500 may be connected to the bus line 1 through the plurality of circuit breakers 130, 230, 330, 430 and 530 thereby performing the transfer of the DC power between the plurality of power panels 100, 200, 300 and 400 and the supply panel 500 through the bus line 1.

Each of the plurality of power panels 100, 200, 300 and 400 may transfer a result of controlling and monitoring the operation of the at least one first power conversion device 110, 210, 310 and 410 and the second power conversion device 120, 220, 320 and 420 included therein to the control device 600.

Each of the plurality of power panels 100, 200, 300 and 400 may control and monitor the operation of the at least one first power conversion device 110, 210, 310 and 410 and the second power conversion device 120, 220, 320 and 420 included therein to detect the state of the DC power and the driving power.

Each of the plurality of power panels 100, 200, 300 and 400 may detect the state of the DC power and the driving power to transfer the detection result to the control device 600.

The supply panel 500 may control the opening and closing of the fifth circuit breaker 510 according to a result of controlling and monitoring the operation of the at least one first power conversion device 510.

The supply panel 500 may transfer the result of controlling and monitoring the operation of the at least one first power conversion device 510 to the control device 600.

The supply panel 500 may control and monitor the operation of the at least one first power conversion device 510 to detect the state of the DC power.

The supply panel 500 may detect the state of the DC power, and transfer the detection result to the control device 600.

The control device 600 may communicate with each of the plurality of power panels 100, 200, 300 and 400 and the supply panel 500 to control each of the plurality of power panels 100, 200, 300 and 400 and the supply panel 500 based on state information received from each of the plurality of power panels 100, 200, 300 and 400 and the supply panel 500.

For instance, according to the state information of the DC power and the driving power received from each of the plurality of power panels 100, 200, 300 and 400 and the supply panel 500, the conversion and supply of the DC power of each of the plurality of power panels 100, 200, 300 and 400 and the supply panel 500, and the conversion and supply of the driving power of each of the plurality of power panels 100, 200, 300 and 400 and the supply panel 500 may be controlled.

The control device 600 may communicate with each of the plurality of power panels 100, 200, 300 and 400 and the supply panel 500 to convert and supply the driving power to each of the plurality of power panels 100, 200, 300 and 400 and the supply panel 500, or control the plurality of circuit breakers 130, 230, 330, 430 and 530 included in each of the plurality power panels 100, 200, 300 and 400 and the supply panel 500 based on the state information received from each of the plurality of power panels 100, 200, 300 and 400 and the supply panel 500.

The control device 600 may also detect the state of the at least one power supply source 10 and receive information on the state of the at least one power supply source 10 and the load 20 from an external communication element to convert and supply the driving power of each of the plurality of power panels 100, 200, 300 and 400 and the supply panel 500 or control the plurality of circuit breakers 130, 230, 330, 430 and 530 included in the plurality of power panels 100, 200, 300 and 400 and the supply panel 500 based on the state of the at least one power supply source 10 and the load 20.

In this case, the control device 600 may transfer a control command for the conversion and supply of the driving power of each of the plurality of power panels 100, 200, 300 and 400 and the supply panel 500, or the control of each of the plurality of circuit breakers 130, 230, 330, 430 and 530 included in the plurality of power panels 100, 200, 300 and 400, and the supply 500 to each of the plurality of power panels 100, 200, 300 and 400 and the supply panel 500 to perform control according to the control command through the control unit 140, 240, 340 and 440 included in each of the plurality of power panels 100, 200, 300 and 400.

For example, when an abnormality occurs in the entire system power source (G) that is supplying power to the plurality of power panels 100, 200, 300 and 400, the control device 600 may transfer a control command for controlling to open the plurality of circuit breakers 130, 230, 330 and 430 so as to cut off power supply from the system power source (G) and switch to another supply source, and receive power from a power source other than the system power source (G) so as to convert and supply the DC power to the control unit 140, 240, 340 and 440 included in each of the plurality of power panels 100, 200, 300, and 400, thereby opening each of the plurality of circuit breakers 130, 230, 330 and 430, and receiving power from the bypass power source (P) or the battery power source (B) to convert and supply the DC power.

When an abnormality occurs in at least one of the plurality of power panels 100, 200, 300 and 400, the control device

600 may close the circuit breakers 130, 230, 330, 430 and 530 of the abnormality occurred power panel and the supply panel 500 to control the abnormality occurred power panel to receive the DC power from the supply panel 500 through the bus line 1.

For example, when a failure occurs in the conversion device 110 of the first power panel 100 among the plurality of power panels 100, 200, 300 and 400, in order to supply DC power converted by any one conversion device 510 of the supply panel 500 to the second power conversion device 120, 220, 320 and 420 of the first power panel 100 through the bus line 1, a control command for closing a circuit breaker 130 and 530 of each of the first power panel 100 and the supply panel 500, cutting off the at least one first power conversion device 110, 210, 310 and 410 of the first power panel 100, and supplying the DC power converted by any one of the at least one conversion device 510 of the supply panel 500 to the second power conversion device 120, 220, 320 and 420 of the first power panel 100 through the bus line 1 may be transferred to each of the first power panel 100 and the supply panel 500 to close the circuit breaker 130 and 530 of the first power panel 100 and the supply panel 500, and allow any one of the at least one conversion device 510 of the supply panel 500 to supply the DC power to the second power conversion device 120, 220, 320 and 420 of the first power panel 100 through the bus line 1.

In other words, when an abnormality occurs in the plurality of power panels 100, 200, 300 and 400, the supply panel 500 may supply the DC power to the load 20 of the abnormality occurred power panel through the bus line 1.

When the DC power is supplied to the abnormality occurred power panel, the supply panel 500 may select any one of the at least one first power conversion device 510 that converts the DC power according to the state of the at least one power supply source 10 to transfer the DC power to the bus line 1 through the selected converter.

In other words, when the DC power is supplied to the abnormality occurred power panel, the supply panel 500 may transfer the DC power to the bus line 1 through one converter selected according to the state of the at least one power supply source 10, thereby supplying the DC power to the abnormality occurred power panel.

For instance, when a rating of the system power source (G) and the bypass power source (P) among the at least one power supply source 10 that supplies power to the supply panel 500 is lower than a reference rating, the second-5 conversion device 510 #2 corresponding to the battery power source (B) may be selected to supply the DC power through the battery power source (B) to convert power received from the battery power source (B) into the DC power through the selected second-5 conversion device 510 #2 and transfer the converted DC power to the bus line 1.

When an abnormality occurs in the supply panel 500, the control device 600 may close a circuit breaker of a power panel most adjacent to the abnormality occurred power panel, and control the abnormality occurred power panel to receive the DC power from the adjacent power panel through the bus line 1.

In other words, when an abnormality occurs in the supply panel 500 that supplies the DC power to the abnormality occurred power panel, and the supply panel 500 fails to supply the DC power to the abnormality occurred power panel, the control device 600 may close the circuit breakers 130, 230, 330 and 430 of the abnormality occurred power panel and a power panel most adjacent the power panel to allow the abnormality occurred power panel to receive the DC power from the adjacent power panel through the bus line 1.

For example, when a failure occurs in the conversion device 110 of the first power panel 100 and the supply panel 500 among the plurality of power panels 100, 200, 300 and 400, in order to supply DC power converted by any one conversion device 210 of the second power panel 200 most adjacent to the first power panel 100 to the second power conversion device 120, 220, 320 and 420 of the first power panel 100 through the bus line 1, a control command for closing to a circuit breaker 130 and 230 of each of the first power panel 100 and the second power panel 200, cutting off the at least one first power conversion device 110, 210, 310 and 410 of the first power panel 100, and supplying the DC power converted by any one of the at least one conversion device 210 of the second power panel 200 to the second power conversion device 120, 220, 320 and 420 of the first power panel 100 through the bus line 1 may be transferred to each of the first power panel 100 and the second power panel 200 to close the circuit breaker 130 and 230 of each of the first power panel 100 and the second power panel 200, and allow any one of the at least one conversion device 210 of the second supply panel 200 to supply the DC power to the second power conversion device 120, 220, 320 and 420 of the first power panel 100 through the bus line 1.

When there are a plurality of the abnormality occurred power panels, the control device 600 may close at least one circuit breaker 130, 230, 330, 430 and 530 of the supply panel 500 and a power panel most adjacent to the abnormal occurred power panel according to the abnormal state of each of the abnormality occurred power panels to allow each of the abnormality occurred power panels to receive the DC power from at least one of the supply panel 500 and the adjacent power panel from the bus line 1.

In other words, when there are a plurality of the abnormality occurred power panels, the control device 600 may control at least one of the supply panel 500 and the adjacent power panel to supply the DC power to each of the abnormality occurred power panels according to the abnormal state of each of the abnormality occurred power panels.

For example, when a failure occurs in all of the at least one first power conversion device 110, 210, 310 and 410 in the first power panel 100, and the operation of some of the second power conversion devices 220 is interrupted in the second power panel 200, the control device 600 may determine that the abnormal state of the first power panel 100 is more serious than the abnormal state of the second power panel 200, and close the first and fifth circuit breakers 130 and 530 to allow the supply panel 500 to supply the DC power to the first power panel 100 so as to restore the operation of the first power panel 100 through the supply panel 500, and maintain the operation of the second power panel 200 through the third power panel 300 adjacent to the second power panel 200, and close the second and third circuit breakers 230 and 330 to allow the third power panel 300 to supply the DC power to the power panel 200.

In this way, when an abnormality occurs in at least one of the plurality of power panels 100, 200, 300 and 400, the DC power may be controlled to be supplied from the supply panel 500 from the bus line 1 to allow the supply panel 500 to perform a UPS function for each of the power panels 100, 200, 300 and 400.

Accordingly, in the power supply system 1000, even when an unexpected abnormality occurs in the at least one power supply source 10, the plurality of power panels 100, 200, 300 and 400, and the load 20, the supply of the driving power to the load 20 may be continuously maintained, thereby maintaining the operation of the load 20 with no interruption, performing an appropriate and active power supply response for an abnormality occurrence, and stably performing the operation of the load 20 and the control of the power supply system 1000 regardless of the type and extent of the abnormality occurrence.

An example of the operation of the power supply system 1000 as described above may be performed as illustrated in FIGS. 13 to 16.

The example of the operation as illustrated in FIGS. 13 to 16 is an example of an operation when the power system 1000 includes four power panels 100, 200, 300 and 400 and one supply panel 500, and the power supply system 1000 may include less than five, or five or more of the plurality of power panels 100, 200, 300 and 400, and may include the supply panel 500.

A preferred embodiment of the power supply system 1000 may include three power panels 100, 200, 300 and 400 and one supply panel 500 as illustrated in FIGS. 13 to 16, and hereinafter, a case where numbers of the plurality of power panels 100, 200, 300 and 400 and the supply panel 500 are four and one, respectively, illustrated in FIGS. 13 to 16 will be described as an example.

FIG. 13 is a case in which each of the plurality of power panels 100, 200, 300 and 400 and the supply panel 500 receives power from the system power source (G) among the at least one power supply source 10, and in this case, power supply from the bypass power source (P) and the battery power source (B) may be cut off, and power may be supplied through the system power source (G) and converted in the order of the DC power and the driving power to be supplied to each of the loads 20.

The example of operation as illustrated in FIG. 13 is a case of a typical operation in which power is supplied for operation from the system power source (G), and a normal operation of the power supply system 1000 may be performed in this manner.

Figure 14:
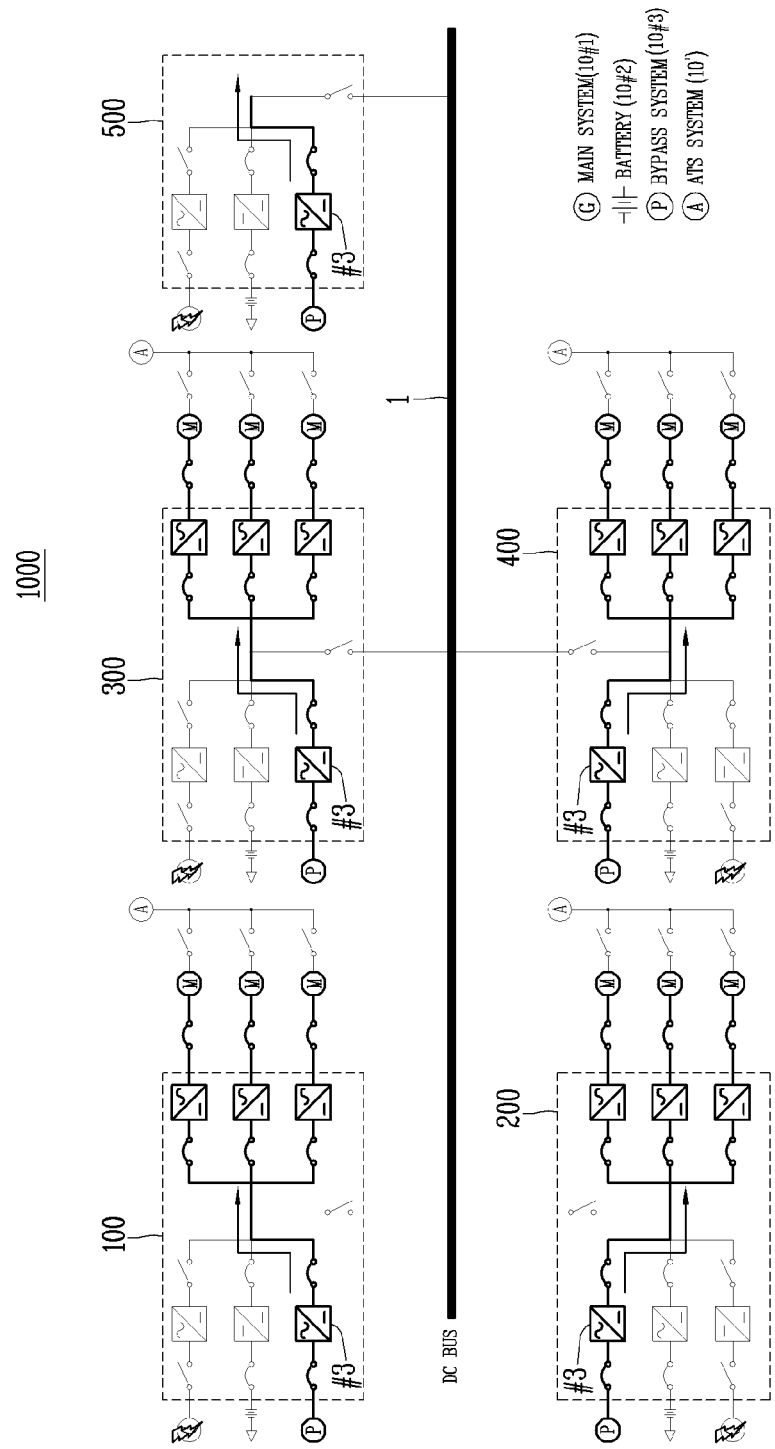
FIG. 14 is an exemplary view 2 showing a specific example of a power supply system according to another embodiment of the present disclosure.

FIG. 14 is a case in which each of the plurality of power panels 100, 200, 300 and 400 and the supply panel 500 receives power from the bypass power source (P) among the at least one power supply source 10, and a case in which an abnormality occurs in the system power source (G) may correspond thereto, and in this case, power supply from the system power source (G) and the battery power source (B) may be cut off, and power may be supplied through the bypass power source (P) and converted in the order of the DC power and the driving power to be supplied to each of the loads 20.

The example of operation as illustrated in FIG. 14 is a case of a special operation in which power is supplied for operation from the bypass power source (P), and the special operation of the power supply system 1000 may be performed in this manner.

Figure 15:
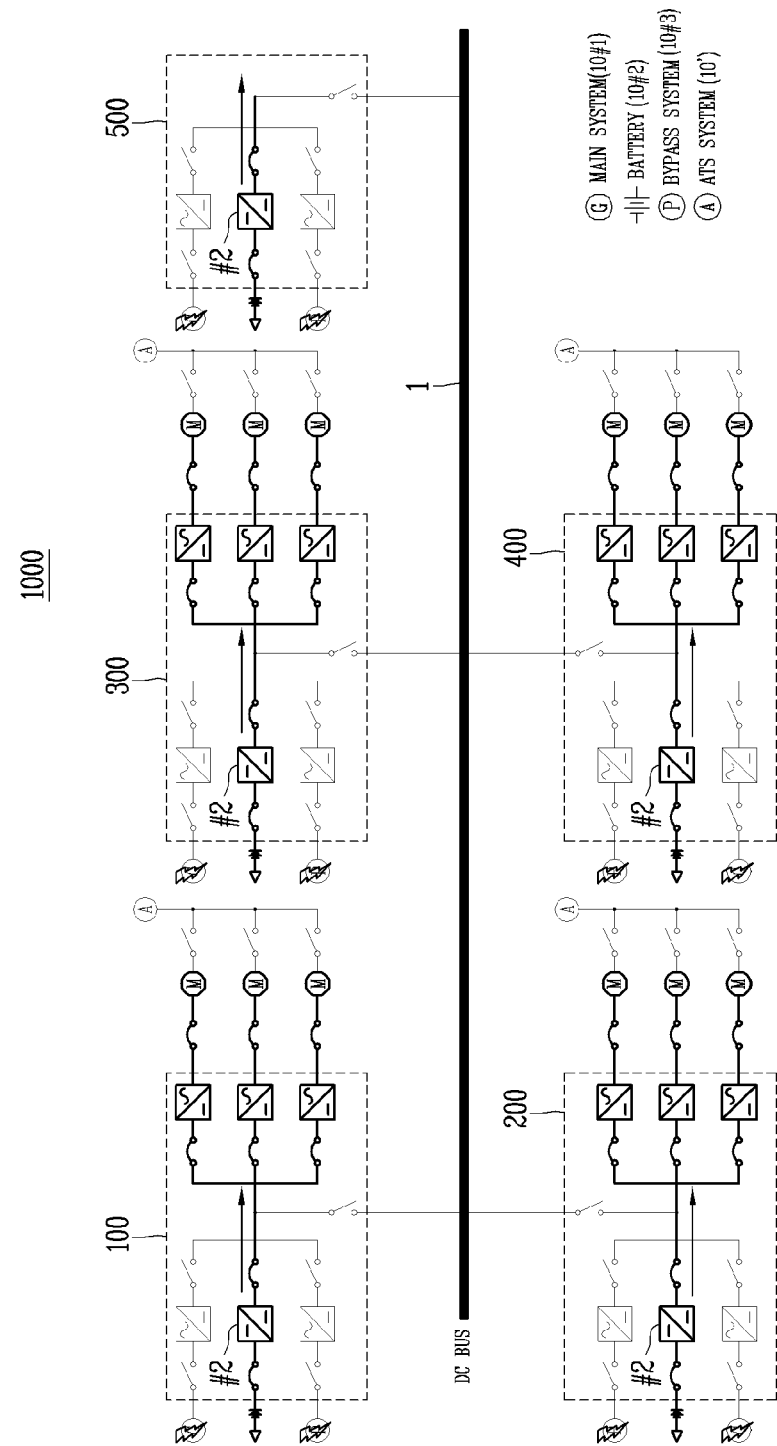
FIG. 15 is an exemplary view 3 showing a specific example of a power supply system according to another embodiment of the present disclosure.

FIG. 15 is a case in which each of the plurality of power panels 100, 200, 300 and 400 and the supply panel 500 receives power from the battery power source (B) among the at least one power supply source 10, and a case in which an abnormality occurs in the system power source (G) and the bypass power source (P) may correspond thereto, and in this case, power supply from the system power source (G) and the bypass power source (P) may be cut off, and power may be supplied through the battery power source (B) and converted in the order of the DC power and the driving power to be supplied to each of the loads 20.

The example of the operation as illustrated in FIG. 15 is a case of a power outage operation in which power is supplied from the battery power source (B), and the power outage operation of the power supply system 1000 may be performed in this manner.

Figure 16:
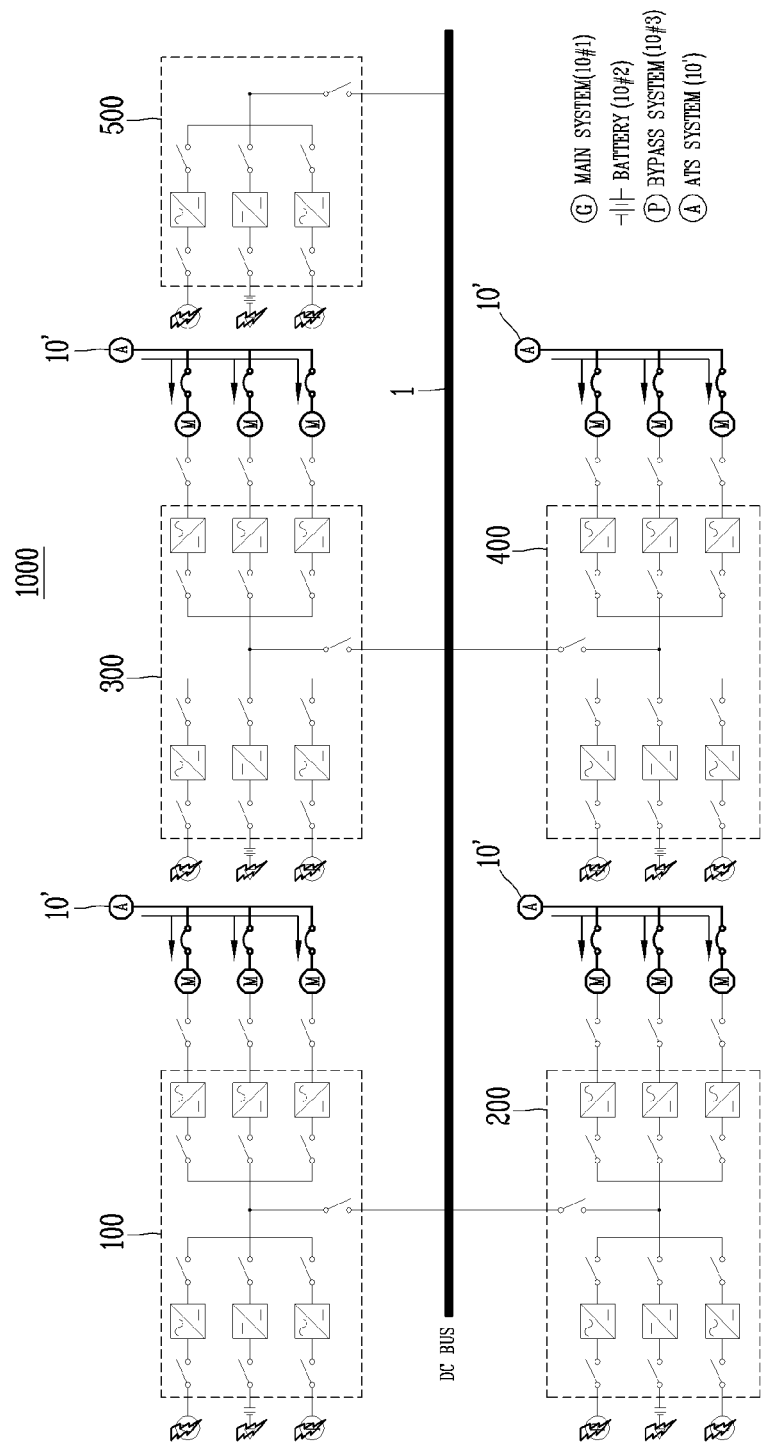
FIG. 16 is an exemplary view 4 showing a specific example of a power supply system according to another embodiment of the present disclosure.

FIG. 16 is a case in which each of the plurality of power panels 100, 200, 300 and 400 and the supply panel 500 receives power from the emergency power source (A) among the at least one power supply source 10, and a case in which an abnormality occurs in the system power source (G), the bypass power source (P) and the battery power supply (B) may correspond thereto, and in this case, power supply from the system power source (G), the bypass power source (P) and the battery power source (B) may be cut off, and the emergency power source (A) may directly supply the driving power to each of the loads 20.

The example of the operation as illustrated in FIG. 16 is a case of emergency operation in which power is supplied from the emergency power source (A), and the emergency operation of the power supply system 1000 may be performed in this manner.

As described above, in the power supply system 1000, each of the plurality of power panels 100, 200, 300 and 400 and the supply panel 500 may be operated by receiving power from the same power supply source, or each of the plurality of power panels 100, 200, 300 and 400 and the supply panel 500 may be operated by selectively receiving power from any one of the at least one power supply source 10.

For instance, the first and second power panels 100 and 200 may be operated by receiving power from the system power source (G), and the third and fourth power panels 300 and 400 may be operated by receiving power from the bypass power source (P), and the supply panel 500 may be operated by receiving power from the battery power source (B).

Furthermore, each of the plurality of power panels 100, 200, 300 and 400 and the supply panel 500 may be operated by receiving power from at least one power supply source 10.

For instance, when an abnormality occurs in the first power panel 100 and the DC power is supplied from the second power panel 200 to the first power panel 100, the second power panel 200 may convert power supplied from the system power source (G) into the DC power through the second-1 conversion device 210 #1 and transfer the DC power to each of the second power conversion device 220, and power may be further supplied from the bypass power source (P) to convert the power into the DC power through a second-3 conversion device 210 #3, and the DC power converted by the second-3 conversion device 210 #3 may be transferred to each of the second power conversion devices 120, 220, 320 and 420 of the power panel 100 through the bus line 1.

In the case of this example, the first and second circuit breakers 130 and 230 of each of the first power panel 100 and the second power panel 200 may be closed to connect the first power panel 100 and the second power panel 200 to the bus line 1 and supply the DC power from the second power panel 200 to the first power panel 100 through the bus line 1.

As described above, each of the plurality of power panels 100, 200, 300 and 400 and the supply panel 500 may be operated by receiving power from at least one power supply source 10, thereby performing power supply between the plurality of power panels 100, 200, 300 and 400 and the supply panels 500, that is, a UPS function between the plurality of power panels 100, 200, 300 and 400 and a UPS function of the supply panel 500.

The embodiments of the power supply system according to the present disclosure as described above may be applicable to a power supply device that supplies and uses DC power, a power supply system, and a method of operating the power supply system. In particular, it may be usefully applied to a DC UPS module and a power supply system having the same, and may also be applied and implemented to a motor control panel, a motor control system, a motor operation system, etc. that control a plurality of motor loads.

Although a specific embodiment according to the present disclosure has been described so far, various modifications may be made thereto without departing from the scope of the present disclosure. Therefore, the scope of the present disclosure should not be limited to the described embodiments and should be defined by the claims to be described later as well as the claims and equivalents thereto.

Although the present disclosure has been described with respect to specific embodiments and drawings, the present invention is not limited to those embodiments, and it will be apparent to those skilled in the art that various changes and modifications can be made from the description disclosed herein. Accordingly, the concept of the present disclosure should be construed in accordance with the appended claims, and all the same and equivalent changes will fall into the scope of the present disclosure.

What is claimed is:

1. A power supply system, comprising:
   a plurality of power panels, wherein each power panel converts power supplied from a plurality of power sources into DC power, and converts the DC power into driving power of a load, and supplies the driving power to the load;
   a DC electric circuit to which one end and the other end thereof are connected to connect each power end through which the DC power is input and output in each of the plurality of power panels, and conduct the DC power converted by the plurality of power panels; and
   a plurality of circuit breakers respectively disposed between the power ends on the DC electric circuit to connect or disconnect two power ends connected to the electric circuit disposed therein,
   wherein the plurality of circuit breakers are opened and closed differently according to the power supply state of at least one of the plurality of power panels to connect or disconnect the DC power between the plurality of power panels, and when power supply is interrupted in at least one of the plurality of power panels, at least one of the circuit breakers connected to a power end of the power panel in which the power supply is interrupted is closed to connect at least one of the power ends at both sides of the power end of the interrupted power panel and the power end of the interrupted power panel,
   wherein the plurality of power sources comprises:
      a first AC power source and a second AC power source that supply AC power, and
      a battery power source in which DC power is stored to supply the stored power to the plurality of power panels while the power supply is switched and restored when the power supply of the first AC power source and the second AC power source is interrupted,
   wherein after the power supply is interrupted, the battery power source supplies the stored power to the plurality of power panels with no interruption until the power supply is switched and restored.

2. The power supply system of claim 1, wherein the at least one power supply source further comprises an emergency power source that supplies emergency power to the load when the power supply of the first AC power source, the second AC power source, and the battery power source is interrupted.

3. The power supply system of claim 1, wherein each of the plurality of power panels comprises:
   at least one first power conversion device that converts power supplied from the at least one power supply source into the DC power; and
   a second power conversion device that converts the DC power supplied from the at least one first power conversion device into the driving power to supply the driving power to the load.

4. The power supply system of claim 3, wherein the plurality of power panels supply the DC power to the second power conversion device through any one of the at least one first power conversion device according to the state of the at least one power supply source.

5. The power supply system of claim 4, wherein when the power supply of a conversion device that supplies the DC power to the second power conversion device is interrupted, the plurality of power panels supply the DC power to the second power conversion device through another conversion device other than the conversion device.

6. The power supply system of claim 5, wherein while the conversion device is switched to the other conversion device, the at least one first power conversion device supplies the DC power to the second power conversion device through a conversion device that receives power from the battery power source.

7. The power supply system of claim 1, wherein the plurality of power panels are connected to a power end at one side and a power end at the other side connected on the DC electric circuit to allow a connection between the power ends to be continuous.

8. The power supply system of claim 7, wherein in the plurality of power panels, a connection between the power ends is continuous to allow a connection between the plurality of power panels to form a loop structure.

9. The power supply system of claim 1, wherein the plurality of circuit breakers are closed when the DC power is connected between the plurality of power panels, and opened when the DC power is disconnected between the plurality of power panels.

10. The power supply system of claim 1, wherein in the plurality of circuit breakers, when the power supply of at least one of the plurality of power panels is interrupted, at least one circuit breaker disposed between the power panel in which the power supply is interrupted and a power panel adjacent to the interrupted power panel is closed to connect the interrupted power panel and the adjacent power panel so as to supply the DC power from the adjacent power panel to the interrupted power panel.

11. The power supply system of claim 10, wherein the interrupted power panel is supplied with the DC power from a conversion device connected to the battery power source until the power supply is interrupted, and the DC power conducted from the adjacent power panel is supplied.

12. A power supply system, comprising:
   a plurality of power panels, wherein each power panel each converts power supplied from a plurality of power sources into DC power, and converts the converted DC power into driving power of a load, and supplies the driving power to the load;

a supply panel that converts power supplied from at least one power supply source into DC power, and supplies the converted DC power to a power panel connected thereto when disposed between any two power panels among the plurality of power panels, and connected to either of the two power panels;
a DC electric circuit to which one end and the other end thereof are connected, and a power end through which the DC power is input and output in each of the plurality of power panels and the supply panel is connected to conduct the DC power converted by the plurality of power panels and the supply panel; and
a plurality of circuit breakers disposed between the power ends on the DC electric circuit to connect or disconnect two power ends connected to the electric circuit disposed therein,
wherein the plurality of circuit breakers are opened and closed differently according to the power supply state of at least one of the plurality of power panels to connect or disconnect the DC power between each of the plurality of power panels and a power panel adjacent thereto or the supply panel, and
when power supply is interrupted in at least one of the plurality of power panels, at least one of the circuit breakers connected to a power end of a power panel in which the power supply is interrupted is closed to connect at least one of the power ends at both sides of the power end of the interrupted power panel and the power end of the interrupted power panel so as to supply the DC power to the interrupted power panel from at least one of the adjacent power panel and the supply panel,
wherein the plurality of power sources comprises:
a first AC power source and a second AC power source that supply AC power, and
a battery power source in which DC power is stored to supply the stored power to the plurality of power panels while the power supply is switched and restored when the power supply of the first AC power source and the second AC power source is interrupted,
wherein after the power supply is interrupted, the battery power source supplies the stored power to the plurality of power panels with no interruption until the power supply is switched and restored.

13. The power supply system of claim 12, wherein in the plurality of power panels, a power end through which the DC power is input and output is connected to each of the power ends of two adjacent power panels, or connected to a power end of one adjacent power panel and a power end of the supply panel, respectively, and a power end of a power panel at one side and a power end of a power panel at the other side or a power end of the supply panel is connected to allow a connection between the power ends to be continuous.

14. The power supply system of claim 13, wherein in the plurality of power panels and the supply panel, a connection between the power ends is continuous to allow a connection between the plurality of power panels and the supply panel to form a loop structure.

15. The power supply system of claim 12, wherein the supply panel is disposed between any two of the plurality of power panels.

16. The power supply system of claim 12, wherein a power supply source that supplies power to the supply panel comprises at least a battery power source.

17. The power supply system of claim 16, wherein the supply panel comprises:
at least one first power conversion device that further receives power from the first AC power source and the second AC power source, and converts the power received from the at least one power source into the DC power.

18. The power supply system of claim 12, wherein in the plurality of circuit breakers, when an abnormality occurs in a power panel connected to the supply panel among the plurality of power panels, a circuit breaker disposed between the abnormality occurred power panel and the supply panel is closed to connect the abnormality occurred power panel and the supply panel so as to supply the DC power from the supply panel to the abnormality occurred power panel.

19. The power supply system of claim 12, wherein in the plurality of circuit breakers, when an abnormality occurs in a power panel that is not adjacent to the supply panel among the plurality of power panels, circuit breakers respectively disposed between the abnormality occurred power panel, a power panel adjacent to the supply panel and the supply panel are closed to supply the DC power to the abnormality occurred power panel from the adjacent power panel, and supply the DC power to the adjacent power panel from the supply panel.

20. A power supply system, comprising:
a plurality of power panels, wherein each power panel converts power supplied from a plurality of power sources into DC power, and converts the converted DC power into driving power of a load, and supplies the driving power to the load;
a supply panel that converts power supplied from at least one power supply source into DC power to supply the converted DC power to the plurality of power panels when connected to the plurality of power panels through a bus line;
the bus line through which a power end of each of the plurality of power panels and a power end of the supply panel are connected to conduct the DC power converted by the plurality of power panels and the supply panel; and
a plurality of circuit breakers disposed between each of the power ends and the bus line, which are opened and closed differently according to the power supply state of at least one of the plurality of power panels to connect or disconnect each of the power ends and the bus line,
wherein in the plurality of circuit breakers, when the power supply of at least one of the plurality of power panels is interrupted, in order to conduct the DC power from at least one of another power panel other than the power panel in which the power supply is interrupted and the supply panel to the power panel in which the power supply is interrupted through the bus line, a circuit breaker connected to the at least one of the another power panel and the supply panel is closed to connect the at least one of the another power panel and the supply panel and the interrupted power panel to the bus line,
wherein the plurality of power sources comprises:
a first AC power source and a second AC power source that supply AC power, and
a battery power source in which DC power is stored to supply the stored power to the plurality of power panels while the power supply is switched and restored when the power supply of the first AC power source and the second AC power source is interrupted, wherein after the power supply is interrupted, the battery power source supplies the stored power to the plurality of power panels with no interruption until the power supply is switched and restored, wherein a power supply source that supplies power to the supply panel comprises at least the battery power source.

21. The power supply system of claim 20, wherein the supply panel comprises:

at least one first power conversion device that further receives power from the first AC power source and the second AC power source, and converts the power received from the at least one power source into the DC power.

22. The power supply system of claim 20, wherein the supply panel is configured in plural, and each of the plurality of supply panels is connected to the bus line.

23. The power supply system of claim 22, wherein in the supply panels, a supply target for supplying the DC power among the plurality of power panels is predetermined for each of the plurality of supply panels to supply the DC power to the predetermined supply target.

24. The power supply system of claim 20, wherein the supply panel is provided at a position where each of the plurality of power panels is separated within a predetermined distance.

25. The power supply system of claim 20, wherein in the plurality of circuit breakers, when the power supply of at least one of the plurality of power panels is interrupted, a circuit breaker connected to the interrupted power panel, a circuit breaker connected to at least one power panel of the other power panels, and a circuit breaker connected to the supply panel are closed to supply the DC power to the interrupted power supply from at least one of the other power panels and the supply panel through the bus line.

26. The power supply system of claim 25, wherein the interrupted power panel is supplied with the DC power from a conversion device connected to the battery power source until the power supply is interrupted, and the DC power conducted from the supply panel is supplied.

* * * * *